(12) United States Patent
Jouppi

(10) Patent No.: US 7,890,857 B1
(45) Date of Patent: Feb. 15, 2011

(54) METHOD AND SYSTEM FOR UTILIZING SIZING DIRECTIVES FOR MEDIA

(75) Inventor: Norman P. Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 11/492,474

(22) Filed: Jul. 25, 2006

(51) Int. Cl.
G06F 17/00 (2006.01)

(52) U.S. Cl. ...................... 715/243; 715/253

(58) Field of Classification Search ............... 715/243, 715/230, 231, 232, 244, 246, 247, 253; 705/14.4, 705/14.49, 14.69, 14.72, 14.73
See application file for complete search history.

(56) References Cited

U.S. PATENT DOCUMENTS

| | | |
|---|---|---|
| 5,754,938 A | 5/1998 | Herz et al. |
| 5,794,210 A | 8/1998 | Goldhaber et al. |
| 5,848,396 A | 12/1998 | Gerace |
| 5,857,175 A | 1/1999 | Day et al. |
| 5,933,811 A | 8/1999 | Angles et al. |
| 5,974,398 A | 10/1999 | Hanson et al. |
| 5,987,252 A | 11/1999 | Leino et al. |
| 6,047,327 A | 4/2000 | Tso et al. |
| 6,085,216 A | 7/2000 | Huberman et al. |
| 6,108,639 A | 8/2000 | Walker et al. |
| 6,182,050 B1 | 1/2001 | Ballard |
| 6,182,068 B1 | 1/2001 | Culliss |
| 6,195,698 B1 | 2/2001 | Lillibridge et al. |
| 6,199,067 B1 | 3/2001 | Geller |
| 6,324,519 B1 | 11/2001 | Eldering |
| 6,353,925 B1 | 3/2002 | Stata et al. |
| 6,396,833 B1 | 5/2002 | Zhang et al. |
| 6,539,377 B1 | 3/2003 | Culliss |
| 6,546,390 B1 | 4/2003 | Pollack et al. |
| 6,549,215 B2 * | 4/2003 | Jouppi ........................ 345/660 |
| 6,560,588 B1 | 5/2003 | Minter |
| 6,567,507 B1 | 5/2003 | Shaffer et al. |
| 6,614,764 B1 | 9/2003 | Rodeheffer et al. |
| 6,618,814 B1 | 9/2003 | Gaur et al. |
| 6,628,314 B1 * | 9/2003 | Hoyle ......................... 715/854 |
| 6,654,743 B1 | 11/2003 | Hogg et al. |
| 6,665,710 B1 | 12/2003 | Bates et al. |
| 6,670,964 B1 | 12/2003 | Ward et al. |
| 6,681,059 B1 | 1/2004 | Thompson |

(Continued)

FOREIGN PATENT DOCUMENTS

WO    WO-97/17774    5/1997

(Continued)

OTHER PUBLICATIONS

MICROSOFT.COM, "MSDN: Commerce Server 2000, Targeting and Personalization", *MSDN Database*, (2007),1-4.

(Continued)

*Primary Examiner*—Laurie Ries

(57) ABSTRACT

A method and system for utilizing sizing directives for media. According to one embodiment, a method includes determining a size of a media slot to be filled. A sizing directive can be selected from a plurality of sizing directives associated with media that enables the media to fit within the size of the media slot. The sizing directive can be applied to the media.

20 Claims, 44 Drawing Sheets

U.S. PATENT DOCUMENTS

| Patent No. | Date | Inventor(s) | Ref |
|---|---|---|---|
| 6,718,365 B1 | 4/2004 | Dutta | |
| 6,721,275 B1 | 4/2004 | Rodeheffer et al. | |
| 6,735,589 B2 | 5/2004 | Bradley et al. | |
| 6,738,978 B1 | 5/2004 | Hendricks et al. | |
| 6,771,290 B1 | 8/2004 | Hoyle | |
| 6,832,207 B1 | 12/2004 | Shkedi | |
| 6,834,195 B2 | 12/2004 | Brandenberg et al. | |
| 6,850,247 B1 | 2/2005 | Reid et al. | |
| 6,937,291 B1 | 8/2005 | Gryskiewicz | |
| 6,983,311 B1 | 1/2006 | Haitsuka et al. | |
| 7,010,176 B2 | 3/2006 | Kusunoki | |
| 7,028,261 B2* | 4/2006 | Smyth et al. | 715/744 |
| 7,034,848 B2 | 4/2006 | Sobol | |
| 7,035,469 B2 | 4/2006 | Laaksonen | |
| 7,061,509 B2 | 6/2006 | Dischert et al. | |
| 7,064,867 B2 | 6/2006 | Lapstun et al. | |
| 7,065,247 B2 | 6/2006 | Lapstun et al. | |
| 7,130,841 B1 | 10/2006 | Goel et al. | |
| 7,146,567 B1* | 12/2006 | Duczmal et al. | 715/736 |
| 7,149,974 B2* | 12/2006 | Girgensohn et al. | 715/723 |
| 7,155,508 B2 | 12/2006 | Sankuratripati et al. | |
| 7,210,099 B2* | 4/2007 | Rohrabaugh et al. | 715/249 |
| 7,260,573 B1 | 8/2007 | Jeh et al. | |
| 7,305,691 B2 | 12/2007 | Cristofalo | |
| 7,310,612 B2 | 12/2007 | McQueen et al. | |
| 7,337,127 B1* | 2/2008 | Smith et al. | 705/14.66 |
| 7,483,871 B2* | 1/2009 | Herz | 1/1 |
| 7,673,237 B2* | 3/2010 | Evans et al. | 715/273 |
| 2001/0036224 A1 | 11/2001 | Demello et al. | |
| 2001/0041566 A1 | 11/2001 | Xanthos et al. | |
| 2001/0042132 A1 | 11/2001 | Mayadas | |
| 2002/0010775 A1* | 1/2002 | Rakavy et al. | 709/224 |
| 2002/0052778 A1 | 5/2002 | Murphy et al. | |
| 2002/0063681 A1* | 5/2002 | Lan et al. | 345/156 |
| 2002/0082910 A1* | 6/2002 | Kontogouris | 705/14 |
| 2002/0082923 A1 | 6/2002 | Merriman et al. | |
| 2002/0083079 A1* | 6/2002 | Meier et al. | 707/104.1 |
| 2002/0099605 A1 | 7/2002 | Weitzman et al. | |
| 2002/0102992 A1 | 8/2002 | Koorapaty et al. | |
| 2002/0124098 A1 | 9/2002 | Shaw | |
| 2002/0156677 A1 | 10/2002 | Peters et al. | |
| 2002/0161625 A1* | 10/2002 | Brito-Valladares et al. | 705/10 |
| 2002/0178257 A1 | 11/2002 | Cerrato | |
| 2002/0184097 A1* | 12/2002 | Hijiri et al. | 705/14 |
| 2002/0194070 A1* | 12/2002 | Totham et al. | 705/14 |
| 2003/0023486 A1* | 1/2003 | Pavelka | 705/14 |
| 2003/0023589 A1 | 1/2003 | Castle | |
| 2003/0028451 A1 | 2/2003 | Ananian | |
| 2003/0033199 A1 | 2/2003 | Coleman | |
| 2003/0037041 A1* | 2/2003 | Hertz | 707/1 |
| 2003/0050839 A1 | 3/2003 | Shiomi | |
| 2003/0110497 A1 | 6/2003 | Yassin et al. | |
| 2003/0171995 A1 | 9/2003 | Dezonno et al. | |
| 2003/0187726 A1 | 10/2003 | Bull et al. | |
| 2003/0200507 A1* | 10/2003 | Stern et al. | 715/517 |
| 2003/0212745 A1 | 11/2003 | Caughey | |
| 2004/0168190 A1 | 8/2004 | Saari et al. | |
| 2004/0215711 A1 | 10/2004 | Martin et al. | |
| 2005/0177387 A1 | 8/2005 | Mojsa | |
| 2005/0216346 A1* | 9/2005 | Kusumoto et al. | 705/14 |
| 2005/0265313 A1 | 12/2005 | Poikselka | |
| 2006/0090184 A1 | 4/2006 | Zito et al. | |
| 2006/0168628 A1* | 7/2006 | Ogawa et al. | 725/80 |
| 2007/0043616 A1* | 2/2007 | Kutaragi et al. | 705/14 |
| 2007/0061195 A1* | 3/2007 | Liu et al. | 705/14 |
| 2007/0150368 A1* | 6/2007 | Arora et al. | 705/26 |
| 2007/0239546 A1* | 10/2007 | Blum et al. | 705/14 |
| 2007/0282675 A1* | 12/2007 | Varghese | 705/14 |
| 2008/0010133 A1* | 1/2008 | Pyhalammi et al. | 705/14 |
| 2008/0140525 A1* | 6/2008 | Lamsfuss et al. | 705/14 |
| 2008/0270579 A1* | 10/2008 | Herz et al. | 709/219 |
| 2009/0083788 A1* | 3/2009 | Russell et al. | 725/34 |
| 2009/0299857 A1* | 12/2009 | Brubaker | 705/14.66 |

FOREIGN PATENT DOCUMENTS

| | | |
|---|---|---|
| WO | WO-9834189 | 8/1998 |

OTHER PUBLICATIONS

Gallagher, et al., "A Framework for Targeting Banner Advertising On The Internet", *IEEE, 13th Annual Hawwaii International Conference*, (1997).

Dissanaike, et al., "Utilizing XML-RPC or SOAP on an Embedded System", *Proceedings from the 24th International Conference on Distributed Computing Systems Workshops (ICDCSW)*, (Mar. 2004),438-440.

Huberman, et al., "Social Dilemmas and Internet Congestion", www.sciencemag.org *Science*, vol. 277, (Jul. 25, 1997),535-542.

Huberman, et al., "Strong Regularities in World Wide Web Surfing", www.sciencemag.org *Science*, vol. 280, (Apr. 3, 1998),95-98.

Borland, John "TV-based high-speed network draws $60 million", CNET News.Com http://news.com.com/2100/1033/248200.html?tag-nl, (Nov. 6, 2000),1-2.

Olsen, et al., "Disney preps wireless video service", CNET News.Com http://news.com.com/2100/1031/995846.html, (1995),1-3.

Cachin, et al., "Cryptography and Information Security Group: Private Information Retrieval", *CIS Private Information Retrieval Reserach* http://theory.lcs.mit.edu/cis/pir.html, (1999),1-1.

Canetti, et al., "Selective Private Function Evaluation with Applications to Private Statistics", *In Proceedings of Twentieth ACM Symposium on Principles of Distributed Computing PODC*, (2001),1-10.

Lipmaa, Helger "Electronic Voting", *Cryptology Pointers* http://www.tcs.hut.fi/helger/crypto/link/protocols/voting.html, (Jan. 1, 1970),1-2.

Copyright Office, "The Digital Millennium Copyright Act of 1998", *U.S. Copyright Office summary*, (Dec. 1998),1-18.

Lukose, et al., "SHOCK: Communicating with Computational Messages and Automatic Private Profiles", *WWW 2003/ACM*, (May 20, 2003),1-10.

Lillibridge, Mark "Translucent Sums: A Foundation for Higher-Order Mosule Systems", (Dec. 12, 1996),1-14.

Lillibridge, Mark "Exceptions Are Strictly More Powerful Than Call/CC", (Jul. 1995),1-9.

Lillibridge, Mark "Unchecked Exceptions can be Strictly More Powerful than Call/CC", *Higher-Order and Symbolic Computations*, (1999),275-307.

Harper, et al., "Operational Interpretations of an Extension of Fw with Control Operators", *J. Functional Programming*, (Jan. 1993),1-26.

Harper, et al., "Polymorphic Type Assignment and CPS Conversion", *ACM SIGPLAN Workshop on Continuations*, (1993),1-19.

Lillibridge, et al., "A Cooperative Internet Backup Scheme", Elnikety, Rice University, Birrell, Burrows; *Microsoft Research*, (Jun. 2003),1-13.

Flanagan, et al., "Extended Static Checking for Java", *Compaq Systems Research Center*, (Jun. 17, 2002),1-12.

Golle, et al., "Incentives for Sharing in Peer-to-Peer Networks", *Stanford Graduate Fellowship*, (Nov. 2001),1-13.

Harper, et al., "A Type-Theoretic Approach to Higher-Order Modules with Sharing", *Advanced Research Projects Agency, CSTO*, (Jan. 1994).

Harper, et al., "Explicit Polymorphism and CPS Conversion", *Defense Advanced Research Projects Agency, CSTO*, (Jan. 1993),1-13.

Harper, et al., "Polymorphic Type Assignment and CPS Conversion", *National Science Foundation Graduate Fellowship*, (Jun. 1992),1-9.

Lukose, et al., "Surfing as a Real Option", *First International Conference on Information and Computation Economics by ACM Press*, (1998),1-7.

Adamic, Lada A., "Search in Power-Law Networks", *Physical Review E*, vol. 64, 046135, (Sep. 26, 2001),1-8.

Milojicic, et al., "Peer-to-Peer Computing", (Mar. 8, 2002),1-52.

Adar, et al., "Shock: Aggregating Information Wihle Preserving Privacy", *Information Systems Frontiers 5:1*, (2003),15-28.

Adamic, et al., "Local Search in Unstructured Networks", *Wiley-VCH Verlag Berlin GmbH*, (Jun. 3, 2002),1-25.

Lukose, et al., "SHOCK: Communicating with Computational Messages and Automatic Private Profiles", http://www.2003.org/cdrom/papers/refereed/p691/p691-lukose.htm, (May 20, 2003),1-14.

Lukose, et al., "A Methodology for Managing Risk in Electronic Transactions over the Internet", *Third International Conference on Computational Economics, Stanford University*, (Jun. 30, 1997),1-14.

Aguilera, et al., "Block-Level Security for Network-Attached Disks", *HP Systems Research Center*, (Mar. 2003),1-16.

Ostrovsky, et al., "Efficient Consistency Proofs for Generalized Queries on a Committed Database", (Jul. 20, 2004),1-25.

Micali, et al., "Zero-Knowledge Sets", *Laboratory for Computer Science*, (2003),1-12.

Merkle, Ralph C., "Protocols for Public Key Cryptosystems", *IEEE*, (1980),122-134.

Martel, et al., "A General Model for Authenticated Data Structures", *Technical Report; UC Davis Department of Computer Science*, (Dec. 6, 2001),1-19.

Webcash Generator, "A Get Paid To Surf and Free Money Programs", http://www.webcashgenerator.com, (Aug. 11, 2002),1-2.

Kraut, et al., "Markets for Attention: Will Postage for Email Help?", *CSCW'02-ACM*, (Nov. 16, 2002),1-10.

Olsen, Stefanie "In Search of Profits-Tech News", CNET News.Com. http://news.com/2030-1032-1000366.html, (May 8, 2003),1-4.

Damgard, et al., "The Theory and Implementation of an Electronic Voting System", (Jul. 31, 2002),1-26.

The CAPTCHA Project, "Can Hard AI Problems Foil Internet Interlopers", S. Robinson, *SIAM News*; http://www.captcha.net/news/ai.html, (2001),1-4.

The CAPTCHA Project, "Gimpy", http://www.captcha.net/captchas/gimpy, (2000),1-1.

The CAPTCHA Project, "Telling Humans and Computer Apart (Automatically)", http://www.captcha.net, (2000),1-3.

NPSNET, "Anonymity with electronic money systems; How private are "private" electronic payment systems?", http://www.npsnet.com/danf/emoney-anon.html, (Apr. 19, 1996),1-4.

IBLAST Inc., "What is iBlast? Transforming the connection between content and the consumer", http://www.iblast.com/wat.php3, (2002),1-1.

IBLAST Inc., "How iBlast works? The technology is already in place", http://www.iblast.com/how.php3, (2002),1-1.

Dotcast, "Dotcast-About Dotcast. First-of-a-Kind Network", http://www.dotcast.com/htdocs/ssi/about/about.htm, (Aug. 11, 2003),1-2.

* cited by examiner

CONTENT MANAGER

○ Display Offers   ○ Create New Offer

1. Create Your Offer

What is the name of your Advertisement?

Spam Killer  1910

Enter any Additional Description or Subtitle:

This program blocks email spam.  1912

Please enter the URL for the location of your advertisement content http://some.placeontheinternet  1915

Continue

CONTENT MANAGER

○ Display Offers  ○ Create New Offer

2. Set Selection Criteria

Selection Criteria 1:

Type: [Exact Search String ▶] ~1930

Value: [Spam] ~1931

Offer Info:
Title: Spam Killer
Subtitle: This program blocks email spam
Location: http://some.placeontheinternet ~1937

Selection Criteria 2:

Type: [URL (visited) ▶] ~1933

Value: [http://howtokillallspam] ~1934

Selection Criteria 3:

Type: [URL (visited) ▶] ~1935

Value: [ ]

CONTENT MANAGER

○ Display Offers  ○ Create New Offer

3. Confirm/Add Query Selection Criteria

Offer Info:
Title: Spam Killer
Subtitle: This program blocks email spam
Location: http://some.placeontheinternet
Data Source: Test Advertiser

— 1947

| ID | Condition Type | Condition Value | Actions |
|---|---|---|---|
| 451 | Search Exact | Spam | Delete |
| 451 | Web Page Static | http://www.howtokill... | Delete |

1941 — 1942 —

( Add another condition ) — 1949

CONTENT MANAGER

○ Display Offers   ○ Create New Offer

4. Set Your Offer Budget

What is your total budget for distributing this query? ─1951

$ [ 5,000 ]

How much incentive do you want to provide for each delivery of data? ─1953

$ [ 2.45 ]

How long do you want this query to remain active? ─1955

[ 30 days ]

Offer Info:
Title: Spam Killer
Subtitle: This program blocks email spam
Location: http://some.placeontheinternet
Data Source: Test Advertiser
─1957

CONTENT MANAGER

○ Display Offers       ○ Create New Offer

Active Offers

| Title | Bid | Budget | Created | Expires | Status | Actions |
|---|---|---|---|---|---|---|
| Tablet PC | $1.11 | $100 | 1/20 | 2/19 | active | [edit] [expire] |
| Spam Killer — This program blocks email spam | $2.45 | $5,000 | 1/25 | 2/24 | active | [edit] [expire] |
| Test | $1.99 | $100 | 1/17 | 2/16 | expired | [edit] [delete] |

1907 — Tablet PC row
1960 — Spam Killer row
1909 — Test row

Start

Generating Data Targeted To Users Exhibiting Definable User Characteristics.
2110

Generating Selection Criteria Based On The Definable User Characteristics, Such That A Query Including The Selection Criteria Can Be Performed To Determine Which User Profiles Of A Plurality Of Potentially Targeted Users Satisfy The Selection Criteria Without Requiring A Release Of User Information In The User Profiles.
2120

Generating Increased User Interest For The Data By Targeting Delivery Of The Data To Potentially Targeted Users Whose User Profiles Satisfy The Selection Criteria Such That, If Desired, Targeted Delivery Of The Data To Potentially Targeted Users Whose User Profiles Do Not Satisfy The Selection Criteria Can Be Avoided.
2130

End

FIG. 21

METHOD AND SYSTEM FOR UTILIZING SIZING DIRECTIVES FOR MEDIA

CROSS REFERENCE TO RELATED APPLICATIONS

This application is related to co-pending patent applications: Ser. No. 11/123,935, entitled "Method and System for Targeted Data Delivery", filed May 5, 2005; Ser. No. 11/492,752, entitled "A Method and a System Of Constructing a Presentation", filed Jul. 25, 2006; and Ser. No. 11/492,352, entitled "A System and a Method for Prefetching Data within a System for Targeted Data Delivery", filed Jul. 25, 2006, which are assigned to the assignee of the present invention, the disclosure of which are hereby incorporated by reference.

BACKGROUND

The delivery of data over a communication network, such as the internet, to users can be an inexpensive and powerful tool for marketing goods and services. As one example, data can be delivered to a display of a user through various means while the user is connected to the communication network. For example, data such as an advertisement over the internet to a user coupled to the internet can be delivered through the forms of banner ads, pop-up ads, e-mails, etc. Typically, delivery of such advertisement is without the consent of the user. That is, the advertisement is unsolicited by the user.

The initial cost for the delivery of the advertisement through the communication network is much less than that of conventional forms of advertising communicating through more traditional media, such as mailers, magazines, television, radio, etc. As a result, the advertiser can easily deliver many more advertisements to users over the communication network. Also, since, typically, few if any restrictions are placed on the delivery of advertisements, the advertisers take advantage of the cheaper form of advertising by delivering advertisements to wider segment of the population.

However, the inexpensive delivery of advertising can be problematic to users. That is, users may be deluged with unwanted and unsolicited advertising. For example, advertising can be delivered through e-mails. Because the cost of sending e-mail is relatively small, unsolicited junk e-mail or "spam" can be delivered to numerous e-mail addresses. As such, a user may be bombarded with multiple different spam e-mail advertisements.

These unsolicited spam e-mail advertisements can adversely affect the user by wasting the user's time, resources, and opportunities. Specifically, the unsolicited spam e-mail advertisement may overwhelm a user since the user must waste valuable time in addressing and deleting unwanted spam e-mail advertisement. In addition, unsolicited spam e-mail advertising may overload a user's e-mail account. That is, the in-box for the user can be quickly filled with unsolicited spam e-mails. This denies the user full use of their e-mail account, since legitimate or wanted e-mails are not delivered to the spam-filled e-mail account. As such, resources are wasted on unsolicited spam e-mails, and opportunities may be lost since the user cannot access legitimate or wanted e-mails.

In addition, while the inexpensive delivery of advertising over the communication network is an advantage to the advertiser, the various forms for delivering advertisements in the conventional art are inefficient. For example, banner advertising, which is more expensive to implement than spam e-mails can be delivered to inappropriate recipients due to incomplete information about the users. That is, the targeting of users is insufficient due to a lack of information about the users. As a result, advertising funds are wasted on delivery of the advertisement to uninterested or inappropriate users. For example, a business may offer services that are valuable only to owners of an automobile. Using conventional spam delivery techniques, the advertisement may be delivered to numerous users who do not own an automobile and are uninterested in automobile-related services. As such, the business is wasting its advertising by delivering advertisements to users who are not likely to be interested in the services offered by the sources. In short, traditional data delivery methods may lack efficiency by delivering data to inappropriate users.

Further, conventional delivery mechanisms may encroach on the privacy of the user. For example, various spyware mechanisms provide targeting information to advertisers by spying on the activity of a user on an electronic device. This spying is typically perceived as an encroachment on the privacy of the user. In another example centralized storehouses mine user information from a cross-section of websites and off-line sources. This may be perceived as an encroachment on the privacy of the user.

Accordingly, what is needed is a form of advertising delivery that discourages spam, is more efficient in targeting, and does not encroach on a user's privacy.

BRIEF DESCRIPTION OF THE DRAWINGS

FIGS. 19A-F are diagrams illustrating exemplary user interfaces used to generate an offer for the targeted delivery of data, in accordance with one embodiment.

FIG. 21 is a flow diagram illustrating operations in a business method for generating increased user interest in a particular item of data by enabling delivery of the data to selected targets, in accordance with one embodiment of the present invention.

DETAILED DESCRIPTION

Figure 1:
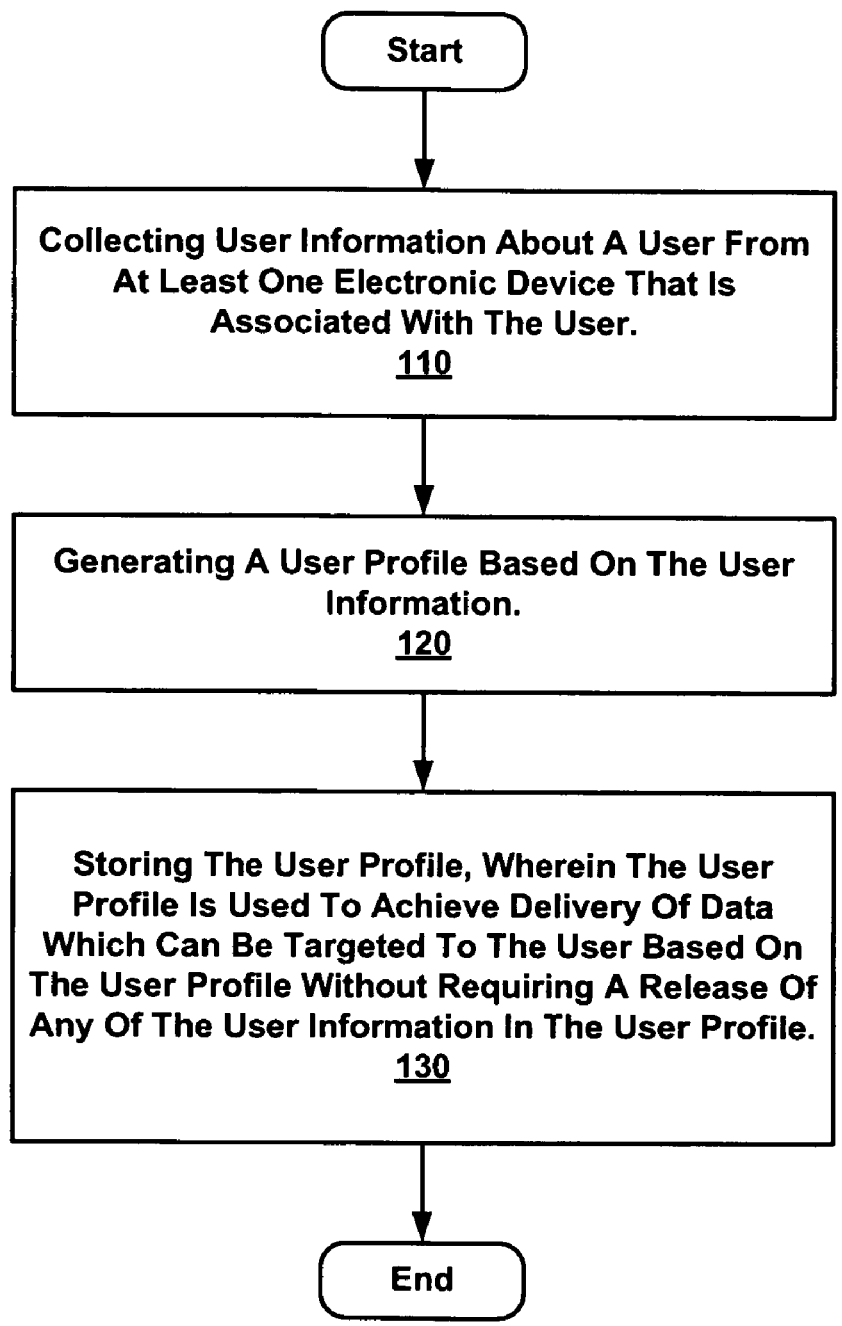
FIG. 1 is a flow diagram illustrating a computer implemented method for targeted data delivery, in accordance with one embodiment of the present invention.

Various embodiments of the present invention can be implemented on software running on a computer system. The computer system can be a personal computer, notebook computer, server computer, mainframe, networked computer, handheld computer, personal digital assistant, workstation, and the like. This software program is operable for providing targeted data delivery. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "collecting," "generating," "storing," "performing," and "monitoring," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Overview of Embodiments of the Present Method and System for Targeted Data Delivery Electronic devices such as personal computers (PCs), televisions, personal digital assistants (PDAs), cellular telephones, and the like have become an essential and commonly-used part of life for millions, if not billions, of people throughout the world. These and other similar electronic devices are used frequently and for a variety of purposes. As will be described below in detail, various embodiments of the present invention utilize user information which is collected from at least one electronic device that is associated with a user. Embodiments of the present invention generate a user profile based on the collected user information. Embodiments in accordance with the present invention utilize the user profile to target delivery of data to at least one specific user. Furthermore, as will be described in detail below, embodiments in accordance with the present invention achieve such targeted delivery of data to users without requiring a release of any user information in the user profile.

Various specific embodiments in accordance with the present invention will be described in detail below in Sections 1 through 6.

Section 1: General Method and System for Targeted Data Delivery

Embodiments of the present invention are discussed within the context of targeted delivery of data. For purposes of brevity and clarity, the targeted delivery of advertisements is used for illustrative purposes throughout the application. However, although advertisements are used for purposes of brevity clarity in certain examples, the targeted delivery of data is not intended to be limited to the targeted delivery of advertisements.

Other embodiments of the present invention are discussed within the context of electronic devices that are associated with a user. One electronic device, for example is the PC and is used for illustrative purposes throughout the application. Although the PC is used for purposes of brevity and clarity in many of the following examples, it is not intended that the term "electronic devices" be limited to PCs.

In addition, other embodiments of the present invention are discussed within the context of targeting delivery of data to users. In one example, the user is an individual that is associated with at least one electronic device. Although the term "user" is used for purposes of brevity and clarity in many of the following examples, it is not intended that the term "user" be limited to individuals. For example, a user is representative of a company having many individuals.

FIG. 1 illustrates a method for targeted data delivery, in accordance with one embodiment of the present invention. That is, FIG. 1 illustrates a process for targeting data delivery to a user. The method of flow diagram 100 is capable of ensuring the privacy of the user information used for targeting the delivery of data to the user.

At 110, the present embodiment collects user information about a user from at least one electronic device that is associated with the user. In one embodiment, the information is automatically collected. The user information includes behavioral characteristics exhibited by the user, personal information associated with the user, and machine configuration for electronic devices associated with the user. In addition, any other information useful for targeting the user is collected. In many embodiments of the present invention, the collection of user information is performed locally at a site associated with a user. However, other embodiments are well suited to the collection of user information at locations remote from the user. For purposes of organization, specific examples and detailed descriptions of the collection process will be described in greater detail in section 2 in which targeted data delivery is described from the standpoint of a user layer.

For example, behavioral characteristics collected for the user information include URL histories, usage of devices, usage of applications, etc. In particular, user activity on an electronic device associated with the user is monitored. In this way, user information of a user includes search behavior over the internet which includes logs (which include timing information) of web browsing, logs of e-mails sent and received, the use of various electronic devices (e.g., printers, cameras, etc.), the use of those devices in a location specific manner, the use of those devices in a time specific manner, geographic locations of an electronic device associated with the user, use of software applications on the electronic devices, hardware configuration, software configuration, etc. In addition, this user information includes personal information, such as address, income, last name, etc. As such, these behavioral characteristics and personal information are used to target users exhibiting these characteristics. A full discussion of the various types of electronic devices from which user information is collected will be described in greater detail in section 2.

At 120, the present embodiment generates a user profile based on the user information. This user profile is formatted to enable the selection of particular characteristics that are used to target users exhibiting those characteristics. For example, the user profile includes attributes that represent the characteristics (e.g., search behavior, machine configuration, personal information, etc.) of the user that are collected in the background while the electronic devices associated with the user are operating. In many embodiments of the present invention, the generation of the user profile is performed locally at a site associated with a user. However, other embodiments are well suited to the generation of user profiles at locations remote from the user. Specific details regarding the generation of the user profile are discussed below in great detail in section 2.

It should be noted that in accordance with embodiments of the present invention, even though the software is operating in the background, the software is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

At 130 the present embodiment stores the user profile. In this manner, the user profile is used to achieve delivery of data which is targeted to the user based on the user profile. In addition, this targeting of the user for the delivery of data is accomplished without requiring a release of any of the user information in the user profile. That is, the user profile is stored and used in a manner that protects the privacy of the user 250. In many embodiments of the present invention, the storing of user information is performed locally at a site associated with a user. However, other embodiments are well suited to the collection of user information at locations remote from the user. Specific examples and detailed descriptions of the storing process are described in greater detail in section 2 below.

For purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. Furthermore, as will be described below with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

Figure 2A:
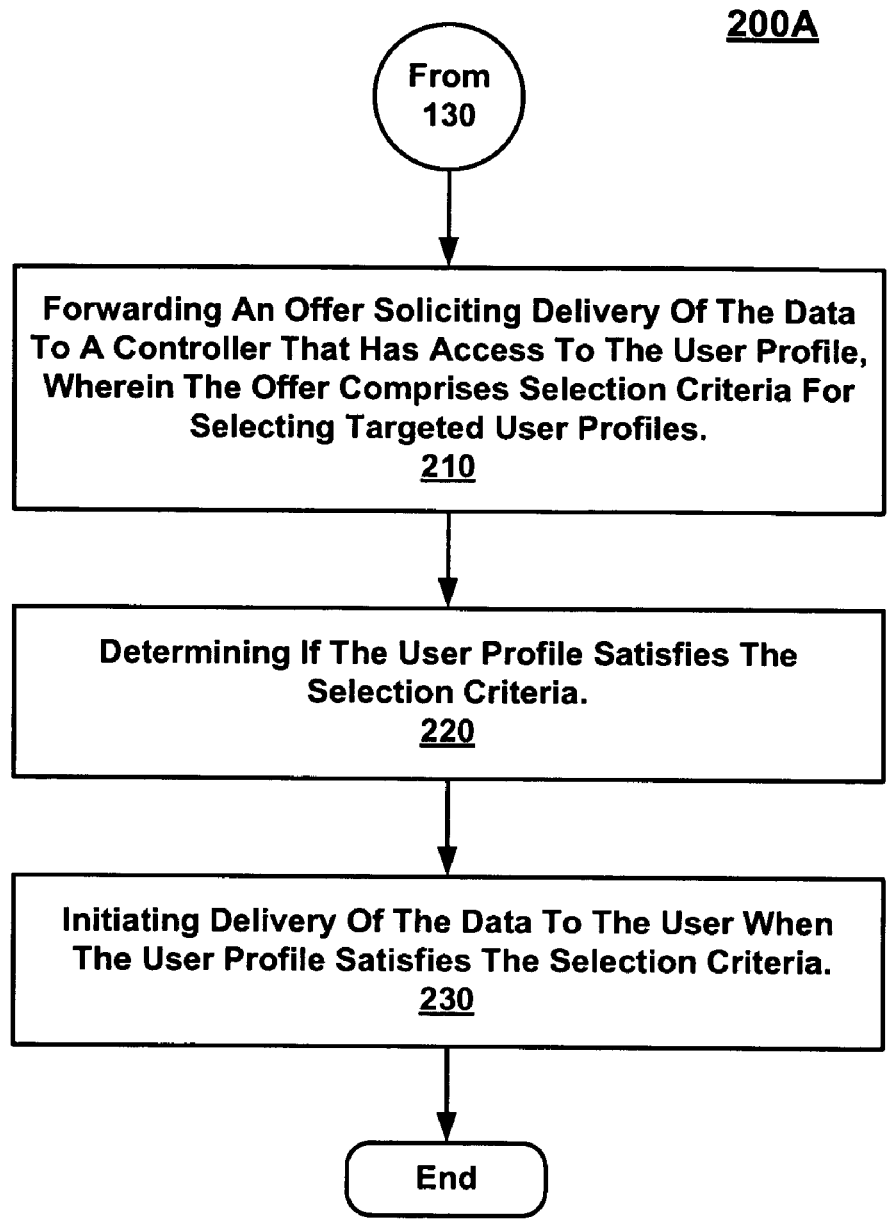
FIG. 2A is a flow diagram illustrating a computer implemented method for targeted data delivery to determine if a user profile satisfies the selection criteria, in accordance with one embodiment of the present invention.

FIG. 2A is a flow diagram illustrating operations for targeted data delivery using a query that compares a user profile to selection criteria that defines characteristics exhibited by targeted user profiles. The flow diagram 200 provides further illustration of the method for targeted data delivery of FIG. 1. The method of FIG. 2A is capable of protecting user information used for targeting the delivery of data to the user since release of any of the user information is not required.

For purposes of the present Application, it is understood that in embodiments in accordance with the present invention, the query is included within an offer for the solicitation of data. In one embodiment, the offer includes the query. In another embodiment, the offer includes the query and the location of the data to be offered for delivery. In still another embodiment, the offer includes the query and the data. Additionally, in another embodiment, an optional offer of compensation for taking delivery of the data is included within the offer. In still another embodiment, the information (e.g., query, forms of the data, compensation, etc.) included within the offer is jumbled or scrambled together. Also, additional information is optionally included (e.g., expiration period, expiration data, etc.).

The present embodiment continues from 130 of FIG. 1. At 210, the present embodiment forwards a query soliciting delivery of data to a controller that has access to the user profile. The query comprises selection criteria for selecting targeted user profiles. The selection criteria includes characteristics that are exhibited or that are similar to that found in the user profiles generated in FIG. 1. As such, the selection criteria includes information such as behavioral characteristics exhibited by the user, personal information associated with the user, and machine configuration for electronic devices associated with the user, etc. This selection criteria is used to identify targeted users whose user profiles satisfy the selection criteria. In other embodiments, the selection criteria is used to identity targeted users whose user profiles match the selection criteria. In this manner, the query is used for selecting user profiles that satisfy the selection criteria without requiring a release of any user information in the selected user profiles. Thus, the user profile of a targeted user is protected. In many embodiments of the present invention, the creation of the selection criteria is performed at the data source. However, other embodiments are well suited to the creation of selection criteria at locations other than the data source (e.g., the data distributor). For purposes of organization, section 4 below describes the selection criteria creation process in detail.

In one embodiment, selection criteria defines a target profile. That is, the target profile is representative of a user who is targeted for the delivery of data. As such, the selection criteria defines characteristics exhibited by the user profiles that are targeted for the delivery of data.

In one embodiment, the query is forwarded to a controller that is co-located with an electronic device associated with the user. That is, the query is forwarded to an electronic device that is collecting user information for use in targeted data delivery. In another embodiment, the query is forwarded to a controller that is located at a remote device that is separate from the electronic devices associated with the user. That is, in such an embodiment, user information is not collected on the remote device. In many embodiments of the present invention, the operations of the controller are performed locally at a site associated with the user, although other embodiments are well suited to performing controller operations at locations remote from the user. Section 2 below provides specific details regarding the operation of the controller.

At 220, the present embodiment determines if the user profile satisfies the selection criteria. The selection criteria defines characteristics exhibited by targeted user profiles. If the user profile satisfies the selection criteria, then the data is presumably targeted to the user associated with the user profile. That is, the data is generated specifically for users who exhibit characteristics in their user profiles that satisfy the selection criteria.

On the other hand, if the user profile does not satisfy the selection criteria, then the data is not targeted to the user. That is, the data is not generated for the user whose user profile does not satisfy the selection criteria.

In many embodiments of the present invention, the operations performed to determine if the user profile satisfies the selection criteria are performed locally at a site associated with a user. However, other embodiments are well suited to determining whether the user profile satisfies the selection criteria at locations remote from the user. Again, for purposes of organization, specific examples and detailed descriptions of the determination of whether the user profile satisfies the selection criteria is described in greater detail in section 2.

At 230, the present embodiment initiates delivery of the data to the user when the user profile satisfies the selection criteria. Targeting the user and the delivery of the data is achieved without requiring a release of the user information in the user profile. That is, user information associated with the user that is used to determine whether the user profile satisfies the selection criteria is not required to be released. Additionally, release of the user information does not occur without the knowledge and authorization of the user to protect the user's privacy. In many embodiments of the present invention, the release of user information is performed locally at a site associated with a user. However, other embodiments are well suited to the release of user information at locations remote from the user. Further details regarding the release of user information are provided in section 2.

In one embodiment, the data is delivered to an electronic device that is associated with the user. That is, the data is delivered to an electronic device from which user information is collected. In other embodiments, the data is delivered to electronic devices associated with the user from which no user information is collected. For example, the data is delivered to a television that just displays what it receives. In other embodiments, other forms of delivery media are supported, such as mailings, telephone calls, e-mails, etc. A full discussion of the various forms of delivering data to a user is provided in section 2.

In one embodiment, after the data is delivered a subset of the user information in the user profile is released with authorization by the user. The subset of information is used to determine if the user profile satisfies the selection criteria. In many embodiments of the present invention, the release of the subset of user information is performed locally at a site associated with a user. However, other embodiments are well suited to the collection of user information at locations remote from the user. The release of the subset of information is described in greater detail in section 2 below.

Figure 2B:
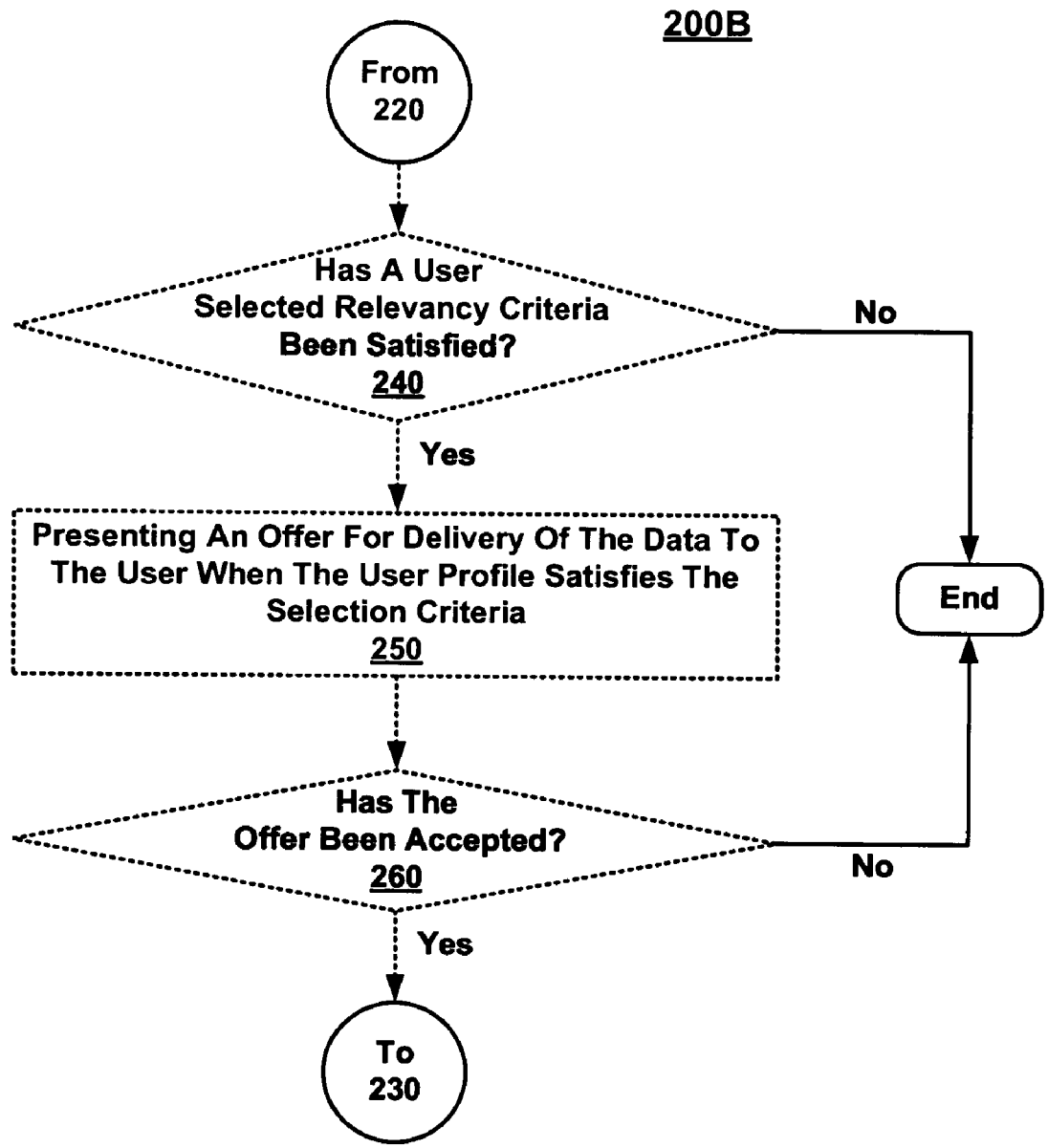
FIG. 2B is a flow diagram illustrating a computer implemented method for targeted data delivery that determines if a user selected relevancy criteria has been satisfied, in accordance with embodiments of the present invention.

FIG. 2B is a flow diagram 200B illustrating operations performed in a method for initiating delivery of data that is targeted to a user, in accordance with one embodiment of the present invention. The flow diagram provides additional operations to the flow diagram 200A and is implemented between 220 and 230 of FIG. 2A.

At 240, the present embodiment determines if the user selected relevancy criteria has been satisfied. The relevancy criteria provides a measure for valuing the user's attention. That is, in one embodiment, the relevancy criteria is a price paid to the user for the user's time in accepting delivery of the data and viewing the data. If the relevancy criteria has not been satisfied, then the present embodiment ends. However, if the relevancy criteria has been satisfied, then the present embodiment proceeds to 250. A full discussion of the user selected relevancy criteria, as well as operations performed to determine if the user selected relevancy criteria has been satisfied, is provided below in section 2.

At 250, the present embodiment presents an offer for the delivery of data to the user. This occurs when the user profile satisfies the selection criteria and the offer satisfies the user selected relevancy criteria. Section 2 provides details of the presentation of the offer to the user.

At 260, the present embodiment determines if the offer for the delivery of data has been accepted. If the offer has not been accepted, then the present embodiment ends. That is, the data is not delivered to the user. On the other hand, if the offer has been accepted, then the present embodiment proceeds to 230 to initiate the delivery of the data. As such, the user is able to determine if the data is worthwhile for viewing even though the user profile satisfies the selection criteria and the offer satisfies the user selected relevancy criteria.

In this way, the user makes another determination on whether to authorize the release of user information used to satisfy the selection criteria in return for the delivery of the data. In one embodiment, acceptance of the offer authorizes a release of the subset of information used to determine if the user profile satisfies the selection criteria. Section 2 describes the operation for the acceptance of the offer in greater detail.

In still another embodiment, the data that is delivered to the user is customized. That is, the data is customized based on the user information. That is, the content of the data (e.g., advertisement) is dynamically adapted based on the user's profile. Not only will the user be presented with data of interest to him or her, but also presentation of the data is tailored to the user's experience.

Figure 3:
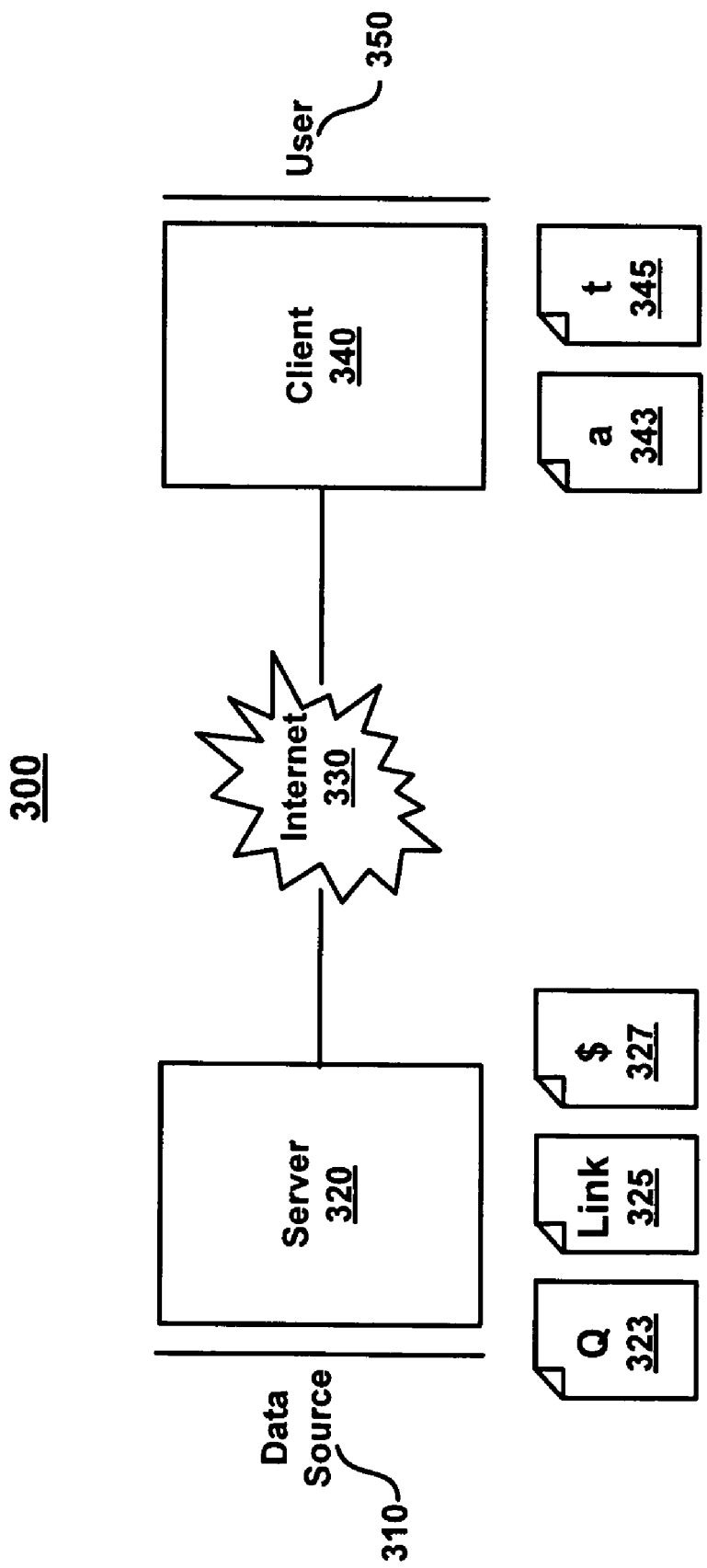
FIG. 3 is a block diagram illustrating a system architecture of a data broadcast network that is capable of targeted data delivery, in accordance with one embodiment of the present invention.

Turning now to FIG. 3, a system is shown illustrating an exemplary data broadcast network 300 that is capable of targeted data delivery between a data source 310 and a user 350, in accordance with one embodiment of the present invention. FIG. 3 provides further illustration to the methods of FIGS. 1 and 2, in one embodiment. The system of FIG. 3 is capable of protecting user information used for targeting the delivery of data to the user.

The data broadcast network 300 includes a server 320 and a client 340 which are connected through the Internet 330, or any other communication network. The server 320 is operated by a data distributor, while the client 340 (e.g., a personal computer [PC]) is operated by the user 350. While the present embodiment of FIG. 3 is described within the context of one server and one client, other embodiments are well suited to supporting data broadcast networks consisting of a plurality of servers and a plurality of clients supporting one or more sources of data (e.g., advertisers) and one or more users.

As shown in FIG. 3, the client 340 represents an electronic device associated with the user 350. As described previously, user information is collected from the client 340. While in the present embodiment only one client is shown, other embodiments are well suited to supporting the collection of user information from multiple clients associated with the user 350. A detailed description of the various types of clients and the collection of user information from those clients is provided in section 2.

In FIG. 3, a user profile is based on the user information collected from the client 340. This user profile is formatted to enable the selection of particular characteristics that are used to target users exhibiting those characteristics. For example, in FIG. 3, the user profile of the user 350 includes attributes 343. The attributes 343 represent the characteristics (e.g., behavior, machine configuration, personal information, etc.) of the user 350. The attributes are collected in the background of the client 340.

It should be noted that in accordance with embodiments of the present invention, even though the collection of attributes is operating in the background, this collection is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

In one embodiment, the user 350 controls what types of data are collected for the user profile, and how long such information is held in the user profile. Furthermore, the user 350 enters additional attributes 343 into an associated user profile to specify further identifiable interests. In many embodiments of the present invention, the collection of attributes is performed locally at a site associated with a user, although other embodiments are well suited to the collection of attributes at locations remote from the user. For purposes of organization, specific examples and detailed descriptions of attributes and their collection will be described in greater detail in section 2.

In addition, the user profile includes an optional threshold 345. The threshold 345 defines the minimum payment required to make it worthwhile for the user 350 to accept delivery of data. For example, the threshold defines the payment to the user required for the user 350 to view an advertisement. In accordance with embodiments of the present invention, there are multiple thresholds associated with a user 350 depending on the currency of the offer (e.g., cash, frequent flyer miles, discounts) and the content of the data. Section 2 below provides details of the selection and implementation of the threshold 345.

In one embodiment, the collecting of 110, the generating of 120, and the storing of 130 of FIG. 1 are performed at one of the electronic devices associated with the user 350. For example, the collecting of 110, the generating of 120, and the storing of 130 are performed at locally at the client 340. The local performance of these operations protect the privacy of the user information, and are described in detail in section 2.

In another embodiment, at least one of the collecting of 110, the generating of 120, and the storing of 130 of FIG. 1 is performed on a remote electronic device that is separate from the electronic devices that are associated with the user 350.

Also shown in FIG. 3 is a data source 310. In the present embodiment, the data source 310, or some representative of the data source 310, creates a query 323, a link 325 to data (e.g., an advertisement), and an optional payment 327 that is paid upon delivery of the data. The query 323, link 325, and optional payment 327 combined constitute an offer. The query 323, link 325, and payment 327 are used for the solicitation of the delivery of the data. In one embodiment, the query 323, link 325, and payment 327 are created by the data source 310 and stored on the server 320. In other embodiments, the query 323, link 325, and payment 327 are created in combination with the server 320, or through another representative (e.g., a broker). Also, in one embodiment, the storing of the offers is implemented through a web application interface hosted by the data distributor. A full discussion of the creation of the query 323, link 325, and payment 327 is provided in section 3, in which the targeted delivery of data is described from the standpoint of the data source 310.

In the present embodiment, the data distributor through the server 320 broadcasts the query 323, link 325, and payment 327, to all of its associated clients in the data broadcast network 300, including the client 340. The client determines if an associated user profile satisfies the query. Section 2 describes, in detail, the determination of whether the user profile satisfies the query.

In other embodiments, the query 323, link 325, and payment 327 are sent to a location other than the client 340 for accessing the user profile information and determining if the user profile satisfies the query. That is, the user profile is stored in a location other than the client 340, or the determination of whether the user profile satisfies the selection criteria of the target profile occurs at a location other than the client 340. Details of various locations for performing the determination of whether the user profile satisfies the selection criteria of the target profile is provided in section 3, in which the targeted delivery of data is described from the standpoint of the data distributor layer.

In one embodiment, if the user profile of the user 350 satisfies the query 323 and potential payment 327 satisfies the threshold 345, the user 350 decides whether the delivery of the data associated with the query 323 is desired in return for the payment 327. On the other hand, if the user profile or the potential payment 327 do not satisfy the query, delivery of the data is not provided as an option to the user.

The data broadcast network 300 of the present embodiment is able to preserve the privacy of the user 350. In particular, in one embodiment all queries (e.g., query 323) are broadcast to the user 350 without revealing any information about the user 350. In such an embodiment, only when the user 350 decides to accept delivery of the data, and in turn collect the payment 327 does the user 350 intentionally disclose identity information (e.g., information in the user's profile used to satisfy the selection criteria). In one such embodiment, the identity of the user 350 is only revealed to the data distributor associated with the server 320. In addition, in another embodiment, to further protect the privacy of the users in the data broadcast network 300, only aggregate data is returned to the advertiser 310.

Figure 4:
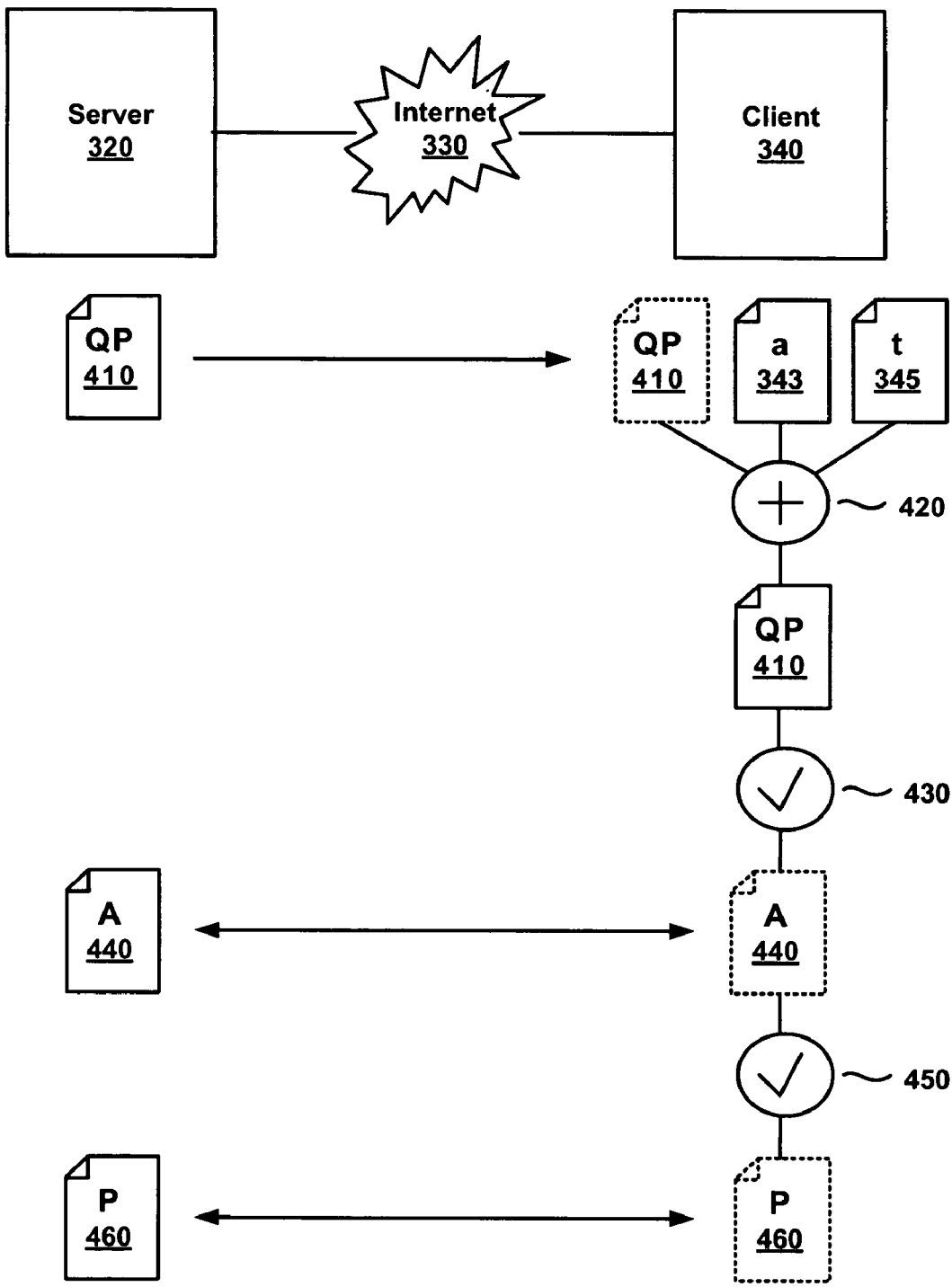
FIG. 4 is a flow diagram illustrating the flow of data in the data broadcast network of FIG. 3, in accordance with one embodiment of the present invention.

FIG. 4 is a data flow diagram 400 illustrating the flow of information in the data broadcast system 300 of FIG. 3, in accordance with one embodiment of the present invention. In the present embodiment, the client 340 communicates with the server 320 over the internet 330 to receive an offer QP 410, which includes a query and potential payment. At the comparator function block 420, the query in QP 410 is tested against the user attributes 343. In addition, the potential payment in QP 410 is tested against the threshold 345.

Also, the offer QP 410 is checked for validity. For example, an offer is invalid after exhausting an advertiser budget. In many embodiments of the present invention, the checking for the validity of the offer is performed at the data distributor layer. For purposes of organization, details for checking the validity of the offer is provided in section 3.

If the user attributes 343 satisfy the query and the potential payment satisfies the threshold 345, then at the output of the comparator function block 420, the offer QP 410 is presented to the user in a non-intrusive manner. Details of the offer for the delivery of data are provided in section 2.

At the acceptance block 430, the user decides whether it is desired to have the data to be delivered (e.g., for the purposes of watching an advertisement). If the user chooses to have the data delivered, the data (e.g., an advertisement) 440 is retrieved from the server 320 and delivered to the client 340 for presentation to the user. The operations for the acceptance of the offer for the delivery of data is provided in detail in section 2.

At the monitoring block 450, the present embodiment determines if the data has been presented to the user (e.g., viewed by the user). If the data has been presented, then the payment 460, as an incentive, is registered on the server to the user 350 that is associated with the client 340. Section 3 below provides a detailed description of the payment of the incentive.

While the present embodiment of FIG. 4 describes various functions at the server 320 and the client 340, other embodiments of the present invention are well suited to performing these functions at either the server 320, or the client 340, or any location other than the server 320 or client 340, or any combination thereto.

Figure 5:
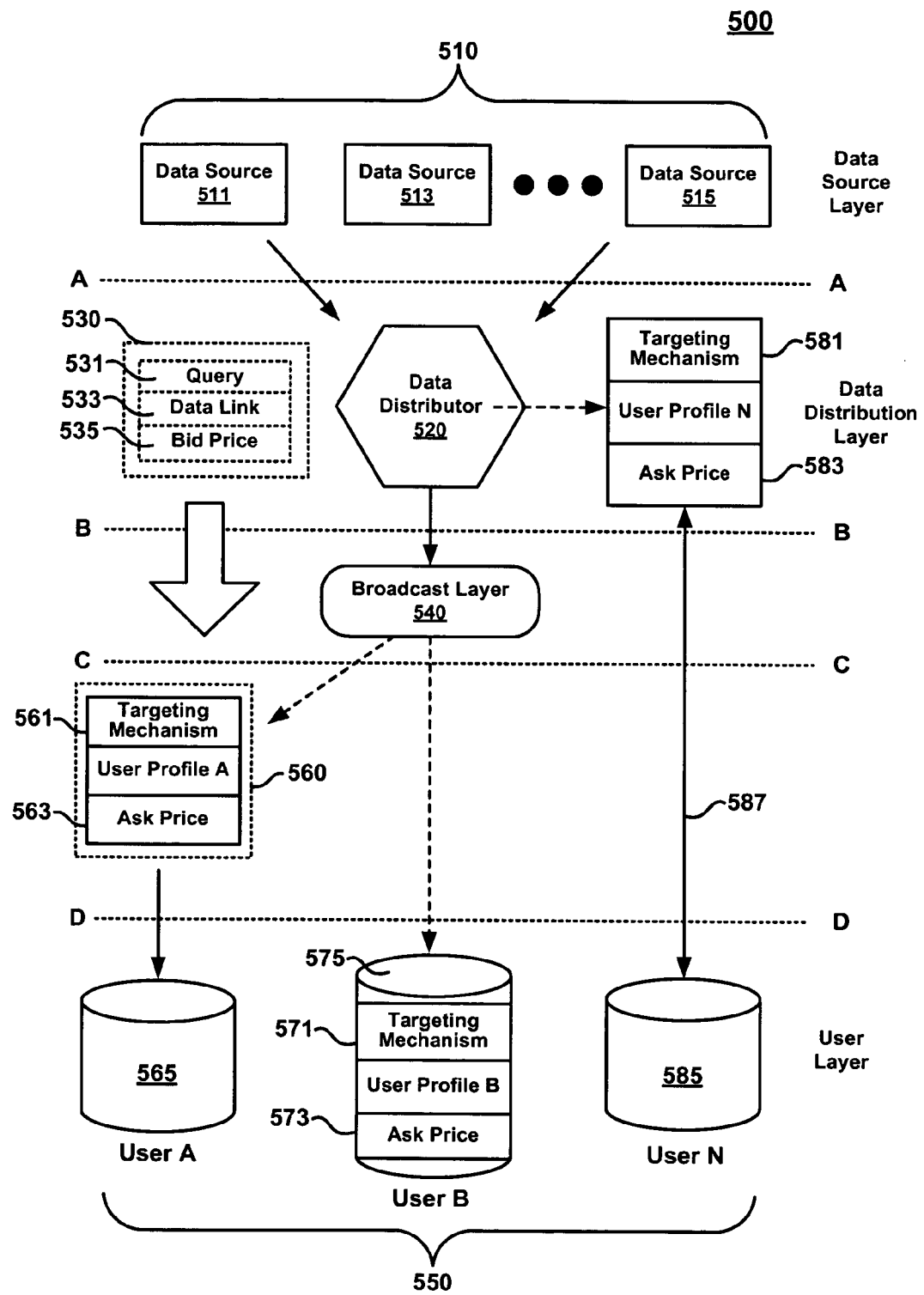
FIG. 5 is a block diagram of a network that is capable of targeted data delivery between a plurality of data sources and a network of users through a data distributor, in accordance with one embodiment of the present invention.

FIG. 5 is a diagram of an exemplary network 500 that is capable of targeted data delivery between a plurality of data sources and a network of users, in accordance with one embodiment of the present invention. Network 500 provides more detail to the data broadcast network 300 of FIG. 3, in one embodiment. In FIG. 5, the network 500 links a plurality of data sources 510 to a network of users 550 (e.g., user A, user B, on up to user N) for the targeted delivery of data. More specifically, the present embodiment links a data source with a particular user for the targeted delivery of data. Additionally, the network 500 is capable of achieving delivery of data that is targeted to a user based on information in a user profile without requiring a release of the user information to protect privacy.

In the network 500, a plurality of data sources 510 exist in a data source layer above line A-A. For purposes of introduction, a brief description of the data source layer is provided here in section 1 below. Also, a detailed description of the operations performed at the data source layer is provided in section 4, in which the targeted delivery of data is described from the standpoint of the data source layer.

The plurality of data sources 510 includes data sources 511, 513, and 515. Each of a plurality of data sources 510 provides data. The data provided by a data source includes various forms of information, such as advertisements, publications, public and private notification alerts, etc. For example, in one embodiment, the data source 510 is an advertiser. The advertiser uses network 500 to deliver advertisements, as data, to targeted users.

Additionally, the data sources provide selection criteria that is crucial in identifying users targeted for the delivery of data. The selection criteria identifies a set of users in the network of users 550. That is, the selection criteria is used to identify and target users in the network of users 550. For example, the selection criteria includes the use of accounting software on a user's computing device to manage budgets, and other behavioral characteristics that indicate the user has visited tax help web sites. In this way, a data source that provides income tax services is targeted to those users that satisfy the criteria.

In one embodiment, the data source is a broker between the originator of the data and the data distributor 520. For example, the broker interfaces with the data distributor 520 for the targeted delivery of data. That is, the broker provides the data and the criteria on behalf of the originator of the data.

In the network 500, a data distributor 520 exists in a data distributor layer between line A-A and line B-B. For purposes of introduction, a brief description of the data distribution layer is provided in section 1 below. However, a full description of the operations performed at the data distribution layer is provided in section 3, in which the targeted delivery of data is described from the standpoint of the data distribution layer.

The data distributor 520 is communicatively coupled to the network of users 550. The data distributor 520 provides the sole distribution point for the delivery of the data from the plurality of data sources 510 to the users in the network 550. That is, the data distributor 520 provides the avenue for accessing each of the users in the network of users 550 specifically for the delivery of data from the plurality of data sources 510.

In one embodiment, the data distributor is a network owner. That is, the network owner owns and provides access to its network of users 550. For example, a network owner has an association with a manufacturer of PCs. As such, a buyer of a PC from the manufacturer agrees to become part of the network of users 550 for the targeted delivery of data.

For example, the data distributor is the creator and controller of the proprietary network 500. The data distributor 520 receives a cut of every transaction equal to a function V(A,B) that is a function of the user ask price, A, and the bid price, B. The incentive delivered to the user is limited by A<=V(A,B) <=B. The incentive provided by a data source for the delivery of data is partly paid to the data distributor 520.

In another embodiment, the data distributor 520 is a central server broadcasting to all peers over the internet. In another embodiment, the data distributor 520 is a federation of such central servers broadcasting to peers over the internet. For example, the data distributor 520 is associated with the server 320 of FIG. 3.

The data distributor 520 in combination with each of the data sources in the plurality of data sources generates offers for the targeted delivery of data. For example, an offer 530 is generated that is associated with one of the data sources in the plurality of data sources 510. The offer 530 is used to target the delivery of data. The offer 530 includes a query 531. The offer 530 includes a link 533 to the data, or any other form of accessing the data. That is, the offer 530 includes the location of the data to be offered for delivery, in some embodiments. In other embodiments, the offer 530 includes the data itself. The offer 530 also includes a bid price that indicates the price paid by the data source for the delivery of data to a user in the network of users 550. That is, the offer 530 also optionally includes an offer of compensation for taking delivery.

In one embodiment, the offer 530 is generated at the data source, or broker that represents the data source. In another embodiment, the offer 530 is generated at the data distributor. In still another embodiment, the offer 530 is generated at the data source, or broker, and the data distributor 520 in combination. For purposes of organization, specific examples and detailed description of the generation of the offer 530 will be described in section 4, in which the targeted delivery of data is described from the standpoint of the data source layer.

As shown in FIG. 5, a broadcast layer 540 broadcasts offers from the data distributor 520 to the network of users 550. The broadcast layer 540 is located between line B-B and line C-C. For purposes of introduction, a brief description of the broadcast layer 540 is provided in section 1 below. A detailed description of the operations performed at the broadcast layer is provided in section 3.

The method of broadcast includes one or a combination of several possibilities including, but not limited to: a direct server connection over the internet, an indirect connection through a peer-to-peer scheme, a data casting method that broadcasts digital messages over an existing television infrastructure.

In one embodiment, the broadcast layer 540 sends offers in various distribution patterns. For example, the broadcast layer 540 sends offers to each of the network of users 550, a randomly selected number of users in the network of users 550, or a demographically selected group of users from the network of users 550 (e.g., by geographic location).

In network 500, a user layer is located below line D-D. For purposes of introduction, a brief description of the user layer is provided in section 1. Furthermore, a detailed description of the operations performed at the user layer is provided in section 2.

In the network 500, each of the network of users 550 is associated with a targeting mechanism (e.g., client software) that operates to facilitate the targeted delivery of data. The targeting mechanism operates in the background to track a wide variety of user behaviors. These behaviors include behavioral and personal characteristics, for example. It should be noted that in accordance with embodiments of the present invention, even though the targeting mechanism is operating in the background, the targeting mechanism is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

The user information is organized according to a schema that allows queries to be generated that are designed such that user information that satisfy the criteria set forth in the query enable the targeting of data to users.

This user information is collected and represented as a user profile. As such, each of the network of users 550 is associated with a user profile containing personal and configuration information related to an associated user. For example, user A is associated with user profile A, user B is associated with user profile B, and user N is associated with user profile N.

Also, each of the plurality or network of users 550 is associated with a minimum ask price. For example, user A is associated with ask price 563, user B is associated with ask price 573, and user N is associated with ask price 583. The ask price is a form of consideration that is paid in return for the delivery of the data. The ask price may be available in many forms of consideration, such as cash, frequent flier miles, donations, printers, coupons, etc.

The ask price is an economic mechanism designed to monetize the scarcity of consumer attention, in one embodiment. Users will set their ask price higher if they are not interested in receiving an increase in the number of items of data (e.g., advertisements). On the other hand, user will set their ask price lower if they are interested in receiving more items of data. In this way, the ask price is used to efficiently deliver the data to users who are interested in the data.

In another embodiment, the minimum ask price is used to discourage spam. That is, data considered as spam most likely is associated with very low bid prices in order to distribute the spam data to a large number of users. However, users with ask prices higher than the average price associated with spam data will not receive the spam data. As such, the minimum ask price is used to discourage the distribution of spam.

As shown in FIG. 5, the location of the targeting mechanism, user profile, and ask price is variable, in accordance with embodiments of the present invention. For example, the targeting mechanism 571, user profile B, and ask price 573 is located at the electronic device 575 (e.g., PC) associated with user B. That is, the targeting mechanisms 571, user profile B, and ask price 573 is locally located at the user layer. As such, the collection of user information for the user profile B and the determination of whether the user profile B satisfies any query coming from the data distributor occurs locally. Likewise, the determination of whether a bid price coming from the data distributor satisfies the user's asking price occurs locally.

In another embodiment, the location of the targeting mechanism 561, user profile A, and ask price 563 is located remotely from the electronic device 565 that is associated with the user A. That is, the targeting mechanisms 561, user profile A, and ask price 563 is located between the broadcast layer 540 and the user layer. As such, the collection of user information for the user profile A and the determination of whether the user profile A satisfies any query coming from the data distributor 520 occurs remotely. Likewise, the determination of whether a bid price coming from the data distributor satisfies the user's asking price occurs remotely.

In still another embodiment, the location of the targeting mechanism 581, user profile N, and ask price 583 is located at a server associated with the data distributor 520. That is, the targeting mechanisms 581, user profile N, and ask price 583 are located at the data distributor layer. As such, the offer 530 need not necessarily go through the broadcast layer 540, in one embodiment. As such, the collection of user information for the user profile N, and the determination of whether the user profile N satisfies any query coming from the data distributor 520, and if a bid price coming from the data distributor satisfies the user's ask price 583 occurs at the data distributor 520, or at a server closely associated with the data distributor 520.

In addition, the locations of each of the targeting mechanisms, user profiles, and ask prices is split amongst various locations shown above, in accordance with another embodiment of the present invention.

The targeting mechanisms are also used to determine if the user profiles satisfy the selection criteria as defined by the queries. For example, for user B, the targeting mechanism 571 determines if the query 531 in offer 530 is satisfied by the information in user profile B. Only if the selection criteria in query 531 is satisfied by the user profile B, and the bid price 535 exceeds the ask price 573 is an offer to deliver the data (e.g., through data link 533) presented to the user B. The bid price 535 is used as an incentive to entice a user to accept delivery of data.

For example, a choice selection is presented to user B, in one embodiment. The choice selection is presented through one of a number of mechanisms, such as a popup, a less invasive flashing systray icon, etc. The choice selection includes 1) a choice to view the data (e.g., an advertisement), 2) a choice to ignore the data. With this choice, the purpose of the data and a description of the data source is summarized for user B.

In addition, in return for accepting delivery of the advertisement for viewing, user B will receive a payment as consideration. That is, if user B chooses to view the data, the data is presented to the user, and only then is the user's account credited. For example, the credit to the user's account is made at the data distributor 520.

Figure 6:
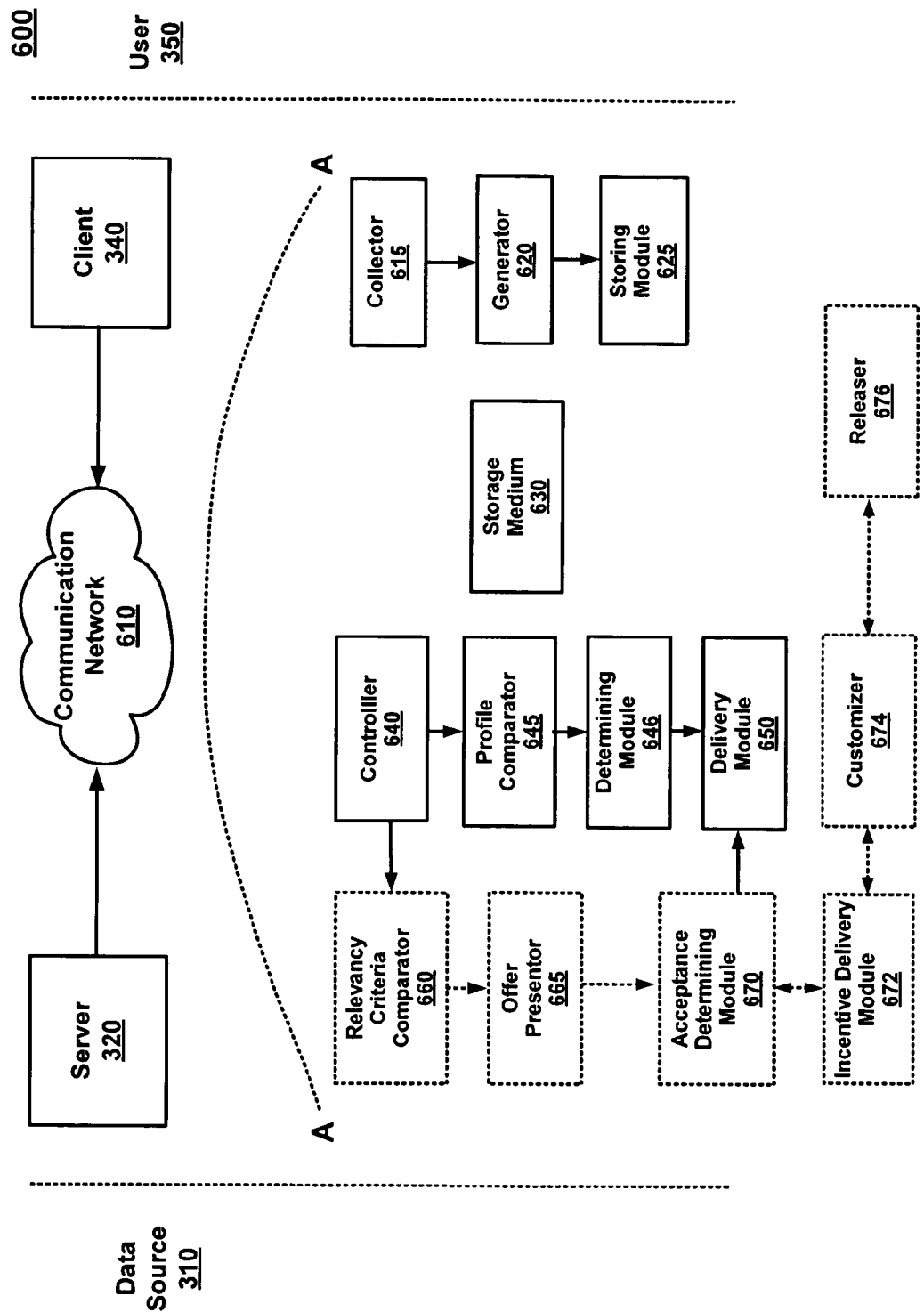
FIG. 6 is a block diagram of a system that is capable of targeted data delivery between a data source and a client, in accordance with one embodiment of the present invention.

FIG. 6 is a block diagram of a system 600 for targeted data delivery, in accordance with one embodiment of the present invention. The system 600 is implemented within the data broadcasting network of FIG. 3, for example in one embodiment. As such, system 600 includes a data source 310, a server 320 that communicates with a client 340 through a communication network 610 (e.g., internet 330), and a user 350.

The remaining components of the system 600 are shown below the dotted line A-A. Representation of these components under dotted line A-A indicates that one or more of the components are located at the client 340, the server 320, or some other remote device communicating through the communication network with the server 320 and the client 340.

The system 600 includes a collector 615, a generator 620 and a storing module 625. The collector 615 collects user information about a user 350 from at least one electronic device that is associated with the user 350. In addition, the collector further includes a monitor for monitoring user activity on an electronic device associated with the user. The generator 620 generates a user profile based on the user information. In addition, the storing module 625 stores the user profile. As such, the user profile is used to achieve delivery of data (e.g., an advertisement) which is targeted to the user 340 based on the user profile without requiring a release of any of the user information in the user profile, in one embodiment.

In one embodiment, the collector 615, generator 620, and storing module 625 are disposed on an electronic device that is associated with the user. In another embodiment, the collector 615, said generator 620, and said storing module 625 are disposed on a remote electronic device that is separate from the electronic devices associated with the user.

In addition, the system 600 includes a storage medium 630. The storage medium stores the user profile associated with the user 350. In this way, information in the user profile is used to target the delivery of data to the user 350.

In one embodiment of the present invention, the system 600 also includes an offer transmitter (not shown). For example, the offer transmitter is located at the server 320, in one embodiment. The offer transmitter sends an offer soliciting delivery of the data to a controller 640 that has access to the user profile. In one embodiment, the broadcasting of the offer is implemented through client polling. Also, in one embodiment, the controller 640 is co-located with an electronic device that is associated with the user 350. In another embodiment, the controller 640 is located on a remote device that is separate from the electronic devices associated with the user 350 from which user information is collected.

The offer's query defines selection criteria for selecting targeted user profiles. In addition, the system 600 also includes a profile comparator 645. The profile comparator 645 determines if the user profile satisfies the selection criteria.

When the user profile satisfies said selection criteria, a delivery module 650 initiates the delivery of the data to the user 350. In one embodiment, the delivery module is configured to initiate delivery of the data to an electronic device associated with the user, where user information is collected from the electronic device. In another embodiment, the delivery module is configured to initiate delivery of the data to an electronic device that does not collect user information.

As shown in FIG. 6, the system 600 also includes optional components, as follows: the relevancy criteria comparator 660, the offer presenter 665, and the acceptance determining module 670. The relevancy criteria comparator 660 determines if the offer satisfies a user selected relevancy criteria. That is, in one embodiment, the relevancy criteria comparator 660 determines if a bid price set by the data source 310 included in the offer meets or exceeds an ask price defined by the user as the user selected relevancy criteria.

In addition, the system includes an offer presenter 665 for presenting an offer to an electronic device associated with the user for delivery of the data to the user. The offer is presented when the user profile satisfies the selection criteria. In another embodiment, the offer presenter is configured to release a subset of the user information.

In addition, the system includes an acceptance determining module 670. The module 670 is able to determine if the offer has been accepted. In one embodiment, acceptance of the offer for delivery of data authorizes the release of a subset of the user information used to determine if the user profile satisfies the selection criteria. A releaser 676 releases the subset of information upon receipt of authorization by the user.

In one embodiment, on delivery of the data, an incentive delivery module 672 delivers an incentive to the user, or to a data distributor that forwards the query, or some combination of the two.

Also, in another embodiment, the system 600 includes a customizer 674. The customizer 674 customizes the data delivered to the user. More specifically, the data is customized using the user information.

Section 2: Method and System for Targeted Data Delivery from the Standpoint of the User Layer Embodiments of the present invention in section 2 are described from the standpoint of the user layer. For example, the user layer is located below line D-D in FIG. 5. As such, description of the targeted delivery of data is described below from the standpoint of the user layer.

Figure 7:
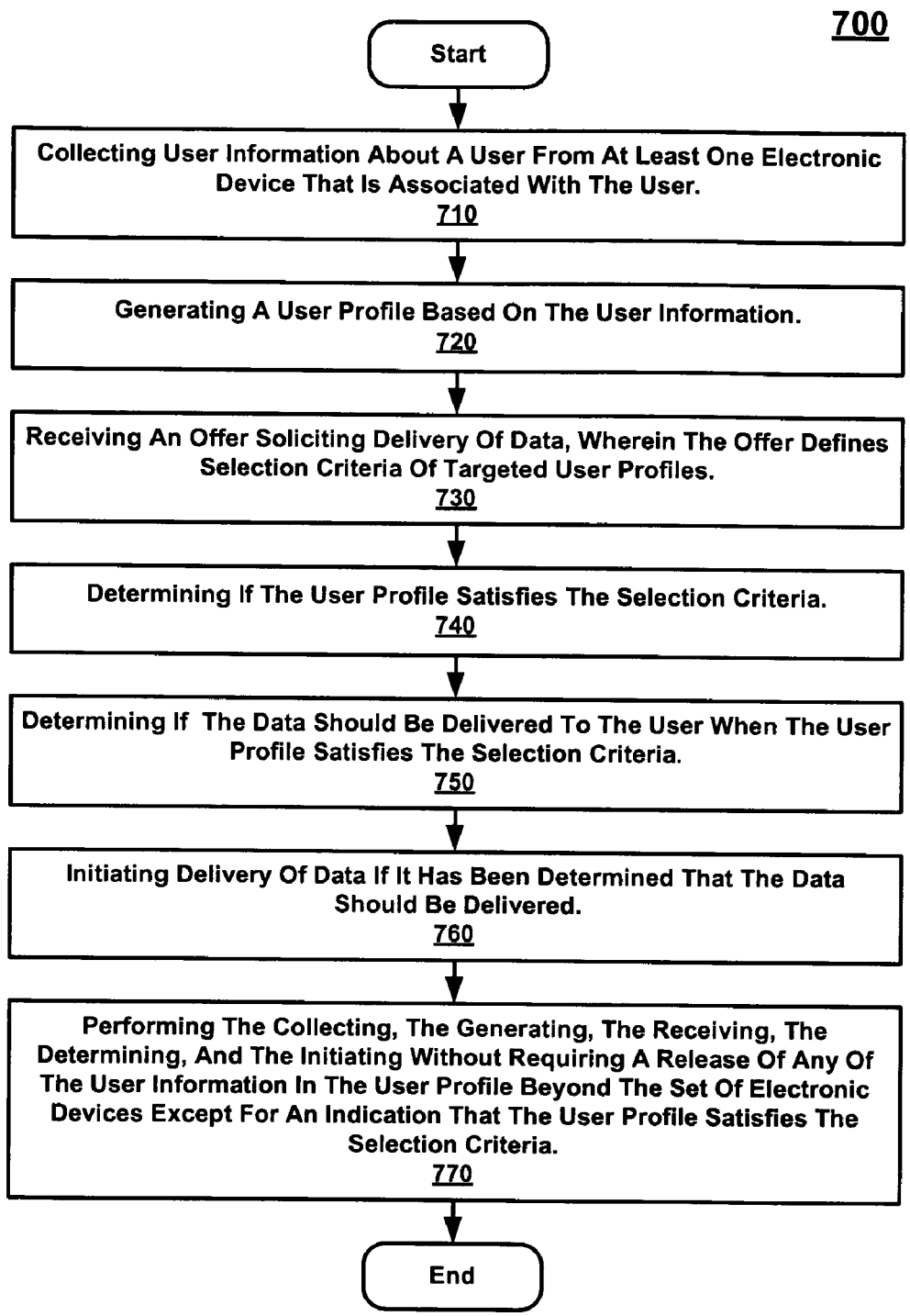
FIG. 7 is a flow diagram illustrating operations in a computer implemented method for targeted data delivery taken from the standpoint of a user layer, in accordance with one embodiment of the present invention.
Figure 8:
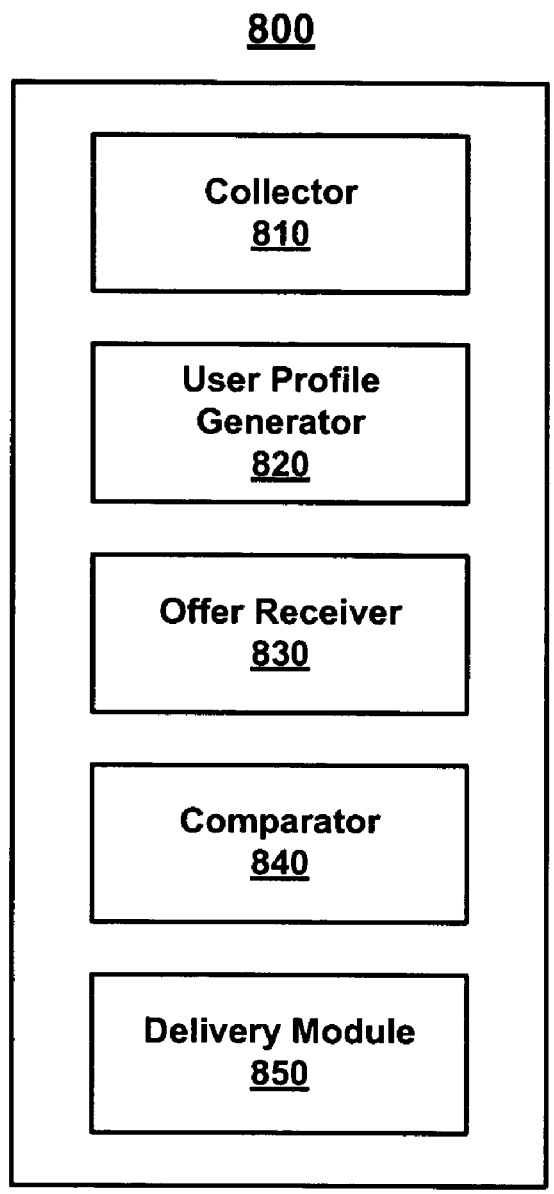
FIG. 8 is a block diagram of a system that is capable of targeted data delivery from the standpoint of a user layer, in accordance with one embodiment of the present invention.

FIGS. 7 and 8 in combination illustrate a method and system for the targeted delivery of data, in embodiments of the present invention. More specifically, FIG. 7 is a flow diagram 700 illustrating operations performed in a method for targeted data delivery, in accordance with one embodiment of the present invention. In addition, the components of the system of FIG. 8 are capable of implementing the method of FIG. 7, in accordance with one embodiment of the present invention.

In FIG. 7, the operations performed in flow diagram 700 are performed locally at the user layer of FIG. 5, in the present embodiment. Similarly, in FIG. 8, components of system 800 perform the operations of FIG. 7 and are located at the user layer. That is, system 800 is located entirely at the user layer, and is controlled by the user without any outside intervention. For example, system 800 is implemented entirely within the targeting mechanism 571 of the electronic device 575 located at the user layer to ensure privacy protection of the user's information.

In addition, continuing with FIG. 5, the user profile B is located at the electronic device 575, in one embodiment. As such, privacy protection of the user's information stored in user profile B is controlled by the user. In this way, the targeted delivery of data is implemented without requiring the release of any user information beyond or outside of the user layer. That is, the present embodiment is configured such that use of the user information for targeting purposes is limited to the user layer. As such, the user exercises tight control over the use and release of user information during the targeted delivery of data.

Operations associated with the components of system 800 are implemented in hardware or software implemented within an electronic device from which the user information is collected. In another embodiment, the components of system 800 are implemented within an electronic device other than the electronic device from which the user information is collected.

In still other embodiments, one or more of the components of system 800 are located remotely from the devices associated with the user. That is, one or more of the components of system 800 are located remotely from the user layer of FIG. 5. However, in one such embodiment, to ensure protection of user information, secure communication with the remotely located system 800 is employed.

Returning to FIG. 7, at 710, the present embodiment collects user information about a user from at least one electronic device that is associated with the user. That is, user information describing characteristics of the user is collected from one or more electronic devices comprising a set of electronic devices that is associated with the user. More specifically, each of the set of electronic devices are located below line D-D within the user layer of FIG. 5. As shown in FIG. 8, the collector 810 collects the user information. In the present embodiment, the components of the system 800 including the collector 810 are located at the user layer of FIG. 5, although in other embodiments, the collector 810 is located at other layers of FIG. 5.

The user information is collected from one or more electronic devices associated with the user. That is, any electronic device from which useful information can be collected about the user for purposes of targeting the user for the delivery of data is used. For example, electronic devices from which user information is collected includes, but is not limited to, the following: PC, printer, cell phone, pagers, household appliances, global positioning satellite (GPS) devices, television, personal digital assistant (PDAs), digital cameras, video recorders, cable set-top boxes, etc.

The user information includes characteristics that help to identify the user for the targeted delivery of data. These characteristics include personal information associated with the user, behavioral characteristics exhibited by the user, machine configuration for electronic devices of the user, etc.

In one embodiment, the user information is collected in the background of the electronic devices. That is, the user information is automatically collected while the electronic devices are operating. The user need not start, nor be acutely aware of, the collection of user information, in one embodiment. It should be noted that in accordance with embodiments of the present invention, even though the collection of user information is operating in the background, this collection occurs with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

In one embodiment, personal information is collected for purposes of targeting the user for the delivery of data. For example, the user's name, sex, income, address, zip code, education level, etc. are collected. Many of these personal items of information are collected directly, or indirectly through inference. For example, the direct collection of personal information is collected from registration forms the user filled out and registered using the various devices associated with the user. In other words, in embodiments in accordance with the present invention, these personal items of information are located within definable spaces of the various electronic devices associated with the user.

In other embodiments, the collection of personal information is achieved through inference. For example, the stated income level may not be found in any of the various electronic devices associated with the user. However, based on a zip code that has been previously collected, a stated income level is inferred. That is, it is inferred that a user with a zip code associated with a middle class neighborhood earns approximately a middle class income.

As another example, the sex of the user is inferred through various means. In one case, the types of URLs visited provide a clue as to the sex of the user. For example, visits to URLs tailored to cosmetics may indicate that the user is a female. In another case, the name of the user may provide an indication as to the sex of the user.

In still other embodiments, the collection of user information includes behavioral characteristics of the user when interacting with the various electronic devices associated with the user. For example, behavioral characteristics collected as user information include URL histories, usage of devices, usage of applications, etc.

In one embodiment, the user's search behavior over the internet as a behavioral characteristic is monitored for purposes of targeted data delivery. For example, raw data is collected to include the various URLs visited by the user. That is, the user information will identify which URL the user has visited, such as news groups, chatrooms, blogs, car URLs, printer URLs, etc.

For purposes of illustration only, an example is provided for reference throughout the application in which a user is interested in purchasing an inkjet printer. The user performs some research over the internet and visits a URL associated with company A for purposes of researching an inkjet printer provided by company A. For purposes of collecting behavioral characteristics, the present embodiment is capable of collecting the fact that the user has visited the URL associated with company A.

In addition, collector 810 of FIG. 8 collects various other raw pieces of information related to web browsing as behavioral characteristics. For example, collector 810 collects timing information in one embodiment in accordance with the present invention. That is, collector 810 collects a timestamp that identifies when a particular URL was visited (e.g., time and date). This is useful in determining how many times a particular URL was visited and with what frequency. Recent activity for a particular URL may indicate great interest in the subject associated with that URL.

In addition, various search terms used by the user are collected, by collector 810, as a behavioral characteristic. That is, in the above example of a user researching printers, the search term "inkjet" is collected for targeting purposes. This is valuable to an inkjet manufacturer who is targeting users who are in the market of purchasing an inkjet printer.

In one embodiment, post processing of the raw data collected by collector 810 is necessary to determine behavioral characteristics. It may not be enough to collect that the user has visited a URL. Hence, embodiments in accordance with the present invention implement various post processing techniques to obtain further identifying characteristics of the user. The techniques discussed below show examples of post processing for illustrative purposes only and are not intended to be exhaustive.

In one embodiment in accordance with the present invention, post processing of the raw data determines if the user really visited the URL. For example, it is valuable to know whether the user just visited the URL briefly or interacted with the URL. An examination of whether the user scrolled through a page on the URL indicates how long and how interested the user was in that URL. This behavioral tracking indicates that the user not only visited the URL, but was also interested in the URL. As such, this user information is more accurate and relevant for use in targeted data delivery.

In addition, post processing of URL data indicates that the URLs visited recently include specific types of URLs. For example, the URL data indicates that the user was visiting URLs associated with car manufacturers and printer manufacturers. This post processing indicates that the user is interested in purchasing both a new car and a new printer. As such, car manufacturers and also printer manufacturers utilize this information for targeted delivery of their URLs.

Other post processing techniques are also be useful in collecting user information. For example, in one embodiment, a spelling corrector is implemented to obtain a true representation of data. Text in e-mails or text messages from handheld devices are riddled with incorrect spellings in the interest of time. A spelling corrector in the post processing stage corrects the spelling so that accurate and relevant user information is collected.

In another embodiment, logs of e-mails are collected by collector 810 when performing the operation described at 710 of FIG. 7. That is, in one embodiment in accordance with the present invention, collector 810 collects a log of sent and received e-mails for purposes of targeted data delivery. Post processing of the e-mails is required to obtain useful user information. For example, a filtering of the text used in the e-mails identifies that the user is in the market for inkjet printers. Other text identifies other behavioral characteristics of the user, such as being a fan of a particular baseball team, etc. In still another embodiment, post processing of downloaded web pages is preformed by scanning text content of downloaded web pages using word frequency statistics as a possible input source.

Collector 810 of the present embodiment is also well suited to collecting behavioral activity that is not related to browsing the Internet. For example, in one embodiment, information specifying the use of various devices is collected by collector 810. That is, a user utilizes a number of electronic devices, such as printers, cameras, cell phones, etc. Use of these devices is valuable in targeted data delivery to manufacturers of those devices since the user may be interested in purchasing another similar electronic device or accessory related thereto.

In addition, in various embodiments in accordance with the present invention, collection of location specific information related to the use of electronic devices is important. For example, the geographic locations of an electronic device indicates the location of the user of that electronic device. User information collected by collector 810 from a user identifies that that user travels a particular route when commuting to work. Using such information, it is determined that the user's route passes by a particular supermarket that is also located close to the user's home. The user information also includes how many times the user has passed the particular supermarket. In such an embodiment, this information is used to target that user for the delivery of advertising (e.g., coupons) enticing the user to use the nearby and frequently passed supermarket.

Other information, that is collected by collector 810 when performing the operation described at 710 of FIG. 7, might indicate that a user stores digital photographs on an electronic device (e.g., a PC). In addition, user information indicates that the user prints photographs from those digital photograph files. Using the previous example of a user in the market for an inkjet printer, a particular printer manufacturer targets the delivery of advertising for a color inkjet printer to the user who stores and prints digital photograph files using a competitor printer.

Still other information that is collected by the collector 810 is the type of music that the user listens to, in one embodiment. Music tracks typically include additional information that identifies the band, artist and type of music that the electronic device is playing. This information also is collected and be associated with the user.

In addition, user information that is collected by collector 810 includes hardware configuration of the electronic devices associated with the user. For example, the particular machine configurations of the various electronic devices associated with the user are collected. That is, the particular models of the various devices, peripheral components, drivers installed, interconnect connections (e.g., DSL, cable, telephone), and other associated hardware is collected. As such, the user information includes the model and date of manufacture of the printer associated with the user. These various hardware configuration information indicate when the user may need a new printer cartridge.

In still other embodiments, the software configuration is collected by collector 810 for purposes of targeted data delivery. That is, the types and versions of applications that are loaded onto a particular electronic device (e.g., PC) is collected. In addition, the usage of those types of applications is collected by collector 810. For example, information that indicates a software configuration including a high level publishing application and additional information indicating high use of that application are useful in targeting that particular user for printers that are suitable for desktop publishing.

Additionally, user information indicates how often a particular application crashes in one embodiment. If a particular application crashes frequently, a manufacturer of a competitor application uses this information to target the delivery of advertising data to the user whose application frequently crashes.

Still other forms of collection of user information is possible. For example, in one embodiment, the collection of user information is achieved through voice over internet protocol (VOIP) technology. That is, voice recognition software or VOIP technology is implemented to collect user information related to a user. As an example, the VOIP technology indicates that a user is interested in taking a vacation, in one embodiment. A travel agency uses this information to target the delivery of trip advertising to this particular user.

Other embodiments of the present invention are able to perform postprocessing of the raw data collected from the electronic devices associated with the user to identify which user is associated with the data. For example, multiple users may have access to an electronic device (e.g., a PC). The collection of information associated with the electronic device is most useful if the data is associated with a particular user.

Various post processing mechanisms are employed to identify the user. For example, keystroke rhythm and timing are analyzed to determine which user is currently using the electronic device. One user is identified as having a quick rate of keystroke typing in one embodiment. Another user is identified as having a slower rate of keystroke typing. In addition, users are identified based on the rhythms of the keystroke typing. A smooth rhythm indicates one user, while a choppy rhythm indicates another user.

In still other embodiments, behavioral characteristics of users are used to identify users using other types of electronic device. This is helpful in an environment where multiple users are interacting with the same set of electronic devices. As such, behavior exhibited to a particular user is correctly associated with that user.

Now returning to FIG. 7, at 720, embodiments in accordance with the present invention generate a user profile based on the user information collected in 710. Correspondingly, as shown in FIG. 8, user profile generator 820 implements the operation described at 720 of FIG. 7. As will be described below the user profile generator 820 formats the user profile to enable the use or selection of particular characteristics for purposes of targeting users exhibiting those characteristics. In the present embodiment, the components of the system 800 including the user profile generator 820 are located at the user layer of FIG. 5. More specifically, in one embodiment in accordance with the present invention, the user profile is generated by the user profile generator 820 that is contained within the targeting mechanism 571.

In one embodiment in accordance with the present invention, user profile generation by the user profile generator 820 is only performed with the explicit authorization of the user. That is, the user profile generator 820 functions under the sole control of the user. As such, in one embodiment, the user is capable of requesting that user information not be collected. In another embodiment, the user is capable of deleting the user profile, or transferring the user profile to another location, or taking other actions as controlled by the user, etc.

In another embodiment in accordance with the present invention the user profile is generated by an entity that functions as a proxy to the user. That is, the user specifically authorizes the proxy to generate the user profile and to perform operations associated with the targeted delivery of data. For example, an Internet Service Provider (ISP) functions as a proxy, in one embodiment.

As such, wherever the user profile is generated and maintained by a user profile generator 820, the user has confidence that the user information in the user profile is not compromised and that the user has control over that user information. For instance, whether the user profile generator 820 is located on the hard drive of the electronic device associated with the user, or the user profile is maintained at the ISP, or on a stored database remotely located from the user, the user profile generator 820 is still thought of as an extension of the user's electronic device, since user information is not required to be released.

Furthermore, for purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. As described previously with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

In one embodiment, the user profile includes attributes that are associated with the user information. As such, the attributes represent the characteristics (e.g., behavior, personal information, machine configuration, etc.) associated with the user. That is, user information collected by collector 810 is transformed into an attribute by the user profile generator 820. For example, an attribute indicates a URL that has been visited. Another attribute indicates search terms. Still other attributes indicate characteristics particular to a user, as previously described.

In another embodiment, the user profile generator 820 formats these attributes by grouping the attributes into one or more databases. That is, the attributes are stored in a database by the user profile generator 820. For example, the database includes attributes indicating the URLs visited. The same or another database includes all search terms used. In addition, attributes in the database expire after a period of time. As such, one or more databases include all the attributes associated with user information identifying characteristics of the user. These attributes are formatted to be included in a particular database for searching. Thus, the attributes are used for the targeted delivery of data.

In the present embodiment, the database storing the user information is located at the user layer as described in FIG. 5. For example, the user profile B is shown stored in the electronic device 575 at the user layer. In such an embodiment, control over the user information associated with the database is tightly monitored by the user if necessary.

In other embodiments of the present invention, the user profile generator 820 stores the user profile at devices remote from the user layer. In one such embodiment, the user profile generator 820 stores the user profile at the data distributor layer (e.g., user profile N), or some location between the data distributor layer and the user layer (e.g., user profile A). The protection of privacy of the user information is paramount even with the remote storage of the database of user information. Embodiments in accordance with the present invention ensure a user's privacy by implementing various secure communication means, such as communication over a secure socket layer, communication using encryption, and other secure communication approaches well known in the art.

In still other embodiments, the database of user information corresponding to the user profile is split between various locations. In such embodiments, the user profile generator 820 stores sensitive user information in secure locations at the user layer, or data distribution layer, or some layer in between. Less sensitive user information (e.g., public information regarding the user) is stored by the user profile generator 820 in less secure areas in various locations (e.g., a general database at the data distributor 520 of FIG. 5).

Also, the user information in the user profile is used to automatically fill out electronic forms, in one embodiment. That is, the user information is parsed to select various terms that are applied to an electronic form.

In one embodiment, the user has editing capabilities with regards to an associated user profile. That is, the user adds additional information to the user profile and subtracts information from the user profile. However, the editing capability is limited to prevent user fraud. For example, user editing of profiles is limited to prevent a user from lying about information in the user profile in order to increase chances for satisfying selection criteria. In such an embodiment, the user is trying to accumulate incentives tied to the delivery of data without truly having an interest in that data. That is, the user is trying to make money by automatically trying to satisfy as many queries as possible. Prohibiting the editing of critical features of the user profile prevents misdirected and fraudulent targeting of users.

As a further example, in another embodiment of the present invention, the user is allowed to add or edit information in certain marked fields, such as "name" or "address." However, the user is restricted from editing information in most fields (e.g., URLs visited).

In still another embodiment, fields are editable by users in a limited fashion. That is, the present embodiment allows changing most fields to "not telling" rather than simply deleting their contents. A "not telling" value matches neither positive criteria nor negative criteria. As such, this prevents a user from hiding the fact that the user did not visit company C. Thus, the user is prevented from falsely claiming an incentive for an inkjet advertisement from company C, for example.

At 730, the present embodiment receives an offer soliciting delivery of data. More specifically, in one embodiment, the offer includes a query that defines selection criteria of targeted user profiles. In other embodiments in accordance with the present invention, the offer includes the location of the data to be offered for delivery or the data itself, and optionally an offer of compensation for taking delivery. Additional information is optionally included within the offer, such as an expiration period, etc. As shown in FIG. 8, the offer receiver 830 is used to receive the offer. In the present embodiment, the components of the system 800 including the offer receiver 830 are located at the user layer of FIG. 5. To put it into the context of FIG. 5, the offer is received at the electronic device 575 that includes the offer receiver 830 contained within the targeting mechanism 571. In one embodiment in accordance with the present invention, the offer is received by the offer receiver 830 from the data distributor 520 through the broadcast layer.

The offer is used for the solicitation of the delivery of data, in one embodiment. That is, the query within the offer is used to determine if the user receiving the offer is a user who should be targeted. The offer is not specifically targeted to particular users. Instead, the offer is forwarded to a broad group of users. Thus, the information contained within the offer is used to select and target the delivery of data to particular users, as will be described further below.

In the present embodiment, the query included within the offer includes selection criteria used for targeting one or more user profiles. That is, the selection criteria is used to characterize particular users to whom the data is targeted. As such, the selection criteria contains certain characteristics that are important in distinguishing the targeted user profiles from other user profiles. In this way, delivery of data is targeted to particular users.

In one embodiment, the selection criteria contains positive characteristics of the targeted user. For example, these positive characteristics might be actual search terms used, actual URLs visited, actual income, etc.

In other embodiments, the selection criteria contains negative characteristics of the targeted user. For example, these negative characteristics might be search terms that are not used in conjunction with search terms that are used, URLs that have not been visited in a period of time, etc.

In one embodiment, the query included within the offer is represented as a Boolean expression. The Boolean expression includes a number of characteristics. The characteristics in the expression are connected with "and," "or," and "not" Boolean operands. That is, the query includes a number of selection criteria connected with the above mentioned operands. In another embodiment, the query is represented as an arithmetic expression.

Using the previous example of a user in the market for an inkjet printer, the selection criteria may help target or identify a user who is interested in purchasing an inkjet printer. For example, the selection criteria contains characteristics that define a user who has, at least twice, spent time on the URLs of company A and company B, both of whom manufacture inkjet printers, with pages from each domain containing the term "inkjet" and "printer," but who has never visited the URL of company C.

In addition, in another embodiment, to prevent fraud where users try to satisfy as many selection criteria as possible in order to receive incentives, the query is conditioned in favor of users who actually have a favorable behavior. For example, in the case of targeted advertising, the query is directed to users who actually make purchases of an advertised product (e.g., a cosmetic line). In other words, the selection criteria is so specific that it is unlikely that a fraudulent user can meet all of the specific criteria automatically.

Returning to FIG. 7, at 740, the present embodiment determines if the user profile satisfies the selection criteria. That is, the user profile is compared against the selection criteria. As shown in FIG. 8, the comparator 840 is used to access the user profile and to make the determination of whether the user profile satisfies the selection criteria in the query. In the present embodiment, the components of the system 800 including the comparator 840 are located at the user layer of FIG. 5. To put it into the context of FIG. 5, the determination of whether the user profile satisfies the query is made at the electronic device 575 that includes the comparator 840 contained within the targeting mechanism 571.

In embodiments in accordance with the present invention, the determination by the comparator 840 that a user's profile satisfies the selection criteria is made without requiring a release of the user information. Specifically, the user profile satisfies the selection criteria defined in the query. In other words, the determination that the user should be targeted for the delivery of data is made in such a way that the user has control over the user information utilized, and the operations performed, by comparator 840 in making the determination that the user is a targeted user. As such, this targeting of the user is performed without requiring a release of the user information.

In accordance with one embodiment of the present invention, the determination that the user is targeted for the delivery of data is made by the comparator 840 at the electronic device 575 associated with the user. That is, the components of system 800 that operate to perform the targeted delivery of data are located on the electronic device 575 that the user controls. In addition, the user profile and the information contained therein are also stored at the electronic device 575 that is in the control of the user. As such, the targeting of the user is made without requiring any release of the user information outside of the user layer of FIG. 5. More specifically, in the present embodiment, the targeting of the user is made entirely within the electronic device 575, and the user information used to target the user never leaves the electronic device 575. As such, the user is anonymously targeted for the delivery of data.

In one such embodiment as mentioned above, components in system 800 are stored at an electronic device in the control of the user. However, other embodiments of the present invention are well suited to storing the user profile and components of system 800 at a location that is remote from the user and in a secure manner such that the user information is still not required to be released. That is, the determination that the user profile satisfies the selection criteria using information in the user profile is made in a secure location that does not require a release of the user information.

For example, referring back to FIG. 5, the targeting mechanism 581 and the user profile N is located at the data distribution layer which is outside of the user layer. However, the transfer of the user information to the data distribution layer for storage in user profile N is made over a secure data link 587 (e.g., a secure socket layer) that ensures that the user information in user profile N is not released.

Moreover, the use of the information by the targeting mechanism 581 to make the determination of whether the user profile satisfies the selection criteria is made without requiring the release of the user information outside of the targeting mechanism. More specifically, the user N is targeted without requiring a release of information outside the data distribution layer. Since the data distribution layer is a secure layer, the user profile N, the targeting mechanism 581, and the information used by the targeting mechanism 581 to determine that user N is targeted for the delivery of data will not leave the secure data distribution layer. As such, user N is targeted for the delivery of data without requiring a release of information.

As such, embodiments in accordance with the present invention are capable of the targeted delivery of data without requiring a release of user information. For purposes of the present application, the term "without requiring a release of any of said user information in said user profile," or any substantially similar term or phrase, is intended to refer to the restriction that the user information is not released outside of the system that is implementing the delivery of data. More specifically, for purposes of the present application the term "without requiring a release of any of said user information in said user profile," or any substantially similar term or phrase, is intended to refer to the restriction that the user information is not required to be released beyond a data distribution layer as denoted by line A-A of FIG. 5. As described previously with relation to FIG. 5, embodiments of the present invention do not require the release of user information beyond particular layers that define the system. In one embodiment of the present invention, the release of user information does not occur beyond a data distribution layer as denoted by line A-A. In another embodiment of the present invention, the release of user information does not occur beyond a device that is located between a user layer and the data distribution layer, as denoted between lines C-C and D-D. In still another embodiment of the present invention, the release of user information does not occur beyond a user layer denoted by line D-D.

For example, in one embodiment, the targeting mechanism, a subsystem of the system that is implementing the delivery of data is implemented within the user layer below line D-D of FIG. 5. That is, the determination that a user is a targeted user for the delivery of data is implemented within this layer. As such, user information is not released to entities outside of the user layer.

In another embodiment, the targeting mechanism is implemented within the data distribution layer between lines A-A and B-B. That is, the targeting of users is implemented within this layer. As such, user information is not released to entities outside of the data distribution layer. It should be noted however, that even when at least one of the components of FIG. 8 resides within the data distribution layer (e.g., at data distributor 520), embodiments in accordance with the present invention do not require a releasing of the user information. That is, although user information may be utilized by at least one component of FIG. 8 at the data distribution layer, user information is still securely protected and is not divulged to entities outside of the system implementing the targeted delivery of data.

In still another embodiment, the targeting mechanism is implemented within a layer between the data distribution layer and the user layer of FIG. 5. For example, the system is implemented at the system 560 that is located within a layer defined between lines C-C and D-D. That is, the targeting of users is implemented within this layer. Again, in the present embodiment user information is not released to entities outside of system 560 that is located at the layer defined between lines C-C and D-D.

In still another embodiment, the targeting mechanism is implemented within a combination of the layers of FIG. 5 below line A-A. That is, the targeting of users is implemented within these layers. As such, user information is not released to entities outside of these layers.

For example, a manufacturer (e.g., data source 511) who makes a product, widget A, can market widget A to a particular group of customers. This group of customers is a targeted group. The manufacturer defines the characteristics exhibited by the targeted group of customers generally, and these characteristics are used as selection criteria. That is, the manufacturer is not specifically targeting an identifiable customer, but a group of customers that happen to exhibit common characteristics.

Thereafter, in accordance with an embodiment of the present invention, user information is used by a targeting mechanism (e.g., 561, 571, or 581) to determine if an associated user (e.g., user A, B or N) meets those characteristics. More specifically, the present embodiment determines if the user profile satisfies the selection criteria without requiring a release of user information. As such, in accordance with the present embodiment, the targeting mechanism (e.g., 561, 571, or 581) waits to receive the selection criteria, and then at that point determines if the user is one of the targeted group by determining if the user profile satisfies the selection criteria. At no point is the user information required to be released, especially to the manufacturer of widget A, the data source 511.

As such, in such an embodiment of the present invention user information that a particular user has exhibited particular characteristics (e.g., performed specific operations on a PC) that indicates potential interest in widget A is not divulged to the manufacturer of widget A. Instead the manufacturer perceives that there may be users who are interested in widget A, and perceives that these targeted users exhibit perceived characteristics. These perceived characteristics are used to select targeted users using the targeting mechanism.

In contrast to embodiments in accordance with the present invention, conventional spyware routinely divulges confidential data to third party sources, thereby compromising the privacy of unsuspecting individuals. For example, a common technique in conventional spyware is to place an application on a user's PC to spy on an individual's behavior and activity. Typically, the user does not want these spying applications loaded onto the user's PC. However, the spyware is commonly and surreptitiously loaded onto the user's PC with authorization that is fraudulently or deceptively obtained. For example, the user unknowingly accepts the spyware onto the system when downloading desired files or applications that unfortunately come packaged with the spyware. That is, spyware is used to spy on information, and spill that information to third party advertisers so that they can target individuals with unwanted advertisements (e.g., unwanted e-mails). As such, spyware is incapable of providing the targeted delivery of data without requiring a release of user information, as provided in accordance with embodiments of the present invention.

For example, a spyware company would gather information for a plurality of individuals, ship this information to a remote server, create logical representations of each of these individuals, and then market this information to advertisers. The advertisers can then see which individuals can be targeted for specific advertisements.

In a more refined approach, a spyware company would gather information for an individual, ship this information to a remote server, create a logical representation of the individual, come to a conclusion that the individual is in the market for an diamond ring, and markets that individual to diamond merchants. That is, the spyware company divulges information about the individual so that interested diamond merchants can directly contact that individual.

In addition, in direct contrast to embodiments of the present invention, conventional spyware commonly gathers data about the individual and then transfers the data to a remote site for further processing. In the case of spyware, personal data is often transferred without the individual even knowing that the transfer is happening. The transfer frequently occurs in the background when the individual is connected to the internet. During the connection, the individual's PC is communicatively coupled to a remote server for the transfer of the personal data deleteriously gathered by the spyware. This personal data is then used at a remote location without knowing authorization by the individual.

On the other hand, in embodiments of the present invention, the user is targeted for the delivery of data in a manner that ensures the protection of the user's privacy. That is, the user information in the user profile is protected even though it is used to determine if the user profile satisfies the selection criteria.

The protection of the user information is particularly important if the user has sensitive user information stored in a user profile that the user never wants released. For example, the user profile of a user includes sensitive medical information that might be particularly private or embarrassing to the user. The user may have been doing research for a medical condition inflicting the user. As such, the user may not want this information released to an outside source for fear of being identified as someone having such a condition or affliction.

Embodiments of the present invention are able to protect the user's privacy, especially the fact that the user has recently searched web sites that are directed to the user's condition, and also anonymously target the user for the delivery of data. That is, the user is targeted for the delivery of data without requiring a release of user information. In such an embodiment, the user continues to freely conduct research for the user's medical condition, and also be targeted for data related to the conditions (e.g., advertisements for medication treating the user's condition). Furthermore, the user can be targeted for such data without any concern that user information will be traced back to the user indicating that the user has recently visited web sites related to the user's condition.

As another example of the benefits conferred by embodiments in accordance with the present invention, using the previous example of a user in the market for an inkjet printer, the user may not want information released indicating that the user is interested in an inkjet printer manufactured by company C. For example, the user may work for company A which also manufactures inkjet printers. For whatever reason, however the user favors inkjet printers from a competitor, company C. If the user information were to be leaked that could identify that the user is interested in an inkjet printer from company C and that information were obtained by company A, then the user's standing within company A may be severely compromised. Fortunately, embodiments of the present invention allow the user to continue to freely search for inkjet printers from company C. In addition, these embodiments allow that fact to be collected as user information. As such, this user can be targeted for delivery of data related to inkjet printers from company C under a system that protects the user's privacy, since there is no requirement that user information be released for the targeted delivery of data.

Moreover, embodiments of the present invention are well suited to attracting users to a system or network that performs the targeted delivery of data. Normally, a user may be reluctant to participate in a system that may be construed as secretly collecting information related to that user for fear that the information may be released to others. However, embodiments of the present invention are able to collect user information in way that ensures that the user information is not required to be released for the targeted delivery of data. That is, the user knows that the user information is used only for the targeted delivery of data. As such, embodiments of the present invention are able to attract users to the system of targeted data delivery, especially if enticed with incentives for the delivery of data.

Moreover, in embodiments in accordance with the present invention, user information is only released upon explicit authorization by the user. That is, in embodiments in accordance with the present invention user information is required to be released in order for the user to receive data and any corresponding incentives. However, the user information is only released to the data distributor (e.g., distributor 520 of FIG. 5) in a secure fashion and the user information is not further released beyond the data distributor on an individual basis, in one such embodiment. The data distributor releases user information in an aggregate fashion that does not identify any users. As such, the user's privacy is ensured as the user information is never identified with the user, and is never released in a manner that connects the user to the user information.

Returning to 740 of FIG. 7, in one embodiment, satisfaction of the selection criteria is performed through a vector matching process. More specifically, the vector matching process is represented by a function $F(x)$, where x is the query. For example, x is the vector defining the selection criteria of the target profile described previously. Although various embodiments are described using a vector matching process for clarity and brevity, other embodiments are well suited to other techniques that are capable of determining whether the user profile satisfies the selection criteria.

In one particular implementation, the query, x, is a vector that takes all of the words of web pages that are theoretically visited by a targeted user. The vector is over a high dimensional space.

In one embodiment, the function $F(x)$ is a dot product of the query vector and the user profile in vector form. Various techniques are used to determine if the user profile satisfies the selection criteria as defined in the query. For instance, in one case, if the dot product exceeds a threshold value, then the user profile satisfies the selection criteria.

Also, if the dot product is within a predetermined numerical range, this indicates a highly valued match. That is, the user profile closely matches or satisfies the selection criteria. This rating of matches is used to determine the appropriate incentive to be paid to the user for the delivery of data, as will be described more fully below in relation to 910 of FIG. 9. That is, in accordance with embodiments of the present invention a highly valued match will be paid a greater incentive than a lower valued match.

In addition, a selection of dot products with random vectors is taken. That is, the function $F(x)$ is a randomly generated function. It should be pointed out, that in other embodiments of the present invention, the function $F(x)$ is not a randomly generated function. In one embodiment, the randomly generated function can be used to select a targeted user. For example, the result of $F(x)$ provides numbers that compactly represent a user. This compact representation can be used to filter and determine if a user satisfies the selection criteria. In one embodiment, an inference module is used to determine if the compact representation satisfies the selection criteria.

In one embodiment, if the user profile does not satisfy the selection criteria in the query, the offer containing that query is kept for a period of time. That is, the offer is stored. For example, in one embodiment in accordance with the present invention the query is stored at the targeting mechanism 571 used for targeting the delivery of data. At a subsequent time, when the user profile has changed, the user profile is again compared to the selection criteria to determine if the user profile satisfies the selection criteria.

Returning to FIG. 7, at 750, the present embodiment determines if the data should be delivered to the user when the user profile satisfies the selection criteria, in accordance with one embodiment of the present invention. A determining module 646 makes the determination of whether the data should be delivered to the user. More specifically, in one embodiment, the determining module 646 presents the offer to the user through an electronic device of the set of electronic devices associated with the user. As such, the user can actively accept the offer for the delivery of the data. In one embodiment, the offer includes information that indicates which user information in the user profile will be released should the user accept delivery of the data. As a result, the data is delivered when the offer is accepted by the user, and conversely, the data is not delivered when the offer is not accepted by the user.

At 760 the delivery of data is initiated if it has been determined that the data should be delivered to the user. That is, the data is delivered after it has been determined that the user has accepted the offer for the delivery of data, in one embodiment. More specifically, the initiation of the delivery of data is achieved without releasing any user information in the user profile, except for an indication that the user profile satisfies the selection criteria. In addition, the performance of the collecting operation at 710, the generating operation at 720, the receiving operation at 730, the determining operation at 740, the determining operation at 750 and the initiating operation at 750 are performed without requiring a release of the user information in the user profile except for the indication that the user profile satisfies the selection criteria.

More specifically, the indication that the user profile satisfies the selection criteria is not required to be released beyond line A-A of the data distribution layer in FIG. 5, in accordance with one embodiment of the present invention. In one embodiment, the indication that the user profile satisfies the selection criteria does not provide any user information, and only informs that the user profile satisfies the selection criteria. In another embodiment, the indication that the user profile satisfies the selection criteria is limited to user information that is used to satisfy the selection criteria. As such, because the user profile is closely guarded to protect the privacy of the user and since the determination of whether the user profile satisfies the selection criteria is made in a secure location, user information is not required to be released beyond line D-D of the user layer of FIG. 5 for purposes of targeted delivery of data except for the indication that the user profile satisfies the selection criteria. Hence, as stated above, the user's privacy is protected in a system that is capable of targeted data delivery.

In another embodiment, the initiation of the delivery of data is achieved without releasing any user information in the user profile beyond the user layer. That is, in one embodiment, in determining if the user profile satisfies the selection criteria, user information is not required to be released beyond line D-D of FIG. 5. For example, an offer can be multicasted to a plurality of users. More specifically, the offer forwarded to an electronic device associated with a user includes the query and either the data, a link to the data, or some form of accessing the data. If no compensation is required, as soon as the user profile associated with the user satisfies the selection criteria, initiation of the delivery of data is achieved without releasing any user information in the user profile. That is, the determination that the user profile satisfies the selection criteria and the initiation of the delivery of the data to the user occurs entirely below line D-D of FIG. 5, and does not require any release of user information beyond line D-D of FIG. 5.

As shown in FIG. 8, the delivery module 850 initiates delivery of the data. In the present embodiment, the components of the system 800 including the user profile generator 820 are located at the user layer of FIG. 5. To put it into the context of FIG. 5, the initiation of the delivery of data is performed by the delivery module 850 which is contained within the targeting mechanism 571.

Various methods for initiating delivery of the data are implemented. In one embodiment, the message containing the query also contains a link to the data. As such, once the present embodiment determines that the user profile satisfies the selection criteria, the link is invoked to initiate delivery of the data to a display that is viewed by the user. For example, the data is stored at the data distributor 520 of FIG. 5. In one such embodiment, invoking the link activates the delivery of the data by the data distributor 520 to the user who invokes the link. In this way, the user readily receives the data targeted to that user.

In one embodiment, the data is delivered to the user via a display that is present on the electronic device associated with the user. The display is any display viewable by the user. In one embodiment, the display is on a PC from which user information is collected. In another embodiment, the display is on a device which performs the various functions for targeting delivery of data, such as system 800 of FIG. 8.

In still other embodiments, the display is on any device accessible by the user. That is, the device is a dumb display, which presents the data. For example, the display is a television.

In another embodiment, the data is delivered through a standard telephone communication network. For example, the data is faxed to a user. In another example, the user is directly called in a telemarketing system. That is, once the user is targeted, the user is contacted via phone. The data is automatically played back in a recording to the user, or a telemarketer converses with the user to discuss the data.

In still another embodiment, the data is delivered in the form of e-mails. That is, once the user is targeted, one or more e-mails containing the data is delivered to the user.

Also, in another embodiment the data is customized to the user. That is, before the data is delivered to the user, user information is used to tailor presentation of the data to the user. In the example of the inkjet purchase by a user, the data is customized with a comparison of an inkjet printer of Manufacturer C to inkjet printers of Manufacturers A and B. For instance customizing the data includes text promoting the benefits of an inkjet printer by Manufacturer C, as follows: "Reasons that an inkjet printer from Manufacturer C is superior to inkjet printers from Manufacturers A or C.".

Figure 9:
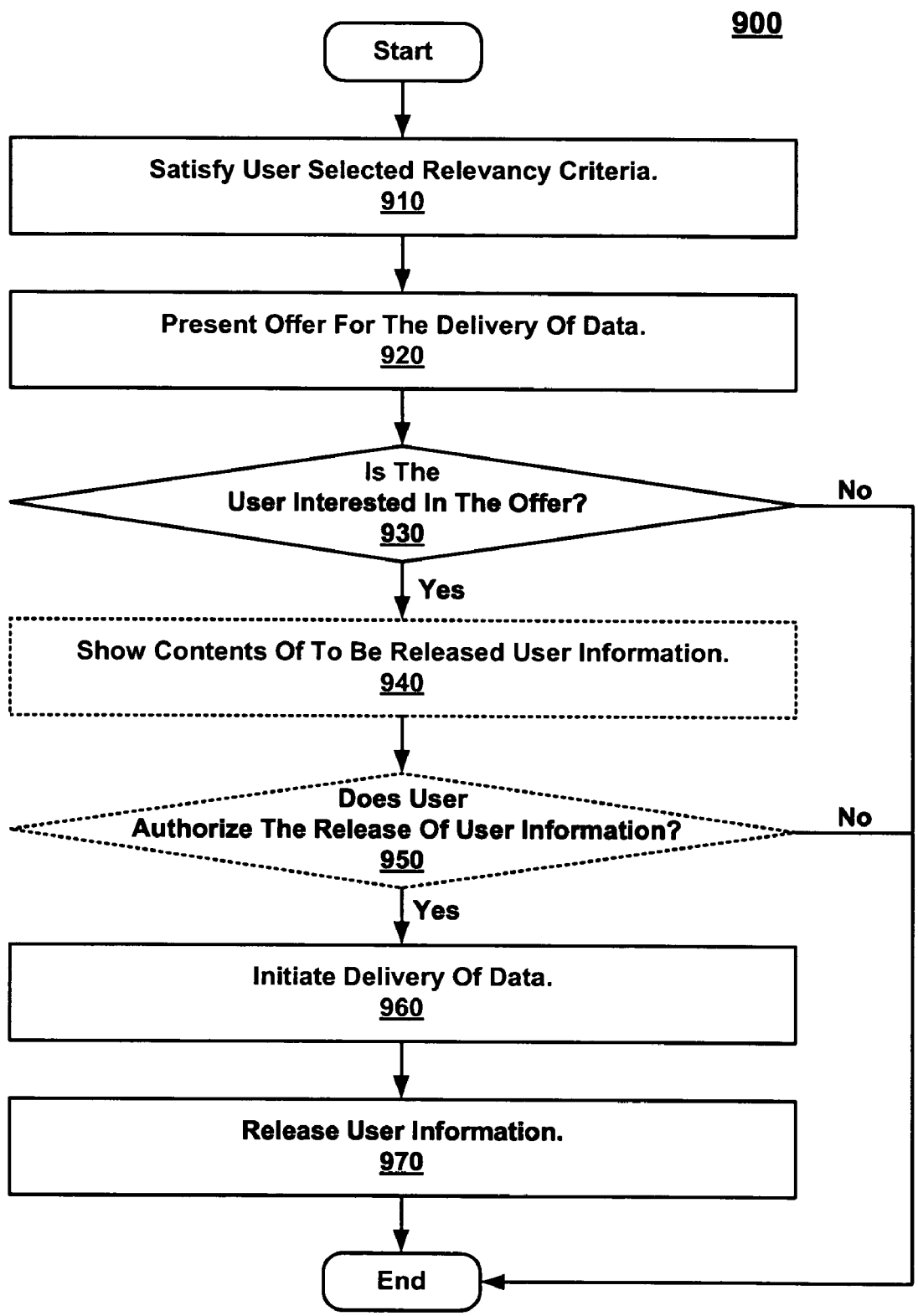
FIG. 9 is a flow diagram illustrating operations in a computer implemented method for determining if an offer for the delivery of data has been accepted, in accordance with one embodiment of the present invention.

Turning now To FIG. 9, a flow diagram illustrating operations for determining if an offer for the delivery of data has been accepted is described, in accordance with one embodiment. Additionally, flow diagram 900 provides further details related to flow diagram 200B of FIG. 2B.

At 910, the present embodiment determines if a user selected relevancy criteria has been satisfied before the initiation of the delivery of data to the user. That is, both the user selected relevance criteria and the selection criteria must be satisfied before the data is delivered to the user.

In one embodiment, the relevancy criteria measures the value to the user of viewing the data. That is, the relevancy criteria is an economic mechanism designed to set a value, as consideration, for the user's attention. For example, the relevancy criteria is some function that translates the user's attention to cash, goods, services, etc. As such, the relevancy criteria is a minimum value that is paid as consideration to the user upon delivery of the data and viewing the data. In other words, in such an embodiment, an incentive is paid to the user for the delivery of the data.

In one embodiment, the user selected relevancy criteria is an "ask price" that is selected by the user. That is, the user selected relevancy criteria is a minimum ask price that must be met before the data is delivered to that user. The ask price is included within the user profile. For example, a bid price is included within an offer soliciting the delivery of data. The bid price indicates the incentive paid to a user for the delivery of the data to the user, and the viewing of the data if required. As such, before the data is delivered, the bid price must equal or exceed the ask price in order to satisfy the user selected relevancy criteria.

Other forms of consideration for the relevancy criteria are coupons, frequent flier miles, points that are accumulated for purchasing awards, etc. In one particular embodiment, the user selected relevancy criteria corresponds to points for the purchase of a PC or printer cartridge, or some other manufactured goods or services. That is, once the user accumulates enough points, a free or reduced price PC or printer cartridge is made available to the user. In accordance with some embodiments of the present invention, the user is resupplied with printer cartridges through the receipt of the incentives paid for viewing data targeted to that user.

In addition, there are different relevancy criteria for various types of data. For example, a user might have a greater interest in sports than in treatment medications. As such, the user may want more data related to sports and less data related to treatment medications. Thus, one relevancy criteria is set to a lower threshold to attract sports data, and another relevancy criteria is set to a higher threshold to detract data regarding treatment medications.

Figure 10:
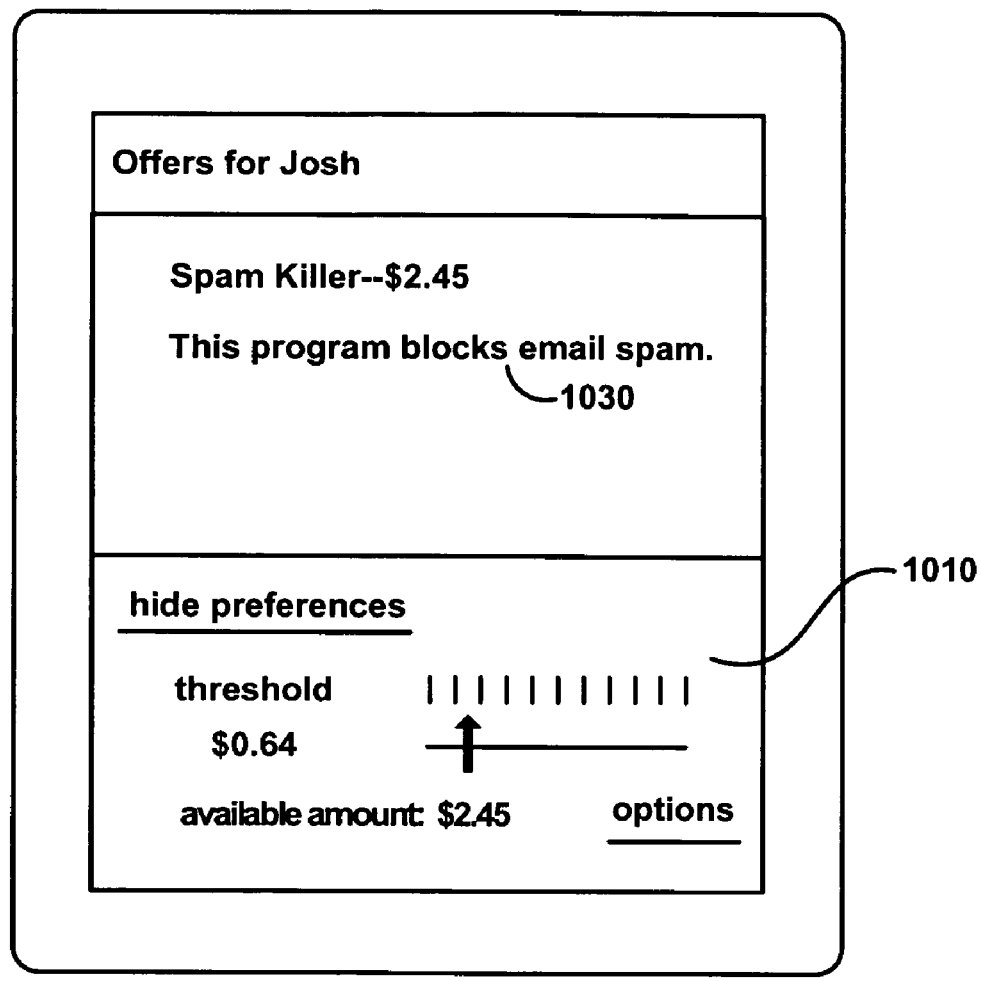
FIG. 10 is a diagram of a display illustrating an interface for an application capable of targeted data delivery, in accordance with one embodiment of the present invention.

In one embodiment, the relevancy criteria is set using a sliding bar, as shown in FIG. 10. FIG. 10 is a diagram of a display 100 displaying an interlace to an application that provides targeted delivery of data to a user. In the display 100, a sliding bar 1010 under "preferences" sets the minimum user selected relevancy criteria as a threshold value (e.g., ask price). As shown in display 100, the threshold is set to sixty-four cents. Movement of the pointer in the sliding bar 1010 increases or decreases the threshold. The sliding bar 1010 is shown for illustrative purposes only as other methods for setting the threshold are used in other embodiments.

In still other embodiments, the relevancy criteria is a constraint set by the user. For example, a threshold limits the number of offers that are accepted in a month. In one embodiment, if the threshold has been exceeded, then data will not be delivered to the user. On the other hand, if the threshold has not been exceeded, then the data will be delivered to the user. In another embodiment of the present invention, the relevancy criteria is manipulated internally to limit the number of offers presented to the user to the requested threshold.

In other embodiments, the relevancy criteria is automatically set. That is, based on general criteria set by the user, the relevancy criteria is automatically selected. For example, the threshold in sliding bar 1010 is moved as a function of the number of items of data that have been delivered to spread out a monthly quota of delivered data.

Figure 11:
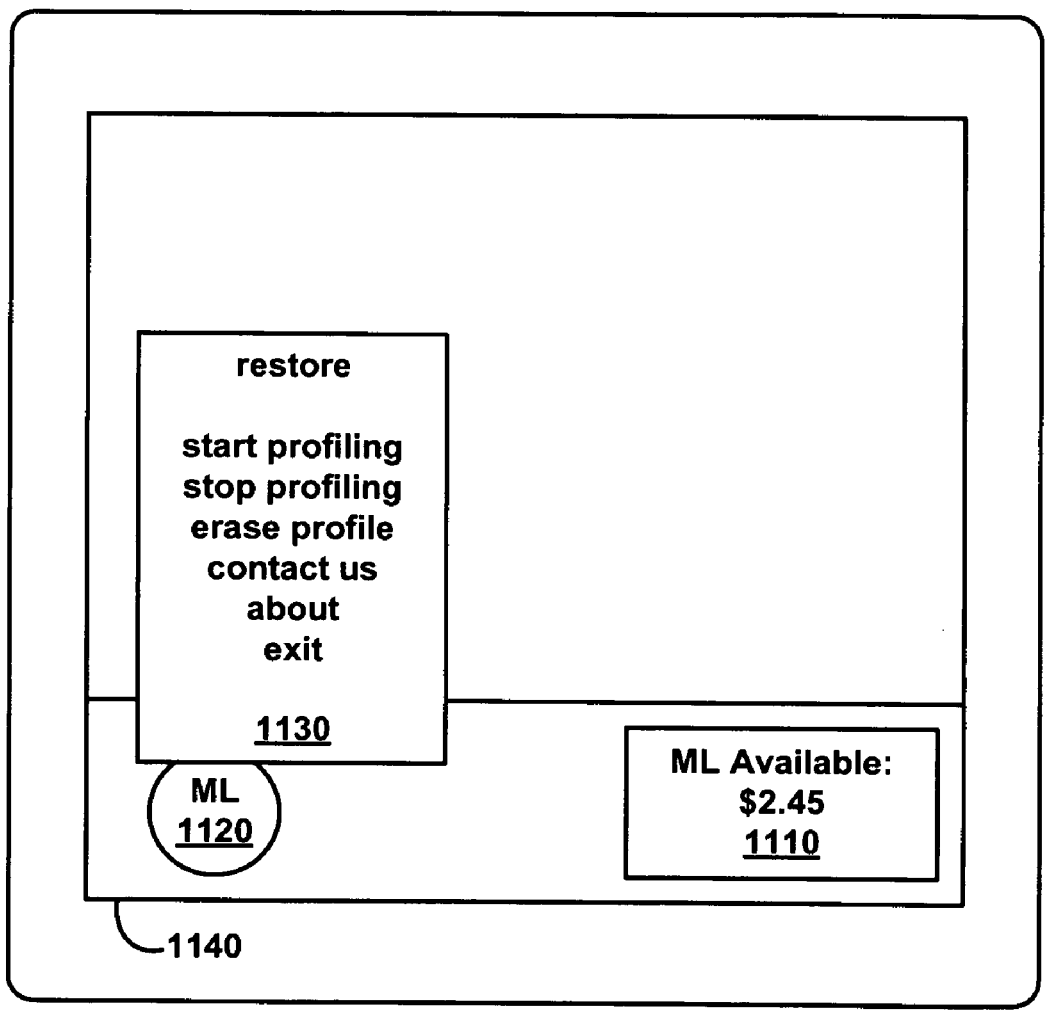
FIG. 11 is a diagram of a display illustrating an icon for a minimized application capable of targeted data delivery, in accordance with one embodiment of the present invention.

The interface in display 1000 is reached by invoking the icon 1120 of FIG. 11. The display 1100 of FIG. 11 illustrates the user interface that implements features of the targeted delivery of data when minimized. At the bottom tool bar 1140, the ML icon 1120 represents the application used for targeting the delivery of data. Block 1130 provides various user options available from the minimized application.

In addition, a summary 1110 of the available amount of consideration that is available to the user is shown. For example, the summary 1110 shows that $2.45 in cash is available for the user to earn if they view all the relevant data. This available amount is repeated in display 1000 at block 1020.

Returning to FIG. 9, at 920, an offer is presented for the delivery of data when the user profile satisfies the selection criteria. That is, before the data is delivered, the user has a choice of whether or not to accept delivery of data for viewing, in accordance with one embodiment. For example, the user bases a decision on whether the incentive or payment associated with the delivery of data is worthwhile to the user.

In accordance with embodiments of the present invention, the offer is presented to the user in an unobtrusive manner. That is, the offer need not be blatantly presented to the user, as in a pop-up advertisement in the conventional art, since the user's attention has already been filtered and the user most likely is interested in the data. For example, in the display 1000 of FIG. 10, the user interface presents a list of offers available to the user. As shown in FIG. 10, there is one offer ("Spam Killer") that is available to the user. The number of offers shown in FIG. 10 will vary depending on how many offers have selection criteria that are satisfied by the user profile.

Once the option 1030 in FIG. 10 is selected, information is provided to the user that is related to the offer. For example, a brief summary of the data source (e.g., printer company C) is provided. In addition, a brief summary of the data is also provided to the user. Other additional information is provided to the user so that the user may make an informed decision as to whether the delivery of data is desired. In another embodiment, this information is shown directly as part of display 1000.

Returning to FIG. 9, the present embodiment determines if the user is interested in the offer at 930. If the user is interested, the present embodiment proceeds to 940. On the other hand, if the user is not interested, then the present embodiment ends.

At 940, the present embodiment optionally presents to the user a summary of the user information that will be released if the offer is accepted. That is, user information that is used to satisfy the selection criteria will be released to the data distributor if the offer is accepted and is summarized for the user before being released. In this manner, the user can determine if he wants to release the user information. The release of user information is additional consideration for payment of the incentive to the user for accepting delivery of data and viewing the data.

The user's privacy is protected since only user information that is used to satisfy the selection criteria is subject to release and not the entire user profile. As such, sensitive user information that the user would like to keep private would not be released if it is not used to satisfy the selection criteria. For example, returning to the inkjet purchasing example, if the user is an employee of printer company A and is using a company computer, the user may not want information released indicating that URLs visited included a URL for a competitor of company A.

At 950, the present embodiment optionally determines if the user authorizes release of the user information. At 950, the present embodiment allows the user to stop the release of user information. That is, when the user decides that the user information is too private, the present embodiment allows the user to deny authorization for the release of the user information. When authorization is not given, then the present embodiment ends. As such, the delivery of data does not occur.

On the other hand, if authorization is given, then the present embodiment proceeds to 960 to initiate the delivery of data, as previously described in relation to 750 of FIG. 7. That is, the data is delivered to the user for viewing.

At 970 the user information is released and payment of the incentive is made. In one embodiment, the information is released to the data distributor (e.g., data distributor 520 of FIG. 5). In such an embodiment, the privacy of the user information has not been significantly compromised since it is in the data distributor's best interest to protect the privacy of its users in its network of users. As such, the data distributor provides aggregate data without violating any privacy interests to the data sources.

Automated viewing of the data facilitates fraudulent manipulation of the targeted data delivery system in order to automatically receive incentives paid for the delivery and user viewing of data without the user themselves viewing the data. That is, fraudulent users who satisfy the selection criteria and the relevancy criteria may try to have software view the data for them. However, in one embodiment, to prevent fraud computer generated Turing tests are implemented to defeat the automated viewing of the data. Other embodiments are well suited to implementing other means for determining when the data is automatically viewed fraudulently.

In another embodiment in accordance with the present invention, data is delivered before the release of information is authorized. As such, even though the data has been delivered and the user has viewed the data, the user has a last chance to stop the release of user information. That is, when the user decides that the user information is too private, the user chooses to deny authorization for the release of user information. When authorization is not given, the present embodiment ends. However, the incentive associated with viewing the data is not presented to the user as the user did not release the related user information.

In still another embodiment, after the user accepts the delivery of data and authorizes the release of user information, an additional tag-on offer is presented to the user for the delivery of additional data. The additional data is unrelated or related to the previously delivered data. For example, an offer is presented to the user for the delivery of three future e-mails from the advertiser in return for a cash incentive of five dollars.

Figure 12:
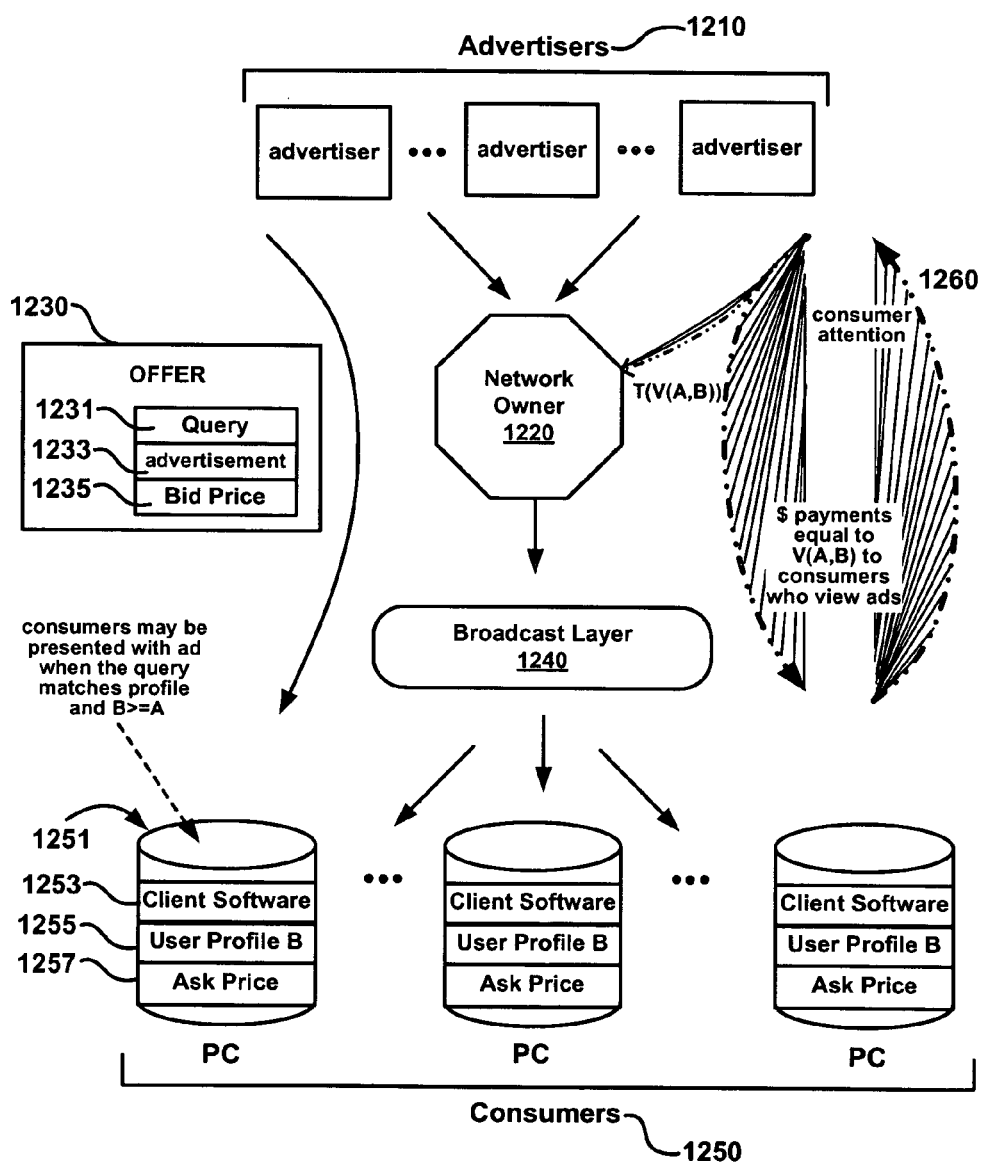
FIG. 12 is a block diagram of a system that is capable of targeted data delivery between a plurality of advertisers and a network of consumers through a data distributor, in accordance with one embodiment of the present invention.

FIG. 12 is a diagram of an exemplary system 1200 that is capable of targeted data delivery between advertisers and consumers, in accordance with one embodiment of the present invention. FIG. 12 is presented here to apply the methods and systems of FIGS. 7-11 in one particular implementation of targeting the delivery of advertisements.

In FIG. 12, the system 1200 links a plurality of advertisers 1210 to a network of consumers 1250 for the targeted delivery of advertisements. More specifically, the present embodiment links an advertiser with a particular consumer for the targeted delivery of an advertisement. For purposes of illustration, the system 1200 is described in the context of delivering advertisements, but is also used for the delivery of other types of data, such as announcements, messages, etc. Additionally, the system 1200 is capable of achieving delivery of an advertisement that is targeted to a user based on information in a user profile associated with the consumer without requiring a release of user information in the user profile to protect privacy.

The architecture of system 1200 functions similarly to the architecture in network 500 of FIG. 5. For example, an advertiser uses a network owner 1220 to broadcast an offer 1230 through a broadcast layer 1240 to reach a network of consumers 1250. That is, the offer 1230 is propagated to each of the network of consumers 1250. The offer 1230 includes a query 1231, an advertisement link 1233, and a bid price 1235. If the selection criteria in query 1231 is satisfied by any of the user profiles associated with a consumer, then the advertisement is delivered to that consumer.

In system 1200, client software is installed on PCs sold to users who participate in the network of consumers 1250. In other embodiments, the client software is installed onto computing devices of the user (e.g., PC) when the user decides to join the network of consumers 1250. That is, the client software is installed after the purchase of the computing device. The software operates in the background of the PC and tracks a wide variety of user information and behaviors, as previously described in relation to 710 of FIG. 7. This logged information is put into a database which is stored locally on the PC. In other embodiments, the logged information is stored in a database which is remotely located from the user and not on the PC.

It should be noted that in accordance with embodiments of the present invention, even though the software is operating in the background, the software is operating with the authorization of the user for purposes of targeted data delivery. That is, unlike conventional spyware which is operating under fraudulently obtained or absent any authorization, embodiments of the present invention operate with the full knowledge and consent of the user, and often for the pecuniary benefit of the user.

For example, PC 1251 is associated with a particular consumer. Client software 1253 is installed on the PC 1251 to track and log user information associated with the consumer. The user information is provided in a user profile 1255 which is stored locally on the PC 1251. Because the user information is stored locally, the consumer has maximum control over the associated data. That is, the consumer has control over whether information is released from the PC 1251, and when that information is released. In addition, an ask price 1257 associated with the consumer is stored locally on the PC 1251.

Also, the client software 1253 is used to determine if the user profile 1255 satisfies the query 1231. That is, the computation done to determine if the user profile 1255 satisfies the query 1231 occurs locally on the PC 1251. Further, the computation is performed transparently to the consumer.

Only when the criteria in the query 1231 is satisfied by the user profile 1255, and when the bid price 1235 exceeds the ask price 1257 will the offer to view the advertisement be presented to the consumer. If the consumer chooses to view the advertisement, then the network owner 1220 delivers the advertisement to the consumer for viewing (e.g., the link 1233 is invoked). In addition, in return for the consumer's attention, a payment is made to the consumer who is viewing the advertisement, as depicted at 1260. The payment is a function of the user ask price, A, and the bid price, B. The incentive delivered to the user is limited by $A<=V(A,B)<=B$. In addition, in another embodiment, credit to the consumer is managed by the network owner 1220.

In the present embodiment, the system 1200 operates without anyone other than the consumer knowing that the consumer's user profile 1255 satisfies the criteria set forth in the query 1231, until the offer is accepted, at which point the network owner is made aware of information in the consumer's user profile. Even though the targeting is extremely specific (e.g., exploiting a wide range of consumer data) which allows the advertiser to reach exactly who they want to reach, this is accomplished without violating the consumer's privacy because of the privileged position of the PC as the final stage in the delivery of all content.

As a result, the system of FIG. 12 is capable of targeting advertisements to particular users who exhibit characteristics that the advertiser thinks are indicative of a potential buyer. Further, the advertiser is willing to pay, for example, three dollars for the attention of a consumer, if the selection criteria is satisfied.

Section 3: Method and System for Targeted Data Delivery from the Standpoint of the Data Distribution Layer In section 3, embodiments of the present invention are described from the standpoint of the data distribution layer. For example, the data distribution layer is located between lines A-A and B-B in FIG. 5. As such, description of the targeted delivery of data is described below from the standpoint of the data distribution layer.

Figure 13A:
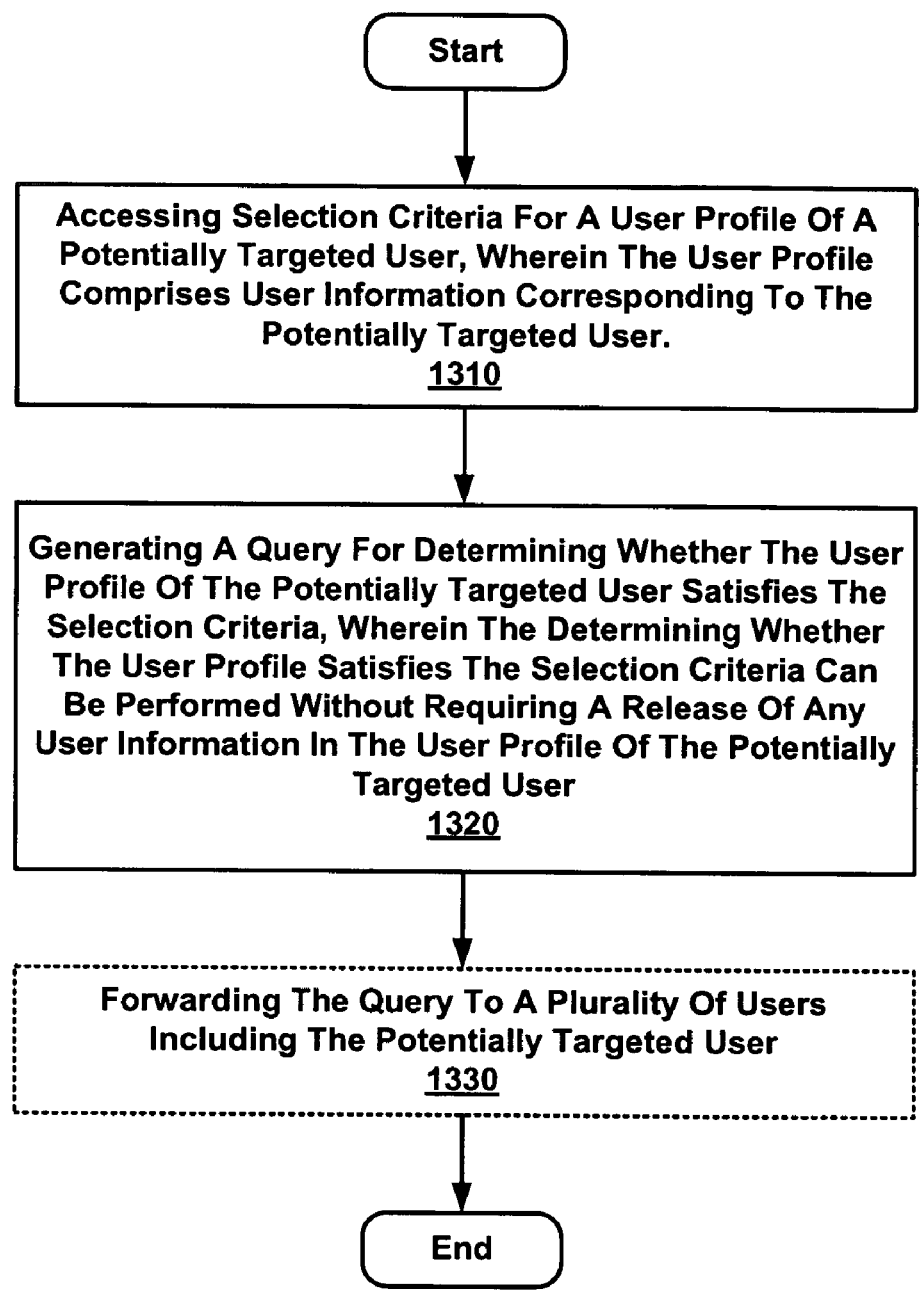
FIG. 13A is a flow diagram illustrating operations in a computer implemented method for targeted data delivery in which a query is generated, in accordance with one embodiment of the present invention.
Figure 13B:
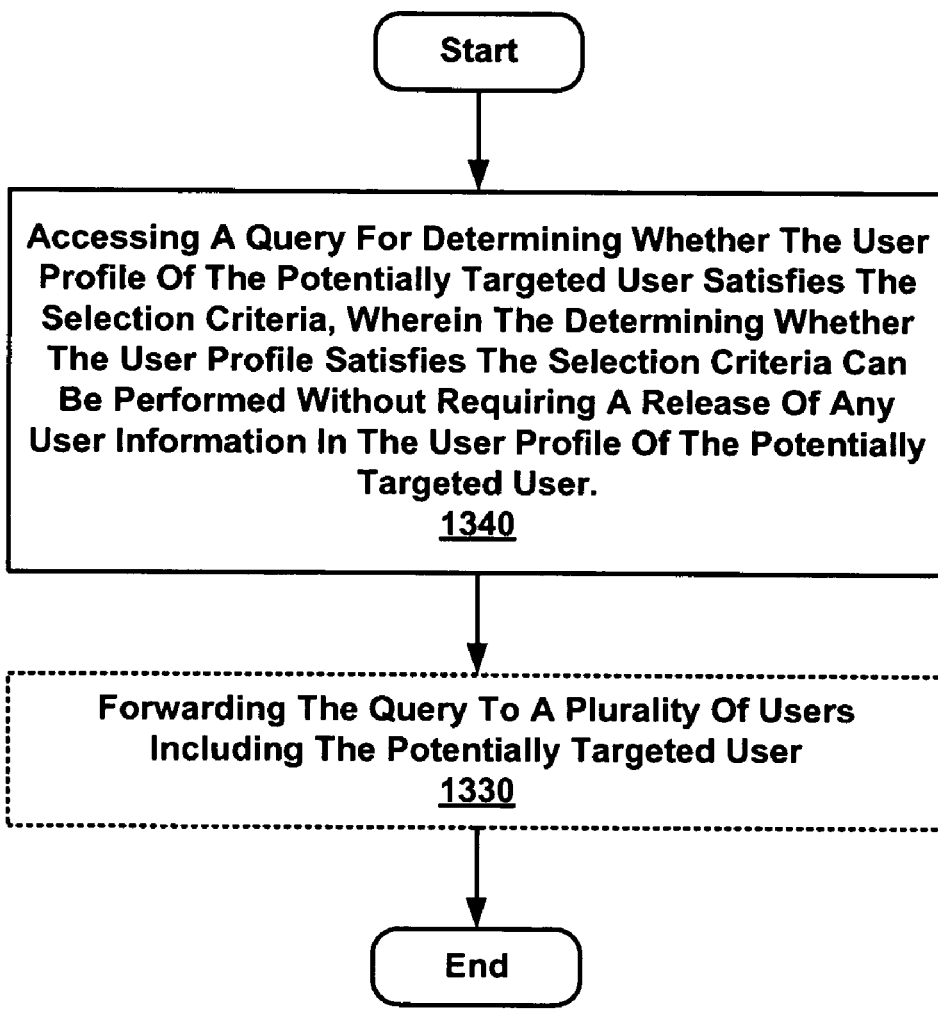
FIG. 13B is a flow diagram illustrating operations in a computer implemented method for targeted data delivery in which a query is accessed, in accordance with one embodiment of the present invention.
Figure 14:
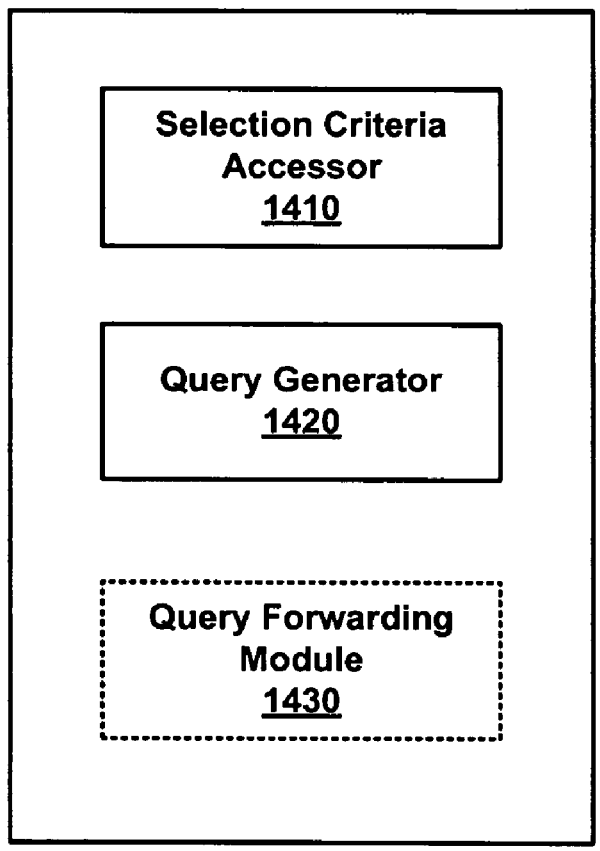
FIG. 14 is diagram illustrating a system capable of implementing the method of FIG. 13A, in accordance with one embodiment of the present invention.

Embodiments described in conjunction with FIGS. 13A, 13B, and 14 pertain to methods for targeted data delivery and a system for implementing the same. FIG. 13A is a flow diagram illustrating operations performed in a method for targeted data delivery in which a query is generated, in accordance with one embodiment. FIG. 13B is a flow diagram illustrating operations performed in a method for targeted data delivery in which a query is accessed, in accordance with one embodiment. FIG. 14 is diagram illustrating a system capable of implementing the methods of FIG. 13A, in accordance with one embodiment.

Although embodiments of FIGS. 13A, 13B, and 14 are described from the standpoint of the data distribution layer of FIG. 5 for purposes of clarity and brevity, other embodiments of the same Figures are implemented from the standpoint of other layers in FIG. 5, as will be described below.

The operations of the methods described in FIGS. 13A and 13B are performed at the data distribution layer of FIG. 5, in one embodiment of the present invention. In addition, in FIG. 14, the components of system 1400 which perform the operations of the method of FIG. 13A are located at the data distribution layer, in one embodiment. However, other embodiments of the present invention are well suited to locating the components of system 1400 at the data source layer of FIG. 5, or some other layer between the data source and the data distribution layer. In one embodiment in accordance with the present invention, the components of system 1400 are located on the system of a broker, not shown, who represents the data source and generates a query. Still other embodiments locate the components of system 1400 in a combination of the layers described above.

Turning now to FIG. 13A, a flow diagram 1300A is described illustrating operations for targeted data delivery for the generation of a query, in accordance with one embodiment of the present invention. In the present embodiment, the flow diagram 1300A is taken from the standpoint of the data distribution layer in FIG. 5. However, other embodiments of the present invention are well suited to performing the method of FIG. 13A at other layers, or a combination of layers in FIG. 5. That is, generation of the query occurs at the data distribution layer, the data source layer, or some layer in between, in accordance with embodiments of the present invention. The method of flow diagram 1300A is used to ensure the privacy of user information used for targeting delivery of data.

At 1310, the present embodiment accesses selection criteria. As described previously with respect to FIG. 7, the selection criteria defines characteristics exhibited by a targeted user for the delivery of data. These characteristics are met by the user profile of a targeted user. That is, the selection criteria is used to determine if the user profile of a potentially targeted user satisfies the target profile described by the selection criteria.

The user profile comprises user information corresponding to the potentially targeted user. If the user profile satisfies the selection criteria, then the potentially targeted user is a targeted user to whom data may be delivered. A full discussion regarding user profiles was previously presented in conjunction with operation 720 of FIG. 7.

As shown in FIG. 14, a selection criteria accessor 1410 is used to access the selection criteria. In the present embodiment, the components of system 1400 including the selection criteria accessor 1410 are located at the data distribution layer, however, in other embodiments the selection criteria accessor 1410 is located at other layers of FIG. 5.

At 1320, the present embodiment generates a query for determining whether the user profile of the potentially targeted user satisfies the selection criteria. That is, the query is used to determine if the potentially targeted user is targeted for the delivery of data by initiating operations that compare the user profile to the selection criteria, as previously described above in conjunction with the discussion of operation 740 of FIG. 7. As shown in FIG. 14, a query generator 1420 is used to generate the query. While the present embodiment describes the query generation as being located at the data distribution layer of FIG. 5, other embodiments are well suited to locating the query generator 1420 at other layers of FIG. 5.

Embodiments in accordance with the present invention determine whether the user profile satisfies the selection criteria without requiring a release of any user information in the user profile associated with the potentially targeted user. In one embodiment, user information is not required to be released beyond the data distributor. That is, in determining if the user profile satisfies the selection criteria, user information is not required to be released beyond the line A-A in FIG. 5. As such, embodiments in accordance with the present invention are capable of generating a query that is implemented within a system that targets users who satisfy selection criteria without requiring a release of user information. Thus, the present embodiment maintains the privacy of the user information comprising the user profiles.

In one embodiment, query generator 1420 generates the query in response to input through a web enabled interface. For example, input entered from a data source is delivered to query generator 1420. The query generator 1420 is located at the data distribution layer of FIG. 5, in one embodiment. At that point, query generator 1420 generates the query for use in targeting data delivery.

In one embodiment, the query is vetted to see if it is objectionable. For example, before the query is broadcasted in 1330, the data distributor who forwards the query examines the contents of the query to determine if the query is searching for objectionable (e.g., very private information such as social security numbers), characteristics of users. If the data distributor finds the query is objectionable, then the query is rejected before it is broadcasted. In one embodiment, any data associated with the query is vetted to see if it is objectionable.

For purposes of organization, specific examples and detailed descriptions of the query generation process will be described in greater detail in section 4 in which targeted data delivery is described from the standpoint of the data source layer.

At 1330, the present embodiment optionally forwards the query to a plurality of users, including the potentially targeted user. That is, the query is broadly distributed to determine which of the plurality of users has a user profile that satisfies the selection criteria and is a targeted user for the delivery of data. In some embodiments, the query may be accompanied by data, a link to data, or a bid price.

As shown in FIG. 14, in one embodiment in accordance with the present invention, query forwarding module 1430 forwards the query to the plurality of users. In the present embodiment, query forwarding module 1430 is located at the data distribution layer. In other embodiments, query forwarding module 1430 is located at the broadcast layer of FIG. 5.

In embodiments of the present invention, the query forwarding module 1430 broadcasts the query to the plurality of users. The query forwarding module 1430 is a server of the data distributor 520 at the data distribution layer of FIG. 5, in one embodiment, or one or more servers of the data distributor 520 in other embodiments.

In one embodiment, the query forwarding module 1430 broadcasts the query through the internet. That is, the query is broadcast to the plurality of users via the internet, such as through a direct server to an electronic device (e.g., PC). However, other embodiments are well suited to other forms of broadcasting. For example, the query forwarding module 1430 is capable of broadcasting the query through an indirect connection, such as a peer-to-peer scheme.

Also, query forwarding module 1430 is capable of broadcasting through a datacasting method. The query is sent via a datacast network, such as an existing television (TV) network, a high definition television (HDTV) network, a HD radio network, satellite radio network, a radio network, or any suitable broadcasting medium. That is, in one embodiment in accordance with the present invention, the query is delivered to a broadcast antenna and then broadcasted to any user within the coverage area. The number of potential users is quite large, as datacasting will send the query to mobile as well as stationary users. For example, various handheld devices (e.g., PDAs, cell phones, etc.) as well as watches are configured to receive datacast messages. In this way, the query is anonymously transmitted to a plurality of users at one time without any targeting, instead of transmitting the query separately to each individual user. In another embodiment, the broadcasting of the query is implemented through client polling In one embodiment, query forwarding module 1430 is capable of selecting users to whom the query is broadcasted. For example, query forwarding module 1430 sends the query to all of its supported users, or to randomly selected users, or demographically selected users. This reduces the cost of broadcasting. For example, query forwarding module 1430 filters out the users by zip code. As such, the query is broadcast only to one or more predetermined zip codes, although query forwarding module 1430 is capable of supporting many more zip codes.

In one embodiment, query forwarding module 1430 broadcasts the query in stages. For example, the query is broadcast in stages to help determine the interest in the data. This aids in determining the interest in the associated data, how quickly a budget could be exceeded or how much a budget would have to be adjusted. For example, an incentive budget is placed for delivery of data associated with a query. The query is first sent to one-thousand potentially targeted users, for example, to determine interest in the data. The sample size is small enough that the budget will not be exceeded. If the hit rate of targeted users is high, then there is high interest in the data and the budget may be quickly exceeded. As such, the budget cap may need to be increased before another broadcast is made. On the other hand, if the hit rate is low, then there is lesser interest in the data. As such, the query is directly sent to another set of potentially targeted users.

In another embodiment, query forwarding module 1430 charges a fee for broadcasting the query. For example, a fee of one cent per broadcasted message might be charged. Other rate schemes are implemented depending on the number of queries that are broadcasted by a particular data source.

Turning now to FIG. 13B, a flow diagram 1300B illustrates operations performed in a method for targeting data delivery, in accordance with one embodiment of the present invention. In the present embodiment, the flow diagram 1300B is taken from the standpoint of the data distribution layer in FIG. 5. That is, the operations in flow diagram 1300B are performed between lines A-A and C-C.

At 1340, the present embodiment accesses a query for determining whether a user profile of a potentially targeted user satisfies the selection criteria. As described previously in 1310, the query includes the selection criteria and is used to select users who satisfy the selection criteria for the delivery of data. In the present embodiment, the query is forwarded to a plurality of users including the potentially targeted user, at 1330, as previously described in FIG. 13A.

In the present embodiment, the query is generated at a location other than the data distributor. That is, the query is generated at a layer other than the data distribution layer of FIG. 5. More specifically, the query is generated at the data source layer or some other layer between the data source and the data distribution layer. For example, the query is generated by a data source through a web enabled interface run by the data distributor, as will be described more fully below in section 4.

Figure 15:
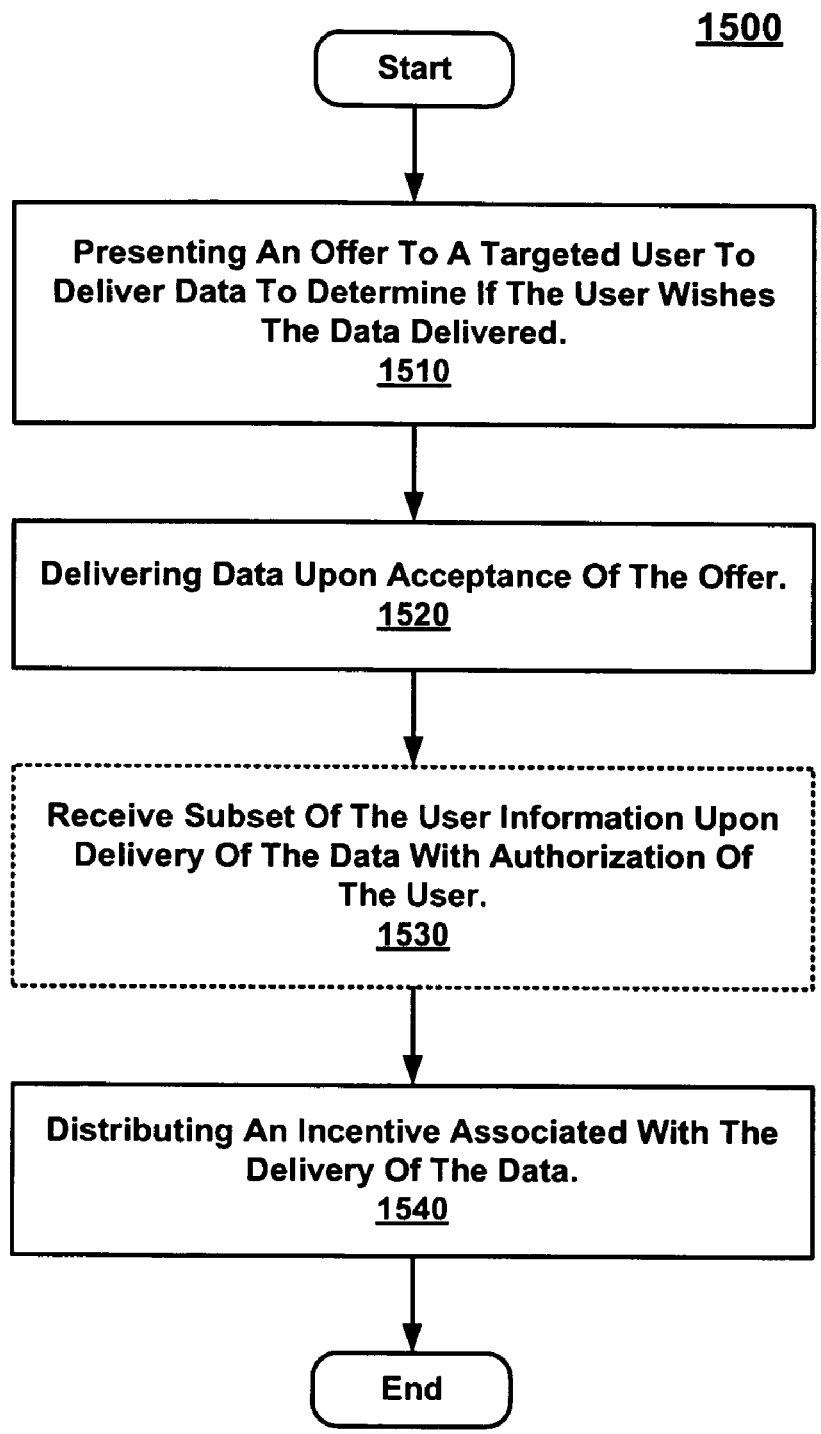
FIG. 15 is a flow diagram illustrating operations in a computer implemented method for targeted delivery of data in which an incentive is distributed, in accordance with one embodiment of the present invention.
Figure 16:
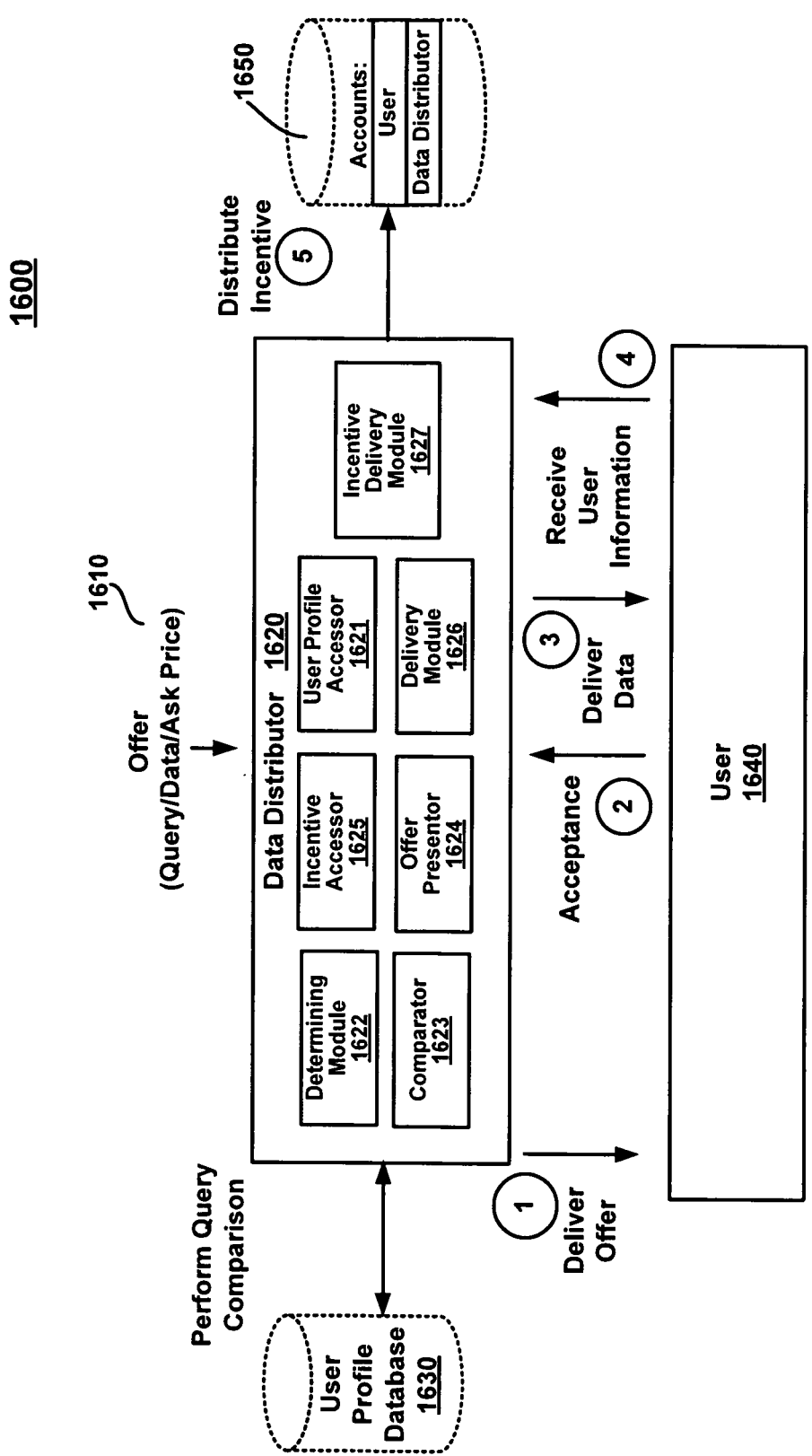
FIG. 16 is a data flow diagram illustrating the flow of information in the method of FIG. 15, in accordance with one embodiment of the present invention.

FIG. 15 in combination with FIG. 16 illustrate an exemplary system for the targeted delivery of data in which an incentive is distributed. FIG. 15 illustrates a method for targeted delivery of data, and FIG. 16 is a system for implementing the method of FIG. 15 in accordance with embodiments of the present invention.

Turning now to FIG. 15, a flow diagram 1500 illustrates operations performed in a method for targeted delivery of data in which an incentive is distributed, in accordance with one embodiment. Flow diagram 1500 describes additional operations performed subsequent to the performance of the operations described in the flow diagrams of FIGS. 13A and 13B.

At 1510, the present embodiment presents an offer to a targeted user for the delivery of data. This offer is presented to determine if the targeted user wishes the data delivered. The presentation of the offer by the offer presenter 1624 is shown in operation 1 of the data flow diagram of FIG. 16.

In FIG. 16, a data flow diagram illustrates the flow of information in the method of FIG. 15, in accordance with one embodiment. As shown in FIG. 16, an offer 1610 containing some combination of the query, data, and ask price is delivered to a receiver in the data distributor 1620. More specifically, the offer 1610 contains the query, in one embodiment. In another embodiment, the offer 1610 contains the query and some form of accessing the data, such as the data itself, or a link to the data. In still another embodiment, the offer 1610 contains the query, some form of accessing the data, and the ask price. As such, in embodiments in accordance with the present invention, the query is contained in the offer 1610, or is generated by the data distributor 1620.

In addition, an optional user profile database 1630 is configured to be accessible by the data distributor 1620. That is, the targeting mechanism is centralized at the data distributor 1620. As such, the data distributor 1620 is capable of determining which of the plurality of potentially targeted users it supports has a user profile that satisfies the query. In such an embodiment, the data distributor 1620 stores the user profiles of its network of users at the optional user profile database 1630. In another embodiment, to ease the considerable burden of storing and searching millions of user profiles, the storing and computation performed on user profiles are off-loaded to the clients associated with the plurality of potentially targeted users, as previously discussed in section 2.

In one embodiment, operation 1 may be performed to determine whether the user profile of the potentially targeted user satisfies the selection criteria as defined by the query that is included within an offer. That is, the offer is delivered to the user by the offer presenter 1624 in operation 1. In accordance with embodiments of the present invention, the offer includes the query, and the location of the data to be offered for delivery, or alternatively the data itself. Additionally, an optional offer of compensation (e.g., incentive) for taking delivery is included within the offer. Also, additional information is included within the offer, such as expiration period, expiration date, etc.

More specifically, in accordance with one embodiment of the present invention, the data distributor 1620 is capable of determining which of the plurality of potentially targeted users it supports has a user profile that satisfies the query. As such, a determining module 1622 located within the data distributor 1620 uses the query within the offer to determine if the user profile satisfies the selection criteria. That is, in the present embodiment, a user profile accessor 1621 located within the data distributor 1620 accesses the user profile and a comparator 1623 located within the data distributor 1620 compares the user profile to the selection criteria.

In the embodiment where the data distributor 1620 performs the computation of determining whether the user profile satisfies the selection criteria, then data distributor 1620 is able to filter out targeted users. As such, delivery of data is targeted to those users (e.g., through user 1640) whose user profile satisfies the selection criteria in the query included within the offer. More specifically, in the present embodiment the offer is forwarded to users whose user profiles satisfy the selection criteria so that those users can determine whether to authorize delivery of the data.

On the other hand, in operation 1, if the computation for determining whether a user profile satisfies the selection criteria is not performed at the data distributor 1620, then the offer is delivered in a broadcast message to a plurality of users, including a user 1640 that is a potentially targeted user, in one embodiment. In such an embodiment, a determining module (e.g., located within the targeting mechanisms 561, 571, or 581 of FIG. 5) that is associated with a particular user uses the offer to determine if the user profile satisfies the selection criteria. That is, in the present embodiment a user profile accessor (e.g., located within the targeting mechanisms 561, 571, or 581 of FIG. 5) accesses the user profile and a comparator (e.g., located within the targeting mechanisms 561, 571, or 581 of FIG. 5) compares the user profile to the selection criteria. If the comparator determines that the user profile satisfies the query, then the offer is then presented to the user for acceptance of delivery of the data.

In accordance with one embodiment of the present invention, an optional bid price associated with the data is also delivered. That is, a bid price is presented to the user as part of the offer for the delivery of data, in one embodiment. As such, the bid price is used to determine if the user is interested in the delivery of data. That is, the bid price is accessed and compared against a user selected relevancy criteria. The incentive associated with the data is a function of the bid price. Data is delivered only when the bid price satisfies the user selected relevancy criteria. Previously, a full discussion on the delivery of the bid price was presented in relation to FIG. 10. The bid price is shown in FIGS. 3, 4, 5, and 12.

For example, if data distributor 1620 determines if the bid price satisfies the user selected relevancy criteria, then an incentive accessor 1625 in the data distributor 1620 accesses the incentive (e.g., bid price) associated with the data. Comparator 1623 in the data distributor 1620 compares the incentive against the user selected relevancy criteria (e.g., ask price). An offer presenter 1624 in the data distributor 1620 offers to deliver the data when the incentive satisfies the user selected relevancy criteria.

Returning to FIG. 15, at 1520, the present embodiment delivers data upon acceptance of the offer. Acceptance of the offer is conditioned upon a determination that the user profile satisfies the selection criteria. For example, delivery module 1626 in the data distributor 1620 delivers the data. Previous descriptions of the presentation and acceptance of the offer were presented in FIG. 9. As shown in FIG. 16, acceptance of the offer is illustrated in operation 2, where the user 1640 delivers acceptance of the offer. In such an embodiment, the user authorizes the delivery of data.

At 1520 of FIG. 15, the present embodiment delivers data to the user 1640 upon acceptance of the offer. As shown in FIG. 16, operation 3 illustrates the delivery of data from data distributor 1620 to the user 1640 whose user profile satisfies the selection criteria. Delivery module 1626 contained within the data distributor 1620 delivers the data. For example, in one embodiment the delivery is implemented when the user invokes a link to the data. In such an embodiment, the data is stored at the data distributor 1620 and is delivered to the user 1640 upon invoking the link.

In addition, at 1530, optionally, the present embodiment receives a subset of user information upon delivery of the data. For example, a receiver at the data distributor 1620 receives a subset of the user information upon delivery of the data. Release of the subset of user information from an information receiver (e.g., located at a targeting mechanism 561, 571, or 581 of FIG. 5) is conditioned upon authorization of the user, in one embodiment. Release of the user information was presented in conjunction with the discussion of FIG. 9. For example, the released information is limited to only the user information used to satisfy the selection criteria. As shown in FIG. 16, operation 4 illustrates the receipt of the user information by the data distributor 1620.

In still another embodiment, data distributor 1620 forwards the user information to the data source of the data. In still other embodiments, the data distributor 1620 only forwards an aggregate of the user information to the data source in the interest of protecting the privacy of the network of users.

At 1540, the present embodiment distributes an incentive associated with the delivery of data. As shown in FIG. 16, operation 5 illustrates the delivery of the incentive from an incentive delivery module 1627 of the data distributor 1620 to the database of accounts 1650. In FIG. 16, the data distributor 1620 controls accounts for both the user 1640 and the data distributor 1620. As such, in one embodiment of the present invention the distribution of an incentive is made directly to an account associated with the user 1640. In another embodiment, the distribution of an incentive is made directly to an account associated with the data distributor 1620. In still another embodiment, the incentives are distributed to accounts associated with the user 1640 and the data distributor 1620. The various types of incentives (e.g., cash, frequent flier miles, points for goods and services, etc.) have been previously discussed in conjunction with the discussion of FIG. 10.

In one embodiment, data distributor 1620 controls the distribution of incentives. That is, data distributor determines the allocation of the incentive for the delivery of data. For example, data distributor 1620 distributes funds according to a function $V(A,B)$, where $A<=V(A,B)<=B$. The variable A is the ask price of the user and B is the bid price. In one embodiment, the delivery of data occurs when the bid price exceeds the ask price set by the user. As such, the incentive V is set between the ask price and the bid price.

In embodiments in accordance with the present invention, the exact value of V is determined according to a number of formulas that split the valuation surplus between the user 1640 and the data distributor 1620. The choice of the formula is important because it creates different incentives.

In one embodiment, data distributor 1620 distributes the incentive to a combination of the user and the data distributor 1620. For example, the data distributor allocates a flat fee for every data delivered to itself, and assigns the rest to the user 1640, or allocate incentives according to a percentage of the amount paid for the delivery of data by the data source (e.g., the bid price), etc.

In addition, other rate schemes are implemented by data distributor 1620 in various other embodiments of the present invention. For example, newer users receive a higher portion of the incentives distributed. Older users receive a lower portion of the incentives distributed. In addition, data distributor 1620 receives no incentive, or the user 1640 receives no incentive.

Section 4: Method and System for Targeted Data Delivery from the Standpoint of the Data Source Layer Embodiments of the present invention in section 4 are described from the standpoint of the data source layer. For example, the data source layer is located above line A-A in FIG. 5. As such, description of the targeted delivery of data is described below from the standpoint of the data source layer.

Figure 17:
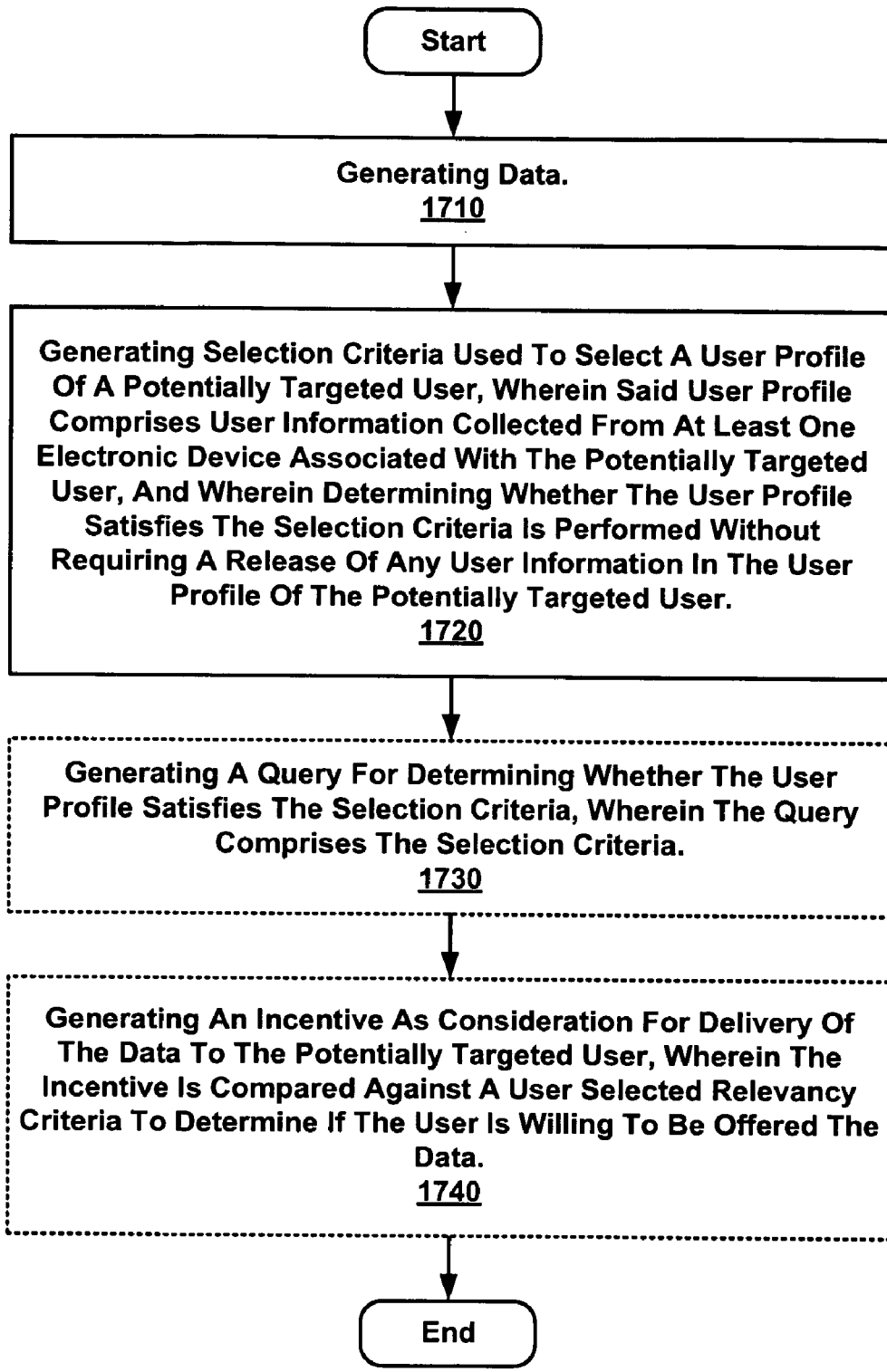
FIG. 17 is a flow diagram illustrating operations in a computer implemented method for targeted data delivery in which data and a query are generated for targeted data delivery, in accordance with one embodiment of the present invention.
Figure 18:
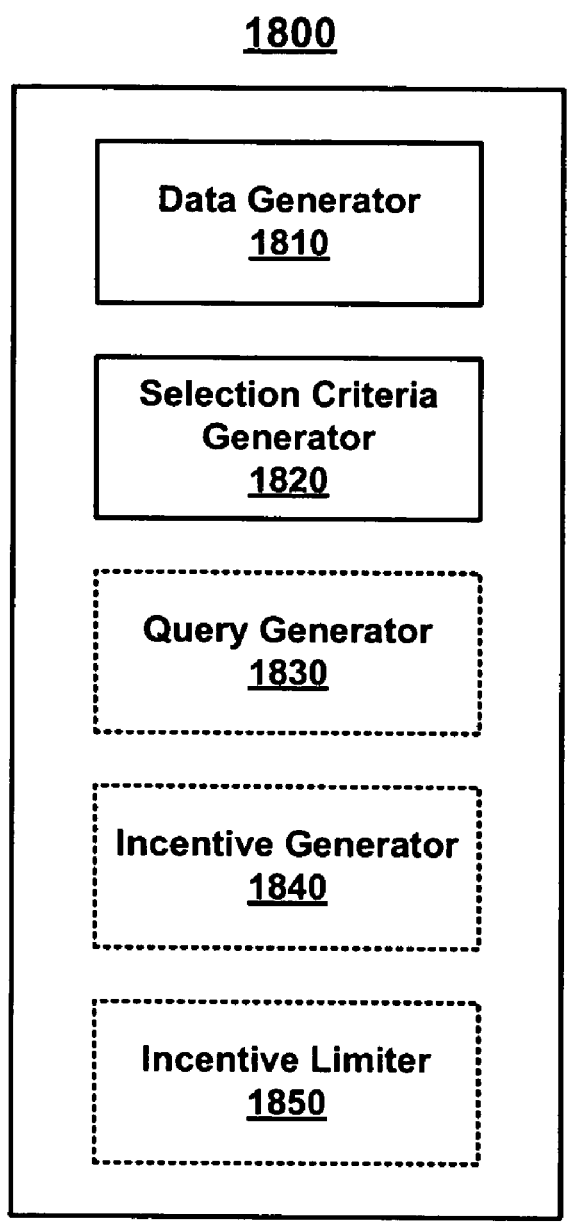
FIG. 18 is diagram illustrating a system capable of implementing the method of FIG. 17, in accordance with one embodiment of the present invention.

Embodiments described in conjunction with FIGS. 17 and 18 pertain to methods for targeted data delivery and a system for implementing the same. FIG. 17 is a flow diagram illustrating operations performed in a method for targeted data delivery in which data and a query are generated for targeted data delivery, in accordance with one embodiment. FIG. 18 is diagram illustrating a system capable of implementing the method of FIG. 17, in accordance with one embodiment.

Although embodiments of FIGS. 17 and 18 are described from the standpoint of the data source layer of FIG. 5 for purposes of clarity and brevity, other embodiments of the same figures are implemented from the standpoint of other layers in FIG. 5, as will be described below.

As such, the operations of FIG. 17 are performed at the data source layer of FIG. 5 in accordance with one embodiment of the present invention. In addition, in FIG. 18, the components of system 1800 which perform the operations of FIG. 17 are located at the data source layer, in one embodiment. However, other embodiments of the present invention are well suited to locating some or all of the components of system 1800 at the data distribution layer of FIG. 5, or some other layer in between the data source the data distribution layer, for example at a server of a broker who represents the data source and generates the data and the query.

Embodiments of the present invention are discussed within the context of a data source that provides data. For purposes of brevity and clarity, the targeted delivery of advertisements, as data, that are generated from advertisers, as a data source, is used for illustrative purposes throughout the application. However, although advertisements that are generated from advertisers are used for purposes of brevity and clarity in certain examples, the targeted delivery of data generated from data sources is not intended to be limited to the targeted delivery of advertisements from advertisers.

Turning now to FIG. 17, a flow diagram 1700 is described illustrating operations for the generation of data and a query for the targeted delivery of the data. In accordance with one embodiment, the flow diagram 1700 is taken from the standpoint of the data source layer in FIG. 5. However, other embodiments of the present invention are well suited to performing the method of FIG. 17 at other layers, or a combination of layers in FIG. 5. That is, generation of one or both of data and query occurs at the data source layer, the data distribution layer, or some layer in between, in accordance with embodiments of the present invention. The method of flow diagram 1700 is used to ensure the privacy of user information used for targeting the delivery of data.

At 1710, the present embodiment generates data. The data that is generated is any suitable form of data that is targeted to particular users. It is assumed that the targeted users have a perceived interest in the data.

As shown in FIG. 18, data generator 1810 generates the data. In the present embodiment, the components of system 1800 are located at the data source layer, however, in other embodiments the data generator 1810 is located at other layers of FIG. 5.

In one embodiment, for illustrative purposes only, the data that is generated by data generator 1810 is an advertisement. The advertisement is generated specifically to appeal to a particular targeted group of users. For example, the advertisement promotes a series of reading books that are tailored to the education of science to elementary school-aged girls. More specifically, the books are not textbooks. The targeted group of users is the elementary school-aged girls, or the parents of those elementary school-aged girls.

As mentioned above, embodiments in accordance with the present invention are not limited to use with data comprising advertisements. Listed below are examples of data other than advertisements which are well suited to being targeted to users in accordance with embodiments of the present invention. For illustrative purposes only, the data that is generated by data generator 1810 is an announcement, such as public service announcement, business announcement, internal company announcement, professional group announcement, etc. The announcement is targeted to a particular targeted group of users. For example, in the case of the public service announcement, the data generated by data generator 1810 is a warning for a flash flood and the data is targeted to a targeted group of news media. The warning is targeted to the group of news media for further dissemination to the general public. In the case of the business announcement, the data generated by data generator 1810 is breaking news affecting a price of a stock that is targeted to a group of users who subscribe to an investment publication. Those users use the data for their personal investment strategies. In the case of the internal company announcement, the data is general news particular to employees of a company. As such, this news is targeted only to those employees. In the case of the professional group announcement, the data generated by data generator 1810 is breaking news affecting the activities of that professional group. For example, the targeted group of users is medical doctors. As such, the data is breaking news regarding the efficacy of a particular drug that is widely disseminated for public use. In addition, other data are generated by data generator 1810 for the targeted delivery of that data.

At 1720, the present embodiment generates selection criteria which define characteristics exhibited by a targeted user. That is, the selection criteria defines characteristics met by a user profile of a potentially targeted user. As such, the selection criteria as generated by a selection criteria generator 1820 are used to determine if a potentially targeted user is a user to whom the data should be targeted for delivery. A full discussion on the selection criteria and its comparison to a user profile is provided in conjunction with a discussion of the operations of FIG. 7 of section 2. For instance, the selection criteria might contain characteristics (e.g., activity on a user's electronic device, search behavior, income, zip code, etc.) that help target or identify a user. In one embodiment, the selection criteria as generated by the selection criteria generator 1820 define a location of an electronic device associated with the potentially targeted user. In another embodiment, the selection criteria generated by the selection criteria generator 1820 include a history of web sites or URLs visited. In another embodiment, the selection criteria generated by the selection criteria generator include a history of web sites or URLs that are not visited. In still another embodiment, the selection criteria generated by the selection criteria generator 1820 include positive (e.g., did search URL X) as well as negative characteristics (e.g., did not search URL X).

As shown in FIG. 18, selection criteria generator 1820 generates the selection criteria. In the present embodiment, the components of system 1800 are located at the data source layer, however, in other embodiments the selection criteria generator 1820 is located at other layers of FIG. 5.

In addition, the user profile which is compared against the selection criteria includes user information collected from at least one electronic device associated with the potentially targeted user. A full discussion on the user information of the user profile is provided in conjunction with a discussion of the operations of FIG. 7 of section 2. For example, user information might contain the user's search behavior, name, zip code, etc.

Further, the selection criteria that are generated by selection criteria generator 1820 are used to determine whether the user profile satisfies the selection criteria with requiring a release of any user information in the user profile, in accordance with one embodiment of the present invention. In another embodiment, user information is not required to be released to a data source. That is, in determining whether the user profile satisfies the selection criteria, user information is not required to be released beyond the line A-A in FIG. 5. More specifically, in determining whether the user profile satisfies the selection criteria, user information is not required to be released to the data source (e.g., 511, 513, or 515) of FIG. 5. As such, user information associated with the potentially targeted user that is used to determine whether the user profile satisfies the selection criteria is not required to be released. In other words, the determination that the potentially targeted user is selected as one to whom the data is targeted is made without releasing any of the user information.

In one embodiment, the data includes open faced questions. That is, a question is posed to the targeted user. Based on the answer to the question, a follow on offer for the delivery of additional data is sent to the targeted user. For example, an open ended question to a targeted user might ask if the user owns a green car. If the user answers positively, another additional offer is posed to the user wherein the additional offer asks if the user would like to see additional advertisements.

A close relationship exists between the data as generated by data generator 1810 and selection criteria as generated by selection criteria generator 1820. In particular, the selection criteria is generated very narrowly and with great granularity to target data to a specific group of users. As such, various relationships exist in generating both the data and the selection criteria.

In one embodiment the data is generated by data generator 1810 before the selection criteria are generated by the selection criteria generator 1820. That is, the data is generated by the data generator 1810 with a general user in mind. Thereafter, selection criteria is created which pertain to a particular group of users which are targeted for the delivery of data generated by the data generator 1810. As such, in one case the selection criteria is more general, and targeted to a wide group of users. In another case, the selection criteria is more specific, and is targeted narrowly to appeal to a specific group of users. In both cases, the advertisement is identical.

As an example, the data is an advertisement promoting laundry detergent. In one case, the selection criteria are used to describe characteristics of a homemaker. Targeting of the homemaker through the method of flow diagram 1700 is a supplement to more traditional forms of advertising targeted to the homemaker, such as television advertisements during soap operas. In another case, the selection criteria describes characteristics of a college student. In such an embodiment, the targeting of the college student through the method of flow diagram 1700 is more effective than traditional forms of advertising, since college students may not be exposed to television or print advertising.

In another embodiment, the selection criteria are generated by selection criteria generator 1820 before the data is generated by data generator 1810. That is, the data is narrowly generated with a particular user group in mind. In the present embodiment, a specific group of users and their characteristics are first determined. Thereafter, the data is generated to be targeted to that particular group of users. In this scenario, data is narrowly tailored to appeal to the specific group of users that are targeted.

In the above scenario two different items of data are generated by data generator 1810 even though they both promote the same product, for example a high performance outdoor jacket. In one case, the selection criteria generated by the selection criteria generator 1820 narrowly describes a group of users who rock climb on a regular basis. Thereafter the data promoting the outdoor jacket is created to appeal to the rock climbers as a group of users and includes images of rock climbers wearing the jacket. This same selection criteria is used for other data (e.g., rock climbing equipment) that is targeted to that group of rock climbers.

In another case, the selection criteria generated by the selection criteria generator 1820 more generally describes a group of users who like to wear quality outdoor gear whether walking around town, hiking, etc. The data promoting the outdoor jacket is generated by the data generator to appeal to this more general group of users and includes images of hikers wearing the jacket. In both cases, the advertisement is different.

In still another embodiment, the data generated by data generator 1810 and the selection criteria generated by the selection criteria generator 1820 are created jointly. That is, the data and the selection criteria are created simultaneously.

Also, in another embodiment, the data is configured by data generator 1810 such that a design module is capable of customizing the data to a potentially targeted user based on user information in an associated user profile. That is, once the user profile of the potentially targeted user is determined to satisfy the section criteria, before delivery, the data is customized to the potentially targeted user using a customizer, not shown. For example, using the example of a user in the market for an inkjet printer, if the query included search terms that included a search URL of company A, and a non-search of company C, the data is customized to include the following terms: "Reasons that company C's inkjet printers are superior to company A's inkjet printers."

At 1730, the present embodiment optionally generates a query for determining whether the user profile satisfies the selection criteria. A full discussion describing the operations used for determining whether a user profile satisfies the selection criteria is provided in conjunction with a discussion of the operations of FIG. 7 of section 2. As shown in FIG. 18, a query generator 1830 generates the query.

Further, the selection criteria is included within the query that is used for the targeted delivery of data, as previously described in conjunction with FIG. 13 of section 3 in accordance with one embodiment of the present invention. The query is broadcast to a plurality of users by a broadcaster (e.g., one located at the broadcast layer of FIG. 5). More specifically, the query is broadcast to a controller associated with a potentially targeted user. The controller is able to access the user profile associated with the potentially targeted user and compare the user profile against the target profile defined by the selection criteria to determine if the user profile satisfies the selection criteria.

In one embodiment, the selection criteria are modified by selection criteria generator 1820 before the query is broadcasted to a plurality of users. That is, the selection criteria are adjusted by selection criteria generator 1820 to pinpoint delivery of the data to a particular group of users. For instance, data is generated that is targeted to a group of users. If it is found that the query used to target delivery of the data to the group of users had a low hit rate, then the selection criteria used in the query are adjusted before making another broadcast.

In another embodiment, the offer is only broadcast once by a broadcaster (not shown). That is, to discourage fraud, the availability of the data is not repeated so that fraudulent users cannot try afterwards to generate a user profile that satisfies the selection criteria included within the offer. As a result, if the offer is only broadcast once, then there is no incentive to try to simulate the characteristics identified by the selection criteria in hopes of generating consideration when that offer is repeated in the future.

In still another embodiment, to prevent fraud, the query generated by query generator 1830 is partially encrypted so that it is difficult to determine exactly what characteristics are included within the selection criteria of a query. In such an embodiment, the risk of broadcasting a query multiple times and having users guess and simulate the characteristics comprising the selection criteria is lower.

At 1740, the present embodiment generates an incentive by incentive generator 1840 as compensation or consideration for delivering the data to the potentially targeted user. In the present embodiment, the offer for the delivery of data includes the incentive. The incentive is compared against a user selected relevancy criteria to determine if the user is interested in being presented with the offer. A full discussion of the user selected relevancy criteria is provided in relation to FIG. 9 of section 2.

For instance, the incentive is an offer of a certain amount of money, called the bid price, submitted by a data source. The user selected relevancy criteria is the minimum amount of money the user requires to view an advertisement, called an ask price. In such an embodiment, the data is delivered when the incentive bid price meets or exceeds the ask price.

In addition, an incentive limiter 1850 is shown in system 1800. The incentive limiter 1850 sets a cap on the total amount of incentives that are distributed for a particular item of data. That is, the incentive limiter 1850 limits the incentives that are paid to a set of targeted users whose user profiles satisfy the selection criteria. As such, even if a user profile of a particular user satisfies the selection criteria, any incentive will not be paid to the user since the cap has been reached. In still another embodiment, a cap is placed on payments to individual users. This is also an important tool for limiting fraud. For instance, incentive payments are capped to all users associated with a specific US postal address.

In still another embodiment, the number of users whose user profiles satisfy the selection criteria of an offer and whose asking price for their attention is exceeded by the bid price associated with the offer is not known before the distribution of the offer. As such, the cost for distributing the offer is unknown. This is addressed using caps, random sampling, message primitives, and voting protocols. For example, in one embodiment, the costs for distributing incentives are capped by specifying to users that only the first n number of users whose user profiles satisfy the selection criteria and accept will receive an incentive. In another embodiment, through random sampling of the user population, the overall cost of an advertisement is estimated to (almost) arbitrary accuracy. In still another embodiment, anonymous message primitives are allowed in the system (e.g., through a broadcast layer that uses a peer-to-peer architecture), and the number of user profiles that satisfy the selection criteria is determined transparently to users, still without violating a user's privacy. In another embodiment, internet voting protocols are used to determine the number of users whose user profiles satisfy the selection criteria.

In addition, the present embodiment is configured such that user information is released upon delivery of data. That is, once the present embodiment determines that a user profile of an associated user satisfies the selection criteria of a query, and the data has been delivered for viewing by the user, user information is released as compensation or consideration of receipt of the data by a receiver (e.g., a receiver at the data distributor 520 of FIG. 5).

In another embodiment, information related to a set of targeted users is received by a receiver (e.g., a receiver at a data source of FIG. 5). The information is an aggregate of information compiled from the user information received from individual users upon receipt of data. In such an embodiment, the privacy of each individual user is still ensured since information is not identifiable to a particular user. Additionally, in embodiments in accordance with the present invention, user information is only released with explicit authorization by the user.

FIGS. 19A-F are diagrams illustrating exemplary user interfaces used to generate an offer for the targeted delivery of data, in accordance with one embodiment. The user interfaces of FIGS. 19A-F are implemented within the data source layer of FIG. 5, or by a third party between the data source layer and the data distributor layer of FIG. 5. In addition, the user interfaces of FIGS. 19A-F are implemented in conjunction with the data distributor layer of FIG. 5. That is, a server associated with a data distributor of the data distributor layer of FIG. 5 manages the user interfaces of FIGS. 19A-F that are used to generate an offer for the targeted delivery of data. For purposes of illustration only, the offer that is generated in FIGS. 19A-F is related to a spam killer application advertisement that is being targeted to a particular group of users. In one embodiment, the broadcasting of the offer is implemented through client polling. In addition, values and terms used as inputs are for illustration only and other embodiments of the present invention support various other values and terms.

Figure 19A:
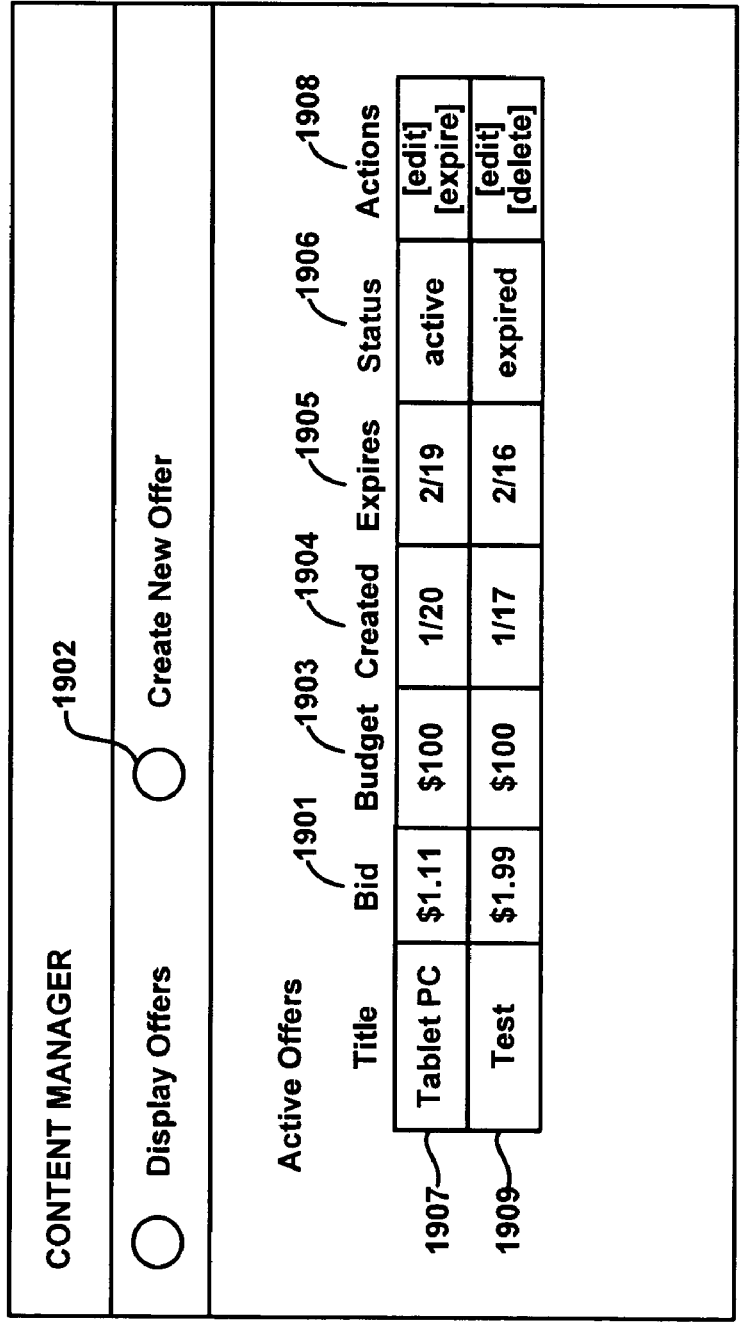

Turning now to FIG. 19A, a window 1900A of a user interface for generating an offer is shown, in accordance with one embodiment. The window 1900A is a content manager for a system that is capable of targeted delivery of data. The window 1900A is relevant to a data source that is simultaneously presenting multiple offers for the delivery of different items of data. For example, as shown in FIG. 19A, two active offers are shown. A first active offer presented by the data source is related to the heading of "Table PC." A second active offer presented by the data source is a TEST offer in row 1909.

Information in row 1907 is provided for the heading of "Tablet PC." For example, the bid price is set to $1.11 in column 1901 and represents the amount of cash as an incentive the data source is willing to pay for the targeted delivery of data. In addition, a budget of $100.00 total is included in column 1903 and represents the maximum incentives the supplier is willing to pay for the distribution of the data. That is, no more than $100.00 is to be distributed as incentive for the delivery of data. In the next two columns, a creation date is included in column 1904 and an expiration date is included in column 1905. Also, in column 1906, the status of the offer with the heading of "Tablet PC" is included. As shown in FIG. 19A, the offer for the data with the heading of "Tablet PC" is in an active state. In column 1908, further options are available. For example, editing of the offer is possible, changing the expiration date is possible, or deleting the offer is possible.

A button 1902, when invoked, presents exemplary interfaces used to generate another offer. That is, button 1902 enables entry to the interfaces of FIGS. 19B-E in order to generate a new offer.

FIG. 19B is a window of an exemplary user interface 1900B that is used to create an offer for the promotion of the spam killer application, in accordance with one embodiment of the present invention. In general, FIGS. 19B-E are used to generate a new offer.

At input block 1910, the title of the advertisement is created. That is, the text "Spam Killer" referring to the application being promoted is included within block 1910. As such, the offer is being generated to promote the "Spam Killer" application.

At input block 1912, additional information is included that is related to the "Spam Killer" application. This additional information is presented to a potentially targeted user for helping that user decide if the "Spam Killer" application is worthwhile to view.

At input block 1915, a method of delivering data is presented. For example in window 1900B, a URL is inputted that contains the data, in this case the advertisement that is promoting the "Spam Killer" application. As such, the offer being generated includes the link to the URL contained in block 1915. If the user profile satisfies the selection criteria, as later defined, then the URL at block 1915 is invoked to deliver the data contained within the URL.

Once the blocks in window 1900B have been completed, selection of the continue option brings up window 1900C.

FIG. 19C is a window of an exemplary user interface 1900C that is used to set selection criteria, in accordance with one embodiment. More specifically, the user interface 1900C is used to generate selection criteria used to identify targeted users. As such, those user profiles that satisfy the selection criteria are the targeted users to whom the delivery of data is targeted.

Block 1937 provides a summary of important information associated with the offer being generated by the user interfaces of FIGS. 19B-E. For example, the title of the application is included, along with a brief description of the application. The location of the URL where the data is located (e.g., the advertisement) is also included.

The first matching criteria includes the exact terms used in recent searches. Block 1930, a drop-down field, describes the type of the first matching criteria as "Exact Search String." Input block 1931 includes the terms or values of the "Exact Search String." In block 1931, the term "spam" is used to define characteristics of targeted users. That is, the selection criteria is isolating users who have searched the internet using the "spam" search term.

The second matching criteria includes a visited URL. Block 1933 describes the type of the second matching criteria as "URL (visited)." In block 1934, the term "http://howtokillallspam" is used to define the visited URL for the second matching criteria.

Block 1935 is presented to illustrate that multiple criteria is used to define characteristics of the targeted users. For instance, another type of "URL (visited)" is used as a third matching criteria. In such an embodiment, the value is blank until the URL is entered.

Once the input blocks in window 1900C have been completed, selection of the continue option brings up window 1900D.

FIG. 19D is a window of an exemplary user interface 1900D that is used to confirm the matching criteria that is set in window 1900C, in accordance with one embodiment of the present invention. More specifically, the user interface 1900D is used to confirm the selection criteria used to identify targeted users.

Block 1947 provides a summary of important information associated with the offer being generated by the user interfaces of FIGS. 19B-E. For example, the title of the application is included, along with a brief description of the application. The location of the URL where the data (e.g., the advertisement) is accessed is also included, as well as the data source that generates the data associated with the offer. In this case, the "Test Advertiser" is the provider.

In window 1900D, two selection criteria have been generated. At row 1941, the selection criteria for the "spam" search term is presented in summary. At row 1942, the selection criteria for the URL "http://howtokillallspam" is presented in summary. In column 1945, an action is available to delete either of these selection criteria. In addition, selection of option 1949 allows the user to return to window 1900C and add another selection criteria, for example.

Once the input blocks in window 1900D have been completed, selection of the continue option brings up window 1900E.

FIG. 19E is a window of an exemplary user interface 1900E that is used to set the budget for the offer created in FIGS. 19B-E, in accordance with one embodiment of the present invention.

Block 1957 provides a summary of important information associated with the offer being generated by the user interfaces of FIGS. 19B-E. The summary in block 1957 is identical to the summary in block 1947.

Input block 1951 sets the total budget for distributing the offer. In block 1951, five thousand dollars is set as the total budget. As such, up to five thousand dollars will be distributed as incentives for the delivery of the advertisement promoting the "Spam Killer" application, for example in one embodiment.

Input block 1953 sets the individual cap for incentives that are paid for each delivery of data to a targeted user whose user profile satisfies the selection criteria of the offer. In this case, a sum of $2.45 is provided as incentive to be distributed. The incentive is distributed to the user who receives the advertisement, the data distributor broadcasting the offer, or a combination of the two, in embodiments of the present invention.

Input block 1955 sets the block of time that the offer is valid. In this case, a total of 30 days is provided as a window for an active offer.

Once the blocks in window 1900E have been completed, selection of the continue option brings up window 1900F. In FIG. 19F, a window 1900F of a user interface for generating an offer is shown, in accordance with one embodiment of the present invention. The window 1900F is a content manager to a system that is capable of targeted delivery of data and is similar to the window 1900A of FIG. 19A, except for the additional row of information 1960 indicating the offer generated through the use of windows 19B-19E.

The window 1900F is relevant to a data source that is simultaneously presenting multiple offers for the delivery of different items of data. For example, as shown in FIG. 19F, three active offers are shown. A first active offer presented by the data source is related to the heading of "Table PC." A second active offer presented by the data source is a TEST query in row 1909. In addition, a third active offer presented by the data source is related to the newly generated offer with the heading of "Spam Killer."

In accordance with another embodiment of the present invention, a conversion tracking capability is provided for a particular offer. For purposes of the present Application, the term "conversion" is intended to refer to a specific action taken by a user in response to an offer. Typically, the action has some benefit to the originator of the offer. As such, conversion includes hard actions, such as purchasing a product, or soft actions, such as clicking through a web site, or signing up for an electronic newsletter delivered over the internet, etc. In addition, in another embodiment, an incentive (e.g., cash, frequent flier miles, coupons, etc) can be paid to the user and/or the network owner delivering the offer when the user performs a conversion. For example, a user is said to convert when they purchase the good being offered by that advertisement. That is, for a particular offer, the present embodiment is able to track a future event, such as the conversion of a product being promoted in the offer. For example, an offer associated with promotional data advertising a tennis racket is tracked. That is, the present embodiment is able to track the total number of tennis rackets being promoted that were sold to the targeted users whose user profiles satisfy the selection criteria of the offer.

In still another embodiment of the present invention, the cookies related to delivery of the data are automatically blocked. Cookies are used to identify users who have visited a URL, for example. In this manner, further protection of the identity of the targeted user is preserved.

In accordance with another embodiment of the present invention, multiple items of data are generated for a single query. For example, one query is associated with two or more advertisements for the same product. The present embodiment is able to track the version of the data that is presented to a particular user and ensure that only one item of data is presented to that user. For instance, one version of an advertisement of a single product is only presented to the targeted user.

In still another embodiment, an auction is provided for a particular type of data that is targeted to one targeted user. For example, one item of data (e.g., an advertisement) is promoting vehicle type V and is generated by dealer A. At the same time, a second item of data promoting the same vehicle type V is generated by dealer B. The first and second items are not identical. That is, the items of data are tailored to each individual dealer, A and B. One item of data is tailored to dealer A for the promotion of vehicle type V, and the other item of data is tailored to dealer B for the promotion of vehicle type V. In addition, the selection criteria is configured such that the first and second items of data are targeting a single user.

In such an embodiment, the present embodiment employs an auction between dealer A and B in order to determine which dealer can deliver their item of data. In this way, additional revenue is generated, and the user is not bombarded with two advertisements promoting the same product.

Section 5: Business Method for Generating Revenue by Enabling Targeted Data Delivery Embodiments of the present invention are discussed within the context of electronic devices that are associated with a user. One electronic device, for example is the PC and is used for illustrative purposes. Although the PC is used for purposes of brevity and clarity in many of the following examples, other embodiments of the present invention are well suited to creating networks of users for the targeted delivery of data using electronic devices other than PCs.

In one embodiment, manufacturers of PCs can leverage their position to create a network of users that are controlled by the PC manufacturer as the network owner. The PC as a commodity is ubiquitous throughout the world. As such, the PC is used to efficiently connect data sources (e.g., advertisers) and users through the targeted delivery of data (e.g., advertisements). For example user information collected from PCs is used to efficiently target delivery of data. In one implementation, a data source targets data to users over a communication network based on the user information. As an added benefit, the targeted delivery of data is accomplished without requiring a release of any of the user information absent authorization and consent by the user. As a result, data sources utilize networks, which couple vast numbers of PCs, to electronically distribute their data to a large audience of PC users.

As a result, the use of the PC for the targeted delivery of data provides economic advantages to manufacturers of the PC. In this way, the use of the PC brings an economic benefit both to the user and manufacturers of the PC. This economic shift to the manufacturer of the PC, for example, would be in direct contrast to another highly commoditized technology, the television (TV) which provides virtually no marginal economic benefit to manufactures of the TV with the use of their TV product. For example, TVs are ubiquitous and inexpensive. As such, manufacturers of TVs marketed to the general public have low profit margins. However, even though the television occupies a crucial position in the chain of delivering content to users, heretofore the use of the TV provides little or no economic benefit to the TV manufacturers. That is, the conventional use of TVs and PCs directs profits to the suppliers of content and the suppliers of software that shape the delivery of content, and not the manufactures of the TVs or PCs.

On the other hand, embodiments of the present invention provide for a network architecture that allows PC manufacturers as data distributors to leverage their position as a supplier and center point of tens of millions of PCs in order to obtain an economic benefit from the use of PCs. This is possible by turning the base of computer users into a proprietary network of users to which data (e.g., advertising) is delivered. The network architecture of embodiments of the present invention is beneficial in that it discourages spam. In addition, the network architecture provides for highly relevant targeted advertising by exploiting the PC's position as the last link in the delivery of content. Also, the network architecture protects the privacy of all user data.

Figure 20:
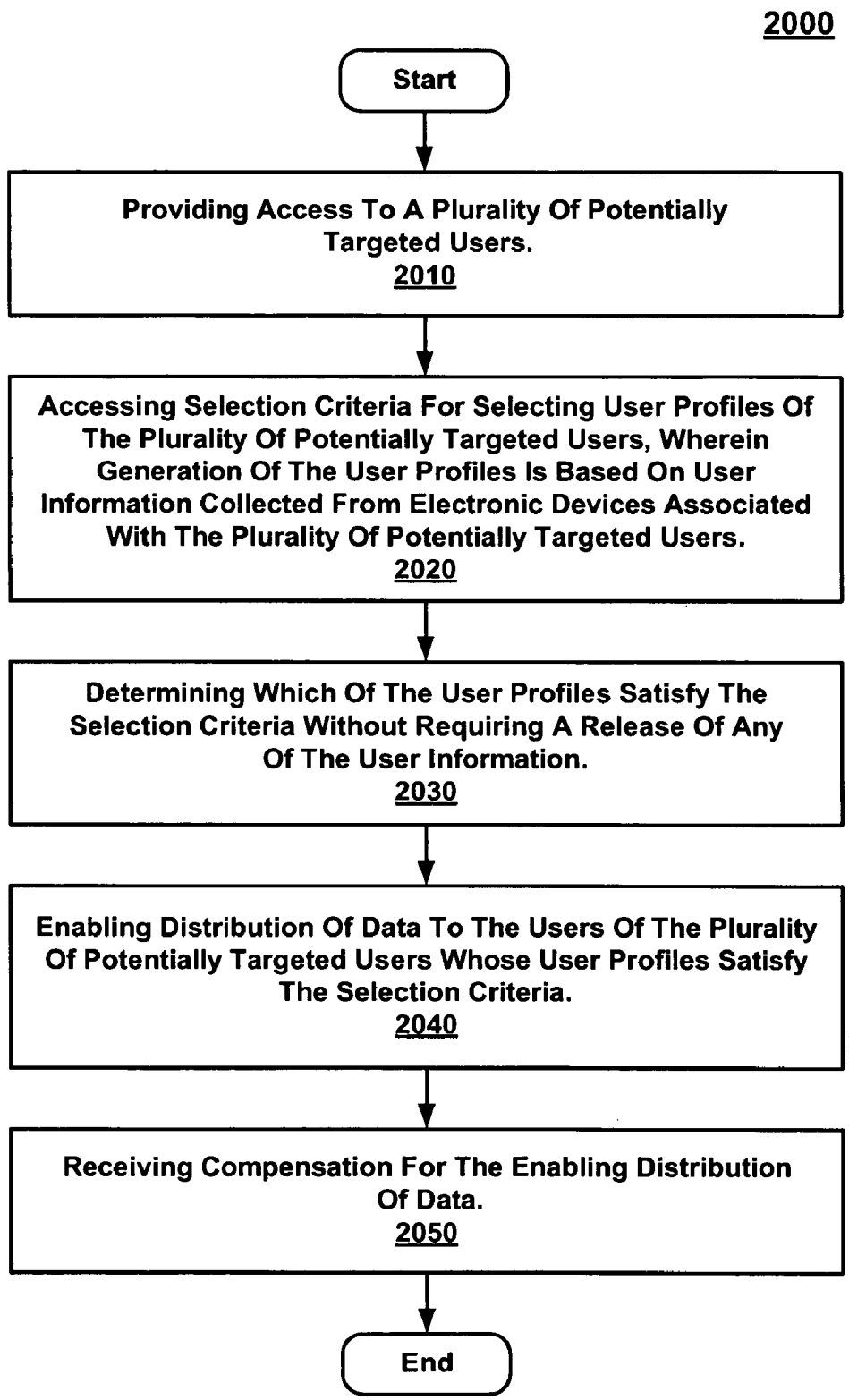
FIG. 20 is a flow diagram illustrating operations in a business method for revenue generation by enabling targeted data delivery, in accordance with one embodiment of the present invention.

FIG. 20 is a flow diagram 2000 illustrating operations in a business method for revenue generation by enabling data delivery to selected targets, in accordance with one embodiment of the present invention. The flow diagram 2000 is capable of providing an economic benefit to network owners that control access to a network of users.

At 2010, the present embodiment provides access to a plurality of potentially targeted users. Access to the plurality of potentially targeted users is achieved through a proprietary network, such as a virtual network. For example, in one embodiment, access is provided through the data distribution layer of FIG. 5 as the network owner.

As such, the targeted delivery of data provides benefits for network owners (e.g., data distributors of FIG. 5) who control the proprietary network. In such an embodiment, the network of potentially targeted users is owned by the network owner, and as such, access to those users is through the network owner. As such, data is targeted to those users through the network owner. Since the network owner is a control point, it realizes an economic benefit from providing the access to those users in its network.

At 2020, the present embodiment accesses selection criteria used for selecting user profiles of the plurality of potentially targeted users. The selection criteria is used to identify users to whom delivery of data is desired. As such, the selection criteria includes characteristics of users to whom the data is targeted. For example, the selection criteria defines in one embodiment behavioral activity of the targeted users on associated electronic devices. In addition, in another embodiment, the selection criteria defines a history of web sites visited, or not visited, or a combination of both.

In the present embodiment, the user profiles are based on user information collected from electronic devices associated with the plurality of potentially targeted users. For example, user information in one embodiment includes behavioral characteristics of the plurality of potentially targeted users. A full description of the collection of user information from associated electronic devices is provided in FIG. 7 of section 2.

At 2030, the present embodiment determines which of the user profiles associated with the plurality of potentially targeted users satisfy the selection criteria. As such, the present embodiment is able to provide access to the user profiles of the plurality of potentially targeted users in order to determine which of the user profiles satisfy the selection criteria.

More specifically, the selection criteria are included within a query that is performed to determine which user profiles of a plurality of potentially targeted users satisfy the selection criteria. That is, the query is forwarded to the plurality of potentially targeted users. The query is performed against the user profiles of the plurality of potentially targeted users to identify which of the potentially targeted users is a targeted user. A full discussion of the selection criteria and their use in determining whether a user profile satisfies the selection criteria is provided in FIG. 13A of section 3.

Moreover, the determination of which user profiles in the plurality of potentially targeted users satisfy the selection criteria is performed without requiring a release of user information in the user profiles. As such, the privacy of the plurality of potentially targeted users is maintained. That is, the network including the plurality of potentially targeted users targets the delivery of data by determining if a user profile satisfies the selection criteria without releasing any of the user information used to make that determination.

At 2040, the present embodiment enables distribution of data to the users of the plurality of potentially targeted users whose user profiles satisfy the selection criteria. The data is generated by a data source with the knowledge that the data is delivered to targeted users who are defined by definable user characteristics and whose user profiles satisfy the selection criteria. As such, the data is tailored to appeal directly to those targeted users.

At 2050, the present embodiment receives compensation or consideration for enabling the distribution of data. That is, the present embodiment is able to receive compensation or consideration for enabling the targeted delivery of data to a plurality of potentially targeted users whose user profiles satisfy the selection criteria. That is, by providing access to a plurality of potentially targeted users through a proprietary network, an economic platform is created that generates income for the targeted delivery of data to users whose user profiles satisfy the selection criteria.

In one embodiment, the source of the data provides the compensation to the network owner who controls access to the plurality of potentially targeted users. For example, the data source is an advertiser who is interested in the targeted delivery of advertisements, in one embodiment.

In another embodiment, the network owner who controls access to the plurality of potentially targeted users is a search engine. In such an embodiment, the search engine provides the network to perform the targeted delivery of data and, as such receives compensation for the targeted delivery of data to user profiles that satisfy the selection criteria.

In still another embodiment, the network owner who controls access to the plurality of potentially targeted users is an internet service provider (ISP). In such an embodiment, the ISP provides the network to perform the targeted delivery of data and, as such receives compensation for the targeted delivery of data to user profiles that satisfy the selection criteria.

In still another embodiment, the user to whom the data is delivered receives compensation. For example, an incentive as compensation or consideration is paid to the user for the user's attention in receiving and viewing the data. In that case, the offer for the delivery of data includes the incentive that is generated as consideration for the delivery of the data to a targeted user. The incentive is used to determine if a targeted user deems it worthwhile to receive the data, and as consideration for the delivery of the data. A full discussion of the satisfaction of the user selected relevancy criteria is presented in relation to FIG. 9 of section 2.

As a result, embodiments in accordance with the present invention enable the ubiquitous PC to be converted from a commodity with low profit margins to a revenue generating device. Other embodiments in accordance with the present invention are well suited to converting other low margin electronic devices to a high revenue generating appliance. For example, other low margin electronic devices include, but are not limited to, videocassette recorders (VCRs), personal digital assistants, cell phones, etc.

More specifically, embodiments in accordance with the present invention provide for after market revenue generation of these PCs and other low margin electronic devices. That is, instead of ending the economic relationship between a user who has purchased of one of these low margin electronic devices that are commodities, embodiments in accordance with the present invention establish an on-going economic relationship with the user. The relationship can extend for the lifetime of the user.

Embodiments in accordance with the present invention encourage participation of users by providing economic incentives and awards to the user. Specifically, by a user participating in a data delivery network, the present embodiments provide incentives to the user for viewing data that is relevant to the user's interests. Other embodiments reduce the amount of user's attention given to unwanted data. As such, embodiments of the present invention provide an economic and time benefit to the user.

In addition, the owner of the data delivery network (e.g., the data distributor) receives payment for delivering data to the user, in accordance with embodiments of the present invention. That is, by providing the network that allows access to the user and other users, embodiments of the present invention provide for revenue generation to the data distributor for the targeted delivery of data. The larger the network of users, the larger the revenue stream flowing to the data distributor. Also, the revenue flow per user can be timeless. That is, a user may participate within the data delivery network for the lifetime of the user if the incentives make it worthwhile to stay for the extended period.

Moreover, embodiments in accordance with the present invention are capable of providing the targeted delivery of data while maintaining the privacy of the users. As such, embodiments of the present invention are able to develop good will amongst the network of users that participate in the targeted delivery of data. This in turn develops a core of loyal customer users who are comfortable in receiving the targeted delivery of data, while at the same time receiving an economic incentive.

Hence, embodiments in accordance with the present invention provide for the extension and creation of a relationship with a user through a commoditized electronic device. As such, embodiments in accordance with the present invention are able to continue the relationship beyond the sale of the electronic device, and further are capable of generating revenue both for the user and the owner of the network (e.g., data distributor) that provides the targeted delivery of data. This revenue stream conceivably can last the lifetime of the user.

Figure 22:
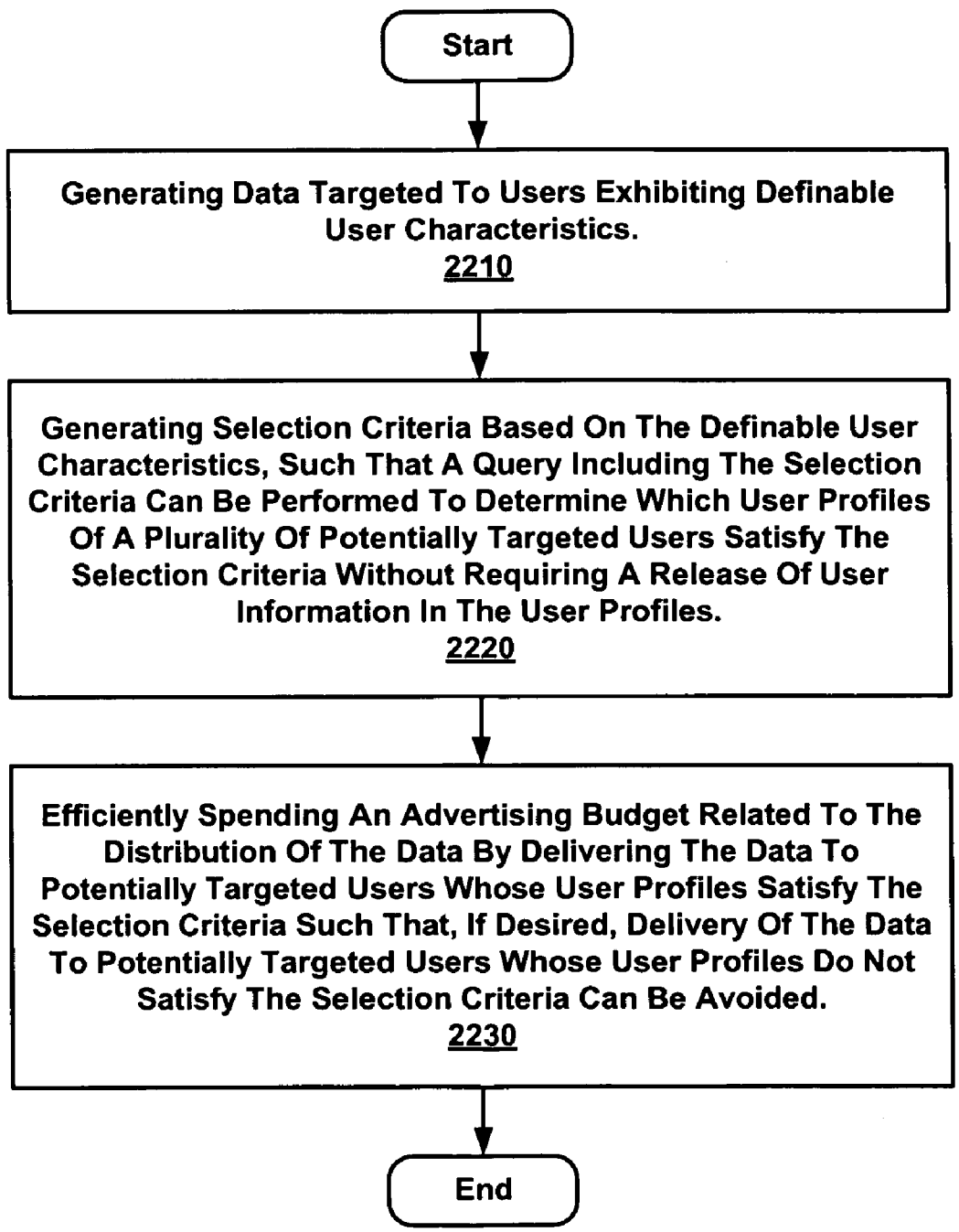
FIG. 22 is a flow diagram illustrating operations in a business method for efficiently spending an advertising budget by enabling delivery of the promotion data (e.g., advertisements) to selected targets, in accordance with one embodiment of the present invention.

Section 6: Business Method for Generating Increased User Interest and Efficient Allocation of Advertising Resources by Enabling Targeted Data Delivery FIGS. 21 and 22 utilize the methods and systems as presented in the FIGS. 1-19 to provide increased user interest in the delivery of data and the efficient use of advertising money when advertising. Specifically, embodiments of the present invention of FIGS. 21 and 22 are capable of being implemented within the network structures of FIGS. 5 and 12 for the targeted delivery of data. That is, users are identified and targeted for the delivery of data without requiring a release of any user information.

FIG. 21 is a flow diagram 2100 illustrating operations in a business method for generating increased user interest in a particular item of data by enabling delivery of the data to selected targets, in accordance with one embodiment of the present invention. Embodiments of flow diagram 2100 are able to perform targeted delivery of data to generate increased interest in data while protecting the privacy of targeted users. Because embodiments of the present invention are able to deliver data to targeted users within a proprietary network, a revenue stream is generated related to the targeted delivery of data.

At 2110, the present embodiment generates data targeted to users exhibiting definable user characteristics. That is, data is generated with the knowledge that the data will be delivered to targeted users who are defined by the definable user characteristics. As such, the data is tailored to appeal directly to those targeted users. Since the data will not be received by users other than the targeted users, concerns relating to the creation of the data relevant to those users other than the targeted users do not need to be addressed. Generation of data is fully described in relation to FIG. 17 in section 4.

At 2120, the present embodiment generates selection criteria based on the definable user characteristics. This selection criteria is used to identify users to whom delivery of data is desired. The selection criteria includes characteristics of users to whom the data is targeted. For example, the selection criteria defines, in one embodiment, required behavioral activity of the potentially targeted users on associated electronic devices. In addition, in another embodiment, the selection criteria defines a list of web sites that must have been visited, or not visited, or a combination of both.

More specifically, the selection criteria is included within a query that is generated. The query is used to target delivery of the data. The query is forwarded to a plurality of potentially targeted users. The selection criteria is used to determine potentially targeted users whose user profiles satisfy the selection criteria. That is, performance of the query determines which user profiles of a plurality of potentially targeted users satisfy the selection criteria. A full discussion of the query and its use in determining whether a user profile satisfies the selection criteria is provided in FIG. 13A of section 3.

In one embodiment, the data is associated with an incentive that is generated as consideration for the delivery of the data to a targeted user. In one embodiment of the present invention, the incentive is included within the offer for the delivery of the data. The incentive determines if a targeted user deems it worthwhile to receive the data, and as consideration for the delivery of the data.

As such, the incentive is compared against a user selected relevancy criteria of said targeted user. For example, the incentive includes an incentive bid price, such that the targeted user's relevancy criteria is satisfied by the incentive when the incentive bid price meets or exceeds the user ask price defined by the user selected relevancy criteria. The incentive is used to determine which of those users whose user profiles satisfies the selection criteria are willing to consider the associated offer of data delivery. A full discussion of the satisfaction of the user selected relevancy criteria is presented in relation to FIG. 9 in section 2.

In addition, in return for the delivery of the data, the network owner receives user information that was used to determine if an associated user profile satisfies the selection criteria. This information is used to further refine the selection criteria for targeted users in the targeted delivery of data, in one embodiment.

Moreover, the determination of which user profiles in the plurality of potentially targeted users satisfy the selection criteria is performed without requiring a release of user information in the user profiles. As such, the privacy of the plurality of potentially targeted users is maintained. That is, a network including the plurality of potentially targeted users targets the delivery of data by determining if a user profile satisfies the selection criteria without releasing any of the user information used to make that determination without authorization or consent.

At 2130, the present embodiment generates increased user interest for the data by distributing the data only to targeted users. That is, the data is efficiently delivered only to potentially targeted users whose user profiles satisfy the selection criteria. In that way, if desired, the targeted delivery of data to potentially targeted users whose user profiles do not satisfy the selection criteria is avoided. As such, the data is distributed only to users who are perceived to be highly interested in the data, as opposed to distributing data to a wide audience through conventional means that includes users who are highly interested, mildly interested, and not interested in the data. As a result, because the delivery of the data is specifically targeted to users who have high interest in the data and the users know this, a higher degree of interest is generated in the data than would occur if the data were broadly distributed to a wide audience.

In one embodiment, for efficient distribution, the query is broadcasted to the plurality of potentially targeted users. More specifically, the query is broadcasted to a controller associated with a potentially targeted user. The controller is capable of comparing a user profile of an associated potentially targeted user against selection criteria to determine if the user profile satisfies the selection criteria. A full discussion of the broadcasting of the query is provided in relation to FIGS. 13A and 13B of section 3.

In one embodiment, to more efficiently target the data, the selection criteria are adjusted based on changes to the definable user characteristics exhibited. That is, if the definable user characteristics of the desired users change throughout the life of an offer, the selection criteria are adjusted to reflect those changes. In that case, new and refined selection criteria are generated that are used to determine which of the potentially targeted users have user profiles that satisfy the selection criteria.

FIG. 22 is a flow diagram 2200 illustrating operations in a business method for efficiently allocating advertising resources by enabling delivery of the data (e.g., advertisements) to selected targets, in accordance with one embodiment of the present invention.

Embodiments of the present invention are described within the context of the targeted delivery of data, and more specifically to the targeted delivery of an advertisement. Because embodiments of the present invention are able to deliver the advertisement to only targeted users, the costs per conversion are minimized. Embodiments of FIG. 22 of the present invention are discussed within the context of delivering advertisements, but other embodiments are well suited to the targeted delivery of data that are not advertisements.

At 2210, the present embodiment generates data (e.g., advertisements) targeted to users exhibiting definable user characteristics. The operation executed in 2210 is similar to the operations of 2110 of FIG. 21. A full discussion devoted to the generation of data is provided with respect to 2110 of FIG. 21.

At 2220, the present embodiment generates selection criteria based on the definable user characteristics, such that a query comprising the selection criteria is performed to determine which user profiles of a plurality of potentially targeted users satisfy the selection criteria without requiring a release of user information in the user profiles. The selection criteria includes characteristics of users to whom the data is targeted and is included within the query. The operation executed in 2220 is similar to the operations of 2120 of FIG. 21. A full discussion devoted to the generation of selection criteria is provided with respect to 2120 of FIG. 21.

At 2230, the present embodiment efficiently spends an advertising budget related to the distribution of the advertisement by delivering the advertisement to potentially targeted users whose user profiles satisfy the selection criteria. That is, advertising money related to the distribution of the advertisement, as data, is efficiently spent by using a system that is capable of highly satisfactory conversion rates. Efficient spending of the advertising budget is achieved, even though the cost per user for delivery of the data may be higher, because the advertisement is delivered only to interested users, which are more likely to perform an action that converts the advertisement. For example, the advertisement is delivered directly users whose user profiles satisfy the selection criteria. Moreover, advertising expenditures are focused on interested users by only delivering the advertisement to potentially targeted users whose user profiles satisfy said selection criteria.

As such, since the advertisement is only delivered to interested users, advertising expenditures need not be unnecessarily expended for the delivery of the advertisement to users who are not interested in the advertisement. That is, the present embodiment is capable, if desired, of avoiding delivery of the advertisement to potentially targeted users whose user profiles do not satisfy the selection criteria.

In addition, the present embodiment generates increased user interest for the data by distributing the data only to targeted users. That is, the data is delivered only to potentially targeted users whose user profiles satisfy the selection criteria. As such, the data is distributed only to users who are perceived to be highly interested in the data. As a result, because the delivery of the data is specifically targeted to users who have high interest in the data and they know this, a higher degree of interest is generated in the data than would occur if the data were broadly distributed to a wide audience. It is easier and cheaper to attract the attention of a user to an advertisement the user knows is likely to be interesting than to one the user expects to be uninteresting.

In another embodiment, increased interest in the data is generated by marking the data that is delivered to users whose user profiles satisfy the selection criteria. That is, the data is marked in such a way to indicate that the data has been delivered to a user because the associated user profile satisfies the selection criteria. In this manner, the user can immediately distinguish data of greater interest to the user because of the marking that indicates that the data has been delivered because an associated user profile has satisfied the selection criteria.

Further, the targeted delivery of data provides economic benefits for network owners (e.g., data distributors of FIG. 5) who control a proprietary network, such as a virtual network in embodiments of the present invention. The network of users is owned by the network owner, and as such, access to those users is through the network owner. As such, data is targeted to those users through the network owner. Since the network owner is a control point, it realizes an economic benefit from providing the access to those users in its network.

As such, in one embodiment, a distributor of the data receives compensation or consideration for enabling the targeted distribution of data. That is, the present embodiment is able to provide compensation or consideration to the distributor upon delivery of the advertisement to potentially targeted users whose user profiles satisfy the selection criteria. That is, by providing access to a plurality of potentially targeted users through a proprietary network controlled by the distributor, embodiments in accordance with the present invention establish an economic platform that generates income to the distributor for the targeted delivery of data to users whose user profiles satisfy the selection criteria.

In still another embodiment, the data distributor who forwards the offer to targeted users whose user profile satisfy the selection criteria receives compensation or consideration. That is, the data distributor receives compensation for delivering the offer to a user even though it has not yet been determined if the user accepts the offer for the delivery of the data.

In another embodiment, the distributor who controls access to the plurality of potentially targeted users is a search engine. In such an embodiment, the search engine provides the network to perform the targeted delivery of data and, as such receives compensation for the targeted delivery of data to users whose user profiles satisfy the selection criteria.

In still another embodiment, the distributor who controls access to the plurality of potentially targeted users is an internet service provider (ISP). In such an embodiment, the ISP provides the network to perform the targeted delivery of data and, as such receives compensation for the targeted delivery of data to users whose user profiles satisfy the selection criteria.

Also, in still another embodiment, the user to whom the data is delivered receives compensation or consideration. For example, an incentive as compensation or consideration is paid to the user for the user's attention in receiving and viewing the data. That is, an incentive payment associated with the query is paid to potentially targeted users whose user profiles satisfy the selection criteria and to whom the advertisement is delivered.

In addition, in another embodiment, the incentive determines if a targeted user deems it worthwhile to receive the data. That is, an offer is shown only to targeted users whose user selected relevancy criteria meets or falls below the incentive. A full discussion of the satisfaction of the user selected relevancy criteria is presented in relation to FIG. 9 of section 2.

Accordingly, various embodiments of the present invention disclose methods and systems for targeted data delivery. Embodiments of the present invention provide for protection of user privacy. In addition, other embodiments of the present invention provide the above accomplishments and provide for more efficient advertising by targeting advertising to interested recipients. Also, other embodiments of the present invention provide the above accomplishments and also discourage spam through a filtering mechanism through the preprocessing of messages to determine if they meet a relevancy criteria set by the user. In addition, embodiments of the present invention are able to provide an incoming revenue stream from commodity electronic devices after the initial sale of the electronic device (e.g., PCs). Various other embodiments achieve the above accomplishments and generate increased user interest for data by distributing data only to targeted users. Still other embodiments achieve the above accomplishments and also more efficiently advertise by delivering the advertisement to only users who are interested in it.

While the methods of embodiments illustrated in flow charts 100, 200A, 200B, 700, 900, 1300A, 1300B, 1500, 1700, 2000, 2100 and 2200 show specific sequences and quantity of operations, the present invention is suitable to alternative embodiments. For example, not all the operations provided for in the methods presented above are required for the present invention. Furthermore, additional operations can be added to the operations presented in the present embodiments. Likewise, the sequences of operations can be modified depending upon the application.

Section 7: A System and Method for Prefetching Data within a System for Targeted Data Delivery According to embodiments of the present invention, referring to FIG. 3 a user 350's client 340 receives an offer, e.g., 323, 325, and 327, for receiving data targeted to the user 350. The targeted data is delivered to the client 340 after the user 350 accepts the offer. However, the user 350 may be forced to wait for the data to be downloaded onto the user 350's client 340, for example, when there is a large amount of data to be delivered, when the client 340 does not have the power to download the data quickly, when the Internet 330 is slow, or when the connection is slow, among other things. In contrast, according to another embodiment of the present invention, the data that is targeted to the user is downloaded to the client 340 prior to the client 340 accepting the offer for the delivery of the data.

If a user 350 has to wait while data is being delivered to the client 340, their level of satisfaction will decrease and they will be less likely to accept an offer to deliver targeted data to their client 340, thus, reducing the profits of companies that offer the data, among other things. Delays in downloading data can also limit the types of data that can be presented to the user 350. For example, rich media, such as videos, are usually more effective in convincing users 350 to buy products than static web pages or flash animations, however, rich media is usually larger and requires more time to download.

Prefetching avoids causing the user 350 to wait while data is being downloaded to their client 340, as will become more evident. By prefetching data to the storage associated with a user 350's client 340, the data can be presented almost instantaneously to a user 350 once the user 350 accepts an offer for the data. Thus, prefetching increases user 350's satisfaction, increases profits for the companies that offer targeted data to user's 350, increases the probability that rich media can be delivered to a user's 350 client 340, and so on.

Among other places in the specification of the present application, FIGS. 3, 4, 5, 6, and 12 depict systems for targeted data delivery, according to embodiments of the present invention. For the sake of brevity and clarity, the detailed description for embodiments of the present invention shall mostly refer to FIGS. 3 and 12.

As already described herein, for example in the discussion presented in conjunction with FIG. 3, an offer includes a query 323, a link 325 to the data that is targeted to the user 350's client 340, and an optional payment 327 to the user 350 for accepting the offer. As depicted in FIG. 12, according to other embodiments of the present invention, an offer 1230 includes a query 1231, the data that is targeted to the user's client in the form of an advertisement 1233, and a bid price 1235 to be paid to a user 350 for accepting the offer 1230. The above discussion in conjunction with FIG. 16 describes yet another embodiment of an offer 1610.

As already described herein, according to embodiments of the present invention, data that is targeted to a user is delivered to an electronic device that is associated with a user 350. The electronic device is depicted in FIG. 3 as a client 340. Additionally, in FIG. 12, the example that is provided depicts the electronic device as a personal computer. As stated above, the electronic device can be a device or a set of devices which may or may not be personal computers.

As already described herein, according to embodiments of the present invention, information about a user is collected. A detailed description of the collection of user information is provided, for example, at 110 of FIG. 1, and also at 710 of FIG. 7, among other places herein. A user profile is generated based on the information about the user. A detailed description of the generation of the user profile is provided, for example, at 720 of FIG. 7. User profiles are depicted in FIG. 5, see, e.g., user profiles N, A, and B, and in FIG. 16, see, e.g., user profile database 1630.

According to embodiments of the present invention, data is targeted to users. Since data that is targeted to a user may be delivered to the user's client, the phrases "data targeted to a client," "targeted delivery of data to a client," "data targeted to a user," "targeted delivery of data to a user" and similar phrases shall be considered to be synonymous. The phrases "data associated with an offer", "offered data," "data targeted to a user," "targeted data" and similar phrases shall be interpreted as referring to the same "data."

Examples of data that can be targeted to a client include advertisements, videos, flash animations, web pages, and so on. Rich media is a term that shall be used to refer to videos, high definition data, or high quality data, among other things.

The data could be included directly in an offer or included indirectly in an offer, for example, by including a link to the data in the offer. For example referring to FIG. 12, the data that is targeted to a client is included directly in an offer 1230 in the form of an advertisement 1233. However, referring to FIG. 3, the data that is targeted to the client is included indirectly in an offer in the form of a link 325.

The data that is targeted to a client can be received, among other things, from a data source 310, 510, a server 320, an advertiser 1210, or a content server, among other things.

As already stated herein, according to certain embodiments of the present invention, the data is delivered to a client after the offer of delivery of the data is accepted. For example, a user 350 may accept the delivery of the data by accepting an offer. Among other places herein, the acceptance of delivery of data is described in the context of decision box 260 in FIG. 2B and decision box 930 in FIG. 9. However, according to another embodiment, the data is delivered, e.g., prefetched, to the client prior to the client accepting the offer of delivery of the data.

For example, prefetching the data may be initiated as soon as an offer is received at a client. In another example, prefetching the data may be initiated prior to determining if the "user profile satisfies the selection criteria." In still another example, prefetching the data may be initiated as soon as the "user profile satisfies the selection criteria." User profile satisfaction of selection criteria is described in the context of the comparator 840 in section 2, among other places in the specification.

In another example, prefetching data that is targeted to a client is performed prior to presenting an offer to a user 350 of a client 340. This would delay presenting offers that satisfy selection criteria until the data that would be offered could be prefetched. This additional delay, however, should not be significant, but could potentially improve a user's experience significantly. According to one embodiment, a client 340 would check if an offer is still valid just before presenting the offer to a user 350, as the offer may be canceled during the time the data was being prefetched. According one embodiment, prefetching data is mandatory.

Figure 23:
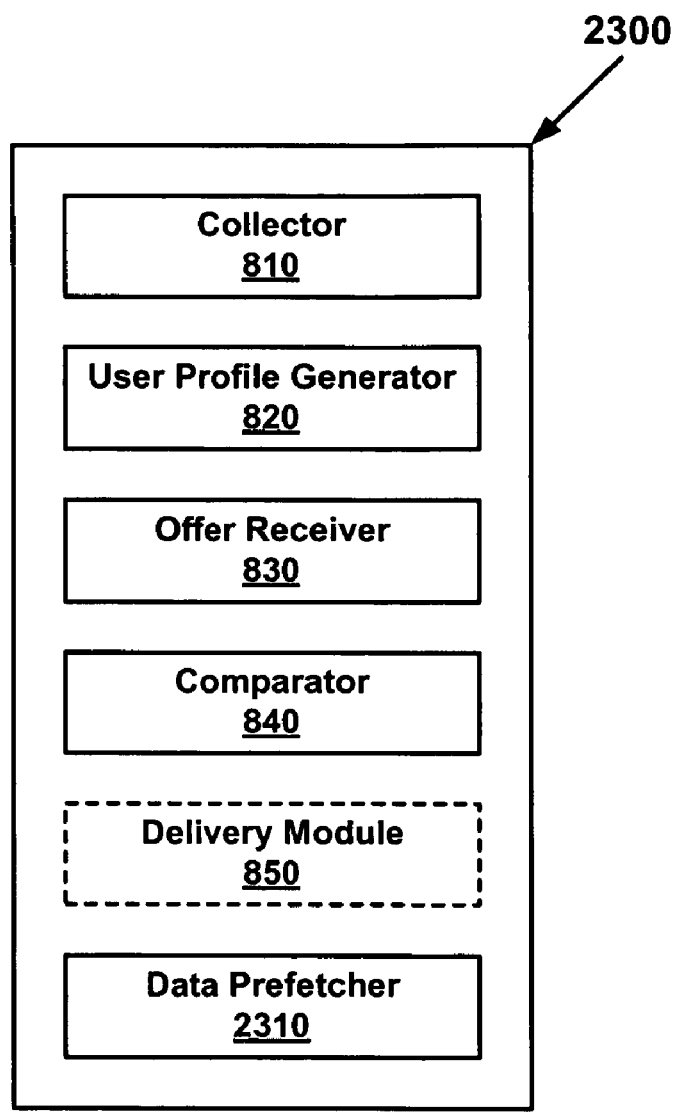
FIG. 23 is a block diagram of a system for prefetching data prior to the data being requested by a client in a system for targeted data delivery, according to embodiments of the present invention.

FIG. 23 is a block diagram of a system for prefetching data prior to the data being requested by a client in a system for targeted data delivery, according to embodiments of the present invention. The blocks that represent features in FIG. 23 can be arranged differently than as illustrated, and can implement additional or fewer features than what are described herein. Further, the features represented by the blocks in FIG. 23 can be combined in various ways. The system 2300 can be implemented with software, firmware, hardware, or with a combination thereof.

The system 2300 can be associated with a client, such as client 340. The system 2300 includes a collector 810, a user profile generator 820, an offer receiver 830, a comparator 840, an optional delivery module 850, and a data prefetcher 2310. The collector 810, the user profile generator 820, the offer receiver 830, the comparator 840, the optional delivery module 850 have already been described in the context of FIG. 8. The delivery module 850 is optional, for example, in the case of embodiments where prefetching is mandatory.

The offer receiver 830 provides a means for receiving an offer, e.g., 323, 325, 327, 1230, sent to a client 340 or consumer 1250 in the system 300 or system 1200 respectively for targeted data delivery, according to one embodiment. The offer enables the targeted delivery of the data to the client without requiring a release of any information about a user 350 of the client. For example, no information about the user 350 will be released until the user 350 accepts the offer, according to one embodiment. The offer may include the data that is targeted to the client either directly as depicted in FIG. 12 or indirectly as depicted in FIG. 3. The client is an electronic device that enables the user to accept the offer, according to one embodiment.

The data prefetcher 2310 provides a means for prefetching the data to the client 340 prior to the client accepting the offer of delivery of the data, according to one embodiment. For example, as already stated, the data is associated with the offer, e.g., 323, 325, 327, 1230, either directly or indirectly as described herein. The client can accept the delivery of the data, for example as described herein, by accepting the offer for the data. The data prefetcher 2310 provides a means for prefetching the offered data prior to a user 350 accepting the offer. For example, prefetching the data may be initiated as soon as an offer is received at a client. In another example, prefetching the data may be initiated prior to determining if the "user profile satisfies the selection criteria." In still another example, prefetching the data may be initiated as soon as the "user profile satisfies the selection criteria." User profile satisfaction of selection criteria is described in the context of the comparator 840 (FIG. 3) in section 2, among other places in the specification. In another example, prefetching data that is targeted to a client is performed prior to presenting an offer to a user 350 of a client 340.

In the case of multiple offers, the data prefetcher 2310 may prioritize the data that will be prefetched according to embodiments described herein. Further, according to embodiments described herein, the type of data that the data prefetcher 2310 prefetches may depend on factors such as the speed of the client 340's connection, the amount of storage associated with the client 340, the central processing unit (CPU) or graphics capabilities of the client 340. The data prefetcher 2310 may use transcoding or polite prefetching, as described herein.

According to one embodiment, the amount of data prefetched depends on the speed of a client's internet connection. If the client has a very high bandwidth connection, such as 10 megabytes/second fiber, very little data may need to be prefetched, since the bandwidth exceeds the playback rate of most video media. In this case, perhaps only the first few seconds of video data needs to be prefetched in order to reduce the startup latency of establishing the streaming connection. However, in the more common case of a digital subscriber line (DSL) or cable modem connection where the download data rate is much less than the video playback data rate, prefetching an entire video is required to avoid stalling during playback.

According to another embodiment, the order of that data associated with multiple offers is prefetched depends on factors, such as the order that the offers will be presented to a user, the likelihood that the offers will be accepted by a user, the value of each offers remuneration to the user, the time until each offer expires, or how well each offer's query is satisfied by the user's information, among other things. For example, if the first offer presented to a user is prefetched first and the user accepts the offer, then data for successive advertisements can be fetched while the advertisement is being shown to the user. Similarly, if the offered data is of a specific type, such as a beer advertisement, or type of remuneration, e.g., 327, 535, 1235, such as a coupon or discount, that a user has usually not accepted in the past, prefetching the data for such offers could be skipped in favor of data for offers more likely to be accepted by the user. The value of the remuneration to the user can be used for prioritizing the prefetching of data for an advertisement as well since the remuneration can have a significant effect on the likelihood of a user accepting the offer for the advertisement. The amount of time until an offer expires can be used in prioritizing since advertisements with longer lifetimes are more likely to eventually be accepted by a user than offers that are going to expire soon.

In another example, the order of prefetching targeted data associated with offers can be based on how well each offer's query 323 is satisfied by information about the user 350. According to this embodiment, an arithmetic value is determined and used as an indication of how well an offer's query matches information about the user 350. For example, if the arithmetic value for one offer A's query indicates that it is a better match with information about the user 350 than the arithmetic value for another offer B's query, then the targeted data associated with offer A will be prefetched before prefetching the targeted data associated with offer B, according to embodiments of the present invention. Therefore, embodiments in accordance with the present invention are well suited to use with techniques such as using arithmetic values that indicate how well an offer matches information about a user 350 to prioritize the prefetching of data associated with multiple offers.

The types of data that are prefetched may depend on the amount of free storage associated with a user 350's client 340. Disk drives are continuing to increase in size and have more capacity than most users need. However, some users may use their electronic devices for video editing or other data intensive tasks, in which case the amount of free storage could be more limited. In this case, less complicated types of data could be prefetched. For example, depending on the amount of storage a flash animation or a static web page may be prefetched instead of a video.

The types of data that are prefetched may depend on the speed of a client 340's connection with an internet 330. For example, if the client 340's connection with the internet 300 is 100 megabits per second or faster, a 30 frames per second (fps) 640×480 video could be prefetched. However, if the client 340's uses a digital subscriber line (DSL) or cable modem connection, a 15 fps 320×240 video might be prefetched instead. Finally, if the client 340 uses a dial-up connection, a link to a static web page might be prefetched.

The type of data that is prefetched may in a similar manner depend on the central processing unit (CPU) or graphics capabilities of the client 340. For example, if the client is a personal digital assistant (PDA), lower resolution videos or web pages could be prefetched instead of high resolution videos or web pages.

The type of data that is prefetched depends on the amount of storage that is available for storing prefetched data, according to one embodiment. For example, if the client 340's internet connection is not fast enough to play any video streamed directly over the internet 330, a small video could be prefetched. If a large amount of storage is available for storing prefetched data, a larger video could be prefetched.

According to another embodiment, different data with different resolutions may be prefetched depending on the speed of the connection for the client 340. For example, low, medium, or high resolution data may be prefetched depending on the speed of the connection. More specifically, if the speed of the connection is very low, a low resolution version of an advertisement may be prefetched. If the speed of the connection is intermediate, then a medium resolution version of an advertisement may be prefetched. If the speed of the connection is fast, then a high resolution version of the advertisement may be fetched.

In yet another embodiment the prefetching of the resolution versions of an advertisement can be phased, also referred to as "progressive content refinement". For example, a low resolution version of an advertisement may first be prefetched to a client. Once the client has received the low resolution version, a medium resolution version of the advertisement may be prefetched. And once the client has received the medium version, a high resolution version of the advertisement may be prefetched. Therefore, embodiments in accordance with the present invention are well suited to use with techniques such as progressive content refinement.

In still another embodiment, media can be transcoded. Transcoding, according to one embodiment, is to take media, such as an image or streaming media, and change the media's resolution or encoding at an intermediate location, for example, in the network between a client and a server to better match the requirements, such as CPU capabilities or storage capabilities, of the client. Embodiments in accordance with the present invention are well suited to use with techniques such as transcoding.

According to one embodiment, prefetching of data should not negatively impact the activities that a user 350 is currently performing with their client 340. For example, if a user is currently downloading data at a rate that saturates the internet connection of the user's client, then prefetching shall cease until prefetching will not negatively impact the data the user is currently downloading. Therefore, according to one embodiment, prefetching data associated with an offer has a lower priority than data currently being requested by user 350's client 340 and is dependent on the utilization of a client 340's internet connection.

As already stated, prefetched data is stored in storage associated with a client 340. The storage is commonly referred to in the art as a "buffer." According to one embodiment, the amount of prefetched data that is stored in the buffer is managed, for example, by deleting data when it is determined a user is no longer interested in viewing the data, the user is unlikely to view the data, the user declines an offer for the data, or the user has not viewed the data with in a certain amount of time, for example by accepting the offer for the data, among other things. For example, if an offer expires without being accepted by a user, any data associated with that offer can be deleted from the buffer. Similarly, if the buffer is full but new offers satisfy the user's query criteria, the data associated with offers that have already been presented to the user, for example, n or more times without the user accepting those offers maybe deleted from the buffer on the assumption that the user is not interested in those offers or will not view the data for those offers. This may especially be the case where a user has accepted other offers since the first presentation of an unaccepted offer to a user.

If the targeted data and the information about a user is stored at an internet service provider (ISP), then information about the user of the client will not be released, beyond line A-A of FIG. 5, according to one embodiment of the present invention.

When information about a user, for example in the form of a user profile, is stored locally at a user 350's client 340, there may be potential for information about the user to be released. For example, the data distributor 520 may be able to determine that some part of a query 323 has been satisfied and therefore be able to ascertain some kind of information about the user 350. Further, the data distributor 520 may be able to determine the internet protocol address of the user 350's client 340.

According to embodiments of the present invention, there are various mechanisms to protect information about users 350 in the case where the information about the user is stored locally at the user 350's client 340.

In another embodiment, anonymization is used. Clients 340 could use anonymizing proxies or onion routing, according to another embodiment. Information about anonymizing proxies and onion routing can be obtained from http://www.onion-router.net/.

In yet another embodiment, a split trust approach could be used to prevent release of information about a user 350. For example, one entity such a data distributor, could be trusted to provide offers to clients 340 where another entity such as a content provider could be trusted to provide the data that is targeted to the client 340. Since neither entity provides both the offer and the targeted data, neither entity independently would be able to accurately obtain information about a user 350. For example, assume that the data distributor provides an offer soliciting delivery of a fishing advertisement targeted to a user 350 provided that the user likes pornography. In this case, the query 323 would be used to determine if any of the user 350's information, such as that in a user profile, indicated that the user 350 liked pornography. The content provider would provide the fish advertisement, e.g., the targeted data. If the query 323 is satisfied but the offer is not accepted, all the data distributor would know is what information satisfies the query. All the content provider would know is that it delivered the fish ad to the client 340. But without both pieces of information neither data distributor nor content provider would know that the user 350 liked pornography.

In still another embodiment, post-acceptance pre-fetch is used to prevent release of information about a user 350 without the user 350's authorization. For example, the offer may include directly or indirectly several advertisement icons that can be selected and textual summaries of the advertisements. The client 340 may display the icons. Assume that the user 350 selects one of the advertisements for a movie preview by clicking on an icon and then proceeds to read the textual summaries. As the user 350 is reading the textual summaries, the movie preview can be prefetched. When the user 350 selected the icon, the user 350 accepted the offer and thereby accepted a release of information about the user 350, according to one embodiment.

Figure 24:
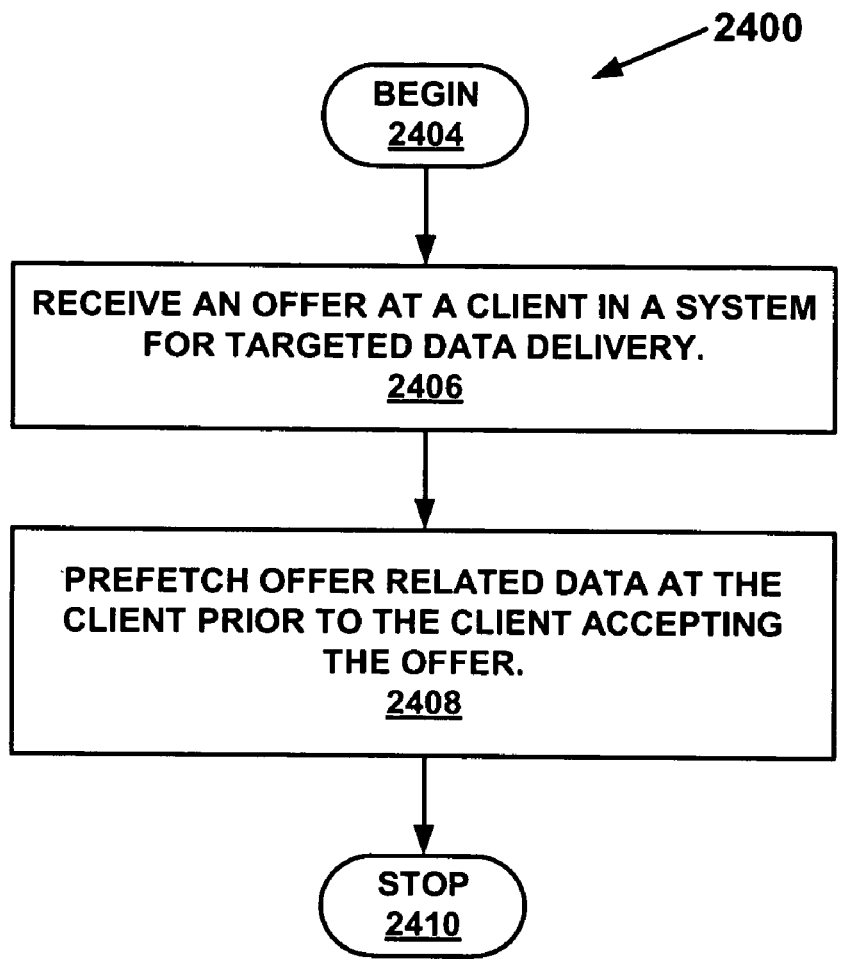
FIG. 24 depicts a flowchart 2400 describing an operational example for a method of prefetching data prior to a client accepting an offer to receive targeted data in a system for targeted data delivery, according to embodiments of the present invention.

FIG. 24 depicts a flowchart 2400 describing an operational example of a method of prefetching offer related data at a client prior to the client accepting the offer, according to embodiments of the present invention. Although specific steps are disclosed in flowchart 2400, such steps are exemplary. That is, embodiments of the present invention are well suited to performing various other steps or variations of the steps recited in flowchart 2400. It is appreciated that the steps in flowchart 2400 may be performed in an order different than presented, and that not all of the steps in flowchart 2400 may be performed.

All of, or a portion of, the embodiments described by flowchart 2400 can be implemented using computer-readable and computer-executable instructions which reside, for example, in computer-usable media of a computer system or like device. As described above, certain processes and steps of the present invention are realized, in one embodiment, as a series of instructions, e.g., software program, that reside within computer readable memory of a computer system and are executed by the of the computer system. When executed, the instructions cause the computer system to implement the functionality of the present invention as described below.

For the purposes of illustration, the discussion of flowchart 2400 shall refer to the structures depicted in FIGS. 3 and 12.

In 2404 of FIG. 24, the method begins.

In 2406 of FIG. 24, an offer is received at a client in a system for targeted data delivery. For example, the offer receiver 830 provides a means for receiving an offer, e.g., 323, 325, 327, 1230, from a client 340 in the system (FIGS. 3, 12) for targeted data delivery. The offer enables the targeted delivery of the data to the client without requiring a release of any information about a user 350 of the client. For example, no information about the user 350 will be released until the user 350 accepts the offer, according to one embodiment. The offer may include the data that is targeted to the client either directly as depicted in FIG. 12 or indirectly as depicted in FIG. 3. The client is an electronic device that enables the user to accept the offer.

In 2408 of FIG. 24, the data is prefetched to the client prior to the client accepting the offer of delivery of the data. For example, the data prefetcher 2310 provides a means for prefetching the data to the client 340 prior to the client accepting the offer of delivery of the data. For example, as already stated, the data is associated with the offer, e.g., 323, 325, 327, 1230, either directly or indirectly as described herein. The client can accept the delivery of the data, for example as described herein, by accepting the offer for the data. The data prefetcher 2310 provides a means for prefetching the offered data prior to a user 350 accepting the offer. For example, prefetching the data may be initiated as soon as an offer is received at a client. In another example, prefetching the data may be initiated prior to determining if the "user profile satisfies the selection criteria." In still another example, prefetching the data may be initiated as soon as the "user profile satisfies the selection criteria." User profile satisfaction of selection criteria is described in the context of the comparator 840 in section 2, among other places in the specification. In another example, prefetching data that is targeted to a client is performed prior to presenting an offer to a user 350 of a client 340.

In the case of multiple offers, the data prefetcher 2310 may prioritize the data that will be prefetched according to embodiments described herein. Further, according to embodiments described herein, the type of data that the data prefetcher 2310 prefetches may depend on factors such as the speed of the client 340's connection, the amount of storage associated with the client 340, the CPU or graphics capabilities of the client 340. The data prefetcher 2310 may use transcoding or polite prefetching, as described herein.

In 2410 of FIG. 24, the method stops.

Section 8: A System and Method for Constructing a Presentation

In conventional systems, advertisers buy "spots" in presentation templates from media sources to place their advertisements in. Advertisers are examples of media sources and companies that sell presentations are examples of presentation sources. A presentation template is transformed into a presentation when the spots are replaced with appropriate advertisements. The presentations can be delivered to users.

Based on conventional systems, advertisements are not targeted to any particular users. For example, all of the users that see a presentation will see the same advertisements. For example, if an advertiser pays for an impotence medication advertisement to be placed in a newspaper, all of the people who subscribe to a web page for the newspaper will see the same impotence medication advertisement.

Figure 25:
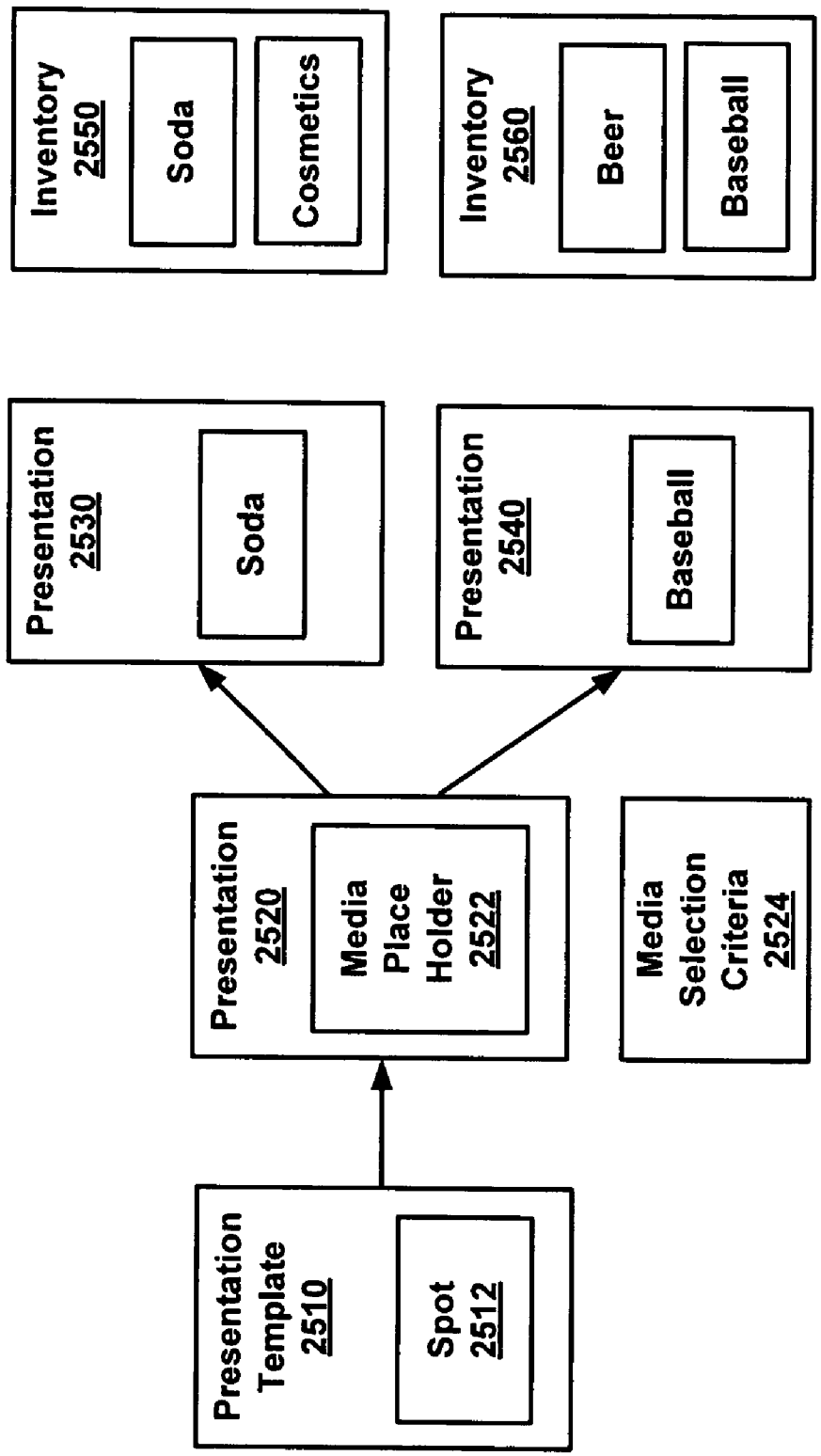
FIG. 25 is a block diagram that illustrates a method for constructing a presentation, according to one embodiments of the present invention.

FIG. 25 is a block diagram that illustrates a method for constructing a presentation, according to one embodiment of the present invention. FIG. 25 depicts a presentation template 2510 that has a spot 2512. According to one embodiment, media is transmitted to a user's client, for example, and stored in an inventory. For example, FIG. 25 depicts an inventory 2550 that includes advertisements for cosmetics and for soda. Inventory 2560 includes advertisements for a baseball game and for beer.

According to one embodiment, the advertisements stored in the inventories 2550, 2560 were targeted to the users of clients that the inventories 2550, 2560 are associated with, as will become more evident. For example, a female teenager that likes cosmetics and soda may be using the client that inventory 2550 is stored on and a man that likes sports and beer may use the client that inventory 2560 is stored on.

The presentation template 2510 includes a spot 2512. Companies that sell beverages, cosmetics, beer, or baseball tickets are examples of "media sources." The media sources can be charged for a spot 2512 being replaced with their advertisement. In order to maximize profits, media sources will want their advertisements targeted to users based on the users' interests. For example, a media source that sells baseball tickets will want to show their baseball advertisements to users who like sports and a media source that sells sodas will want to show their soda advertisements to users who like soda.

Media selection criteria 2524 can be used, for example, in choosing which spots to replace with given media. Further, media selection criteria 2524 enables companies that sell presentations some control over the types of advertisements that will appear in their presentations. For example, media selection criteria 2524 is associated with the media place holder 2522, which replaces spot 2512 according to one embodiment. The media selection criteria 2524 can include information indicating that no alcohol related advertisements should replace the media place holder 2522. In this case, media place holder 2522 cannot be replaced with the beer advertisement from inventory 2560 for the man. Therefore, the baseball advertisement will replace media place holder 2522 resulting in presentation 2540 for the man. However, for the female teenager both the soda advertisement and the cosmetics advertisement are non-alcohol related advertisements. Therefore, according to one embodiment, a tie breaking mechanism is used to determine which of the advertisements replace media place holder 2522, as will be described in more detail hereinafter. Assume for the purposes of illustration that the soda advertisement is selected for replacing the media place holder 2522 resulting in presentation 2530 for the female teenager.

As can be seen, targeted media is much more relevant to users than non-targeted media and therefore more money can be charged for providing targeted delivery of media to users than for providing non-targeted delivery of media to users, according to certain embodiments of the present invention. As will become more evident, a data distributor can buy a spot 2512 at an untargeted rate from a presentation source and sell to media sources, for example, the opportunity to have their media put in the spot 2512 for targeted users at a targeted rate.

Embodiments of the invention are not limited to advertisements and publications but are well suited to any type of presentation 2520 and are well suited to replacing spots with any type of media.

As will become more evident, according to one embodiment, the media source transmits the media to a data distributor and the data distributor stores the media at an inventory 2550, 2560 that is associated with the data distributor. A presentation source can transmit a presentation 2520 to a data distributor. The data distributor can replace the media place holder 2522 with an appropriate piece of media selected from an inventory 2550, 2560 resulting in a presentation 2530, 2540. Then the data distributor can transmit the presentation 2530, 2540 to a client.

As will become more evident, according to another embodiment, the data distributor distributes the media to a client that stores the media in an inventory 2550, 2560 that is associated with the client. A presentation 2520 can be transmitted from a presentation source to a user's client. For example, a user may go to a presentation source's web site, such as the New York Time's web site, to look at their presentation. A presentation 2520 with a media place holder may be transmitted to the user's client. The client can replace the media place holder 2522 with an appropriate piece of media from an inventory 2550, 2560. The following is a detailed description of embodiments for a method of constructing a presentation.

According to one embodiment, the media, such as the soda, the cosmetics, the baseball and the beer advertisements that replaced the media place holders are examples of data that can be targeted to a user. Systems for targeted data delivery can be used to deliver advertisements to users' media inventories 2550, 2560 in a targeted manner based on users' user profiles, as will become more evident. This allows delivering a soda advertisement to inventory 2550 but not to inventory 2560. The advertisements can be shown later as a part of a presentation. Among other places in the specification of the present application, FIGS. 3, 4, 5, 6, and 12 depict systems 300, 400, 500, 600, 1200 for targeted data delivery, according to embodiments of the present invention. For the sake of brevity and clarity, the detailed description for embodiments of the present invention shall mostly refer to FIGS. 3 and 12.

According to some embodiments of the present invention, a presentation can be a visual presentation that is seen, an audio presentation that is heard, or an audio visual presentation that is seen and heard. For example, a presentation can be an audio presentation that is listened to over a radio, can be a web page that is read on a computer or a portable digital device, can be a video that is listened to and watched. The presentation can be a newspaper, flash animation, web page, music, such as digital music, media streams, such as television broadcasts, surveys, or information to be provided to the public, among other things. The presentation can include rich media. Rich media is a term that shall be used to refer to videos, high definition data, or high quality data, among other things.

According to one embodiment, a spot can be, but is not limited to, a blank period of time in an audio presentation, a blank where no text appears in the case of a visual presentation, or both in the case of an audio visual presentation. In an embodiment, a spot can be, but is not limited to, a blank where no image appears in the case of a visual presentation.

According to various embodiments of the present invention, the relevance of media, such as advertisements from an advertiser 1210, presented to users is increased in comparison to the relevancy of media presented to users of conventional systems, as will become more evident. According to one embodiment, the media is data that is targeted to a user, as will become more evident.

According to certain embodiments of the present invention, media can be visual media that is seen, audio media that is heard, or audio visual media that is seen and heard. For example, the media can be audio that is listened to over a radio, can be a web page that is read on a computer or a portable digital device, can be a video that is listened to and watched. The media can be rich media. Rich media is a term that shall be used to refer to videos, high definition data, or high quality data, among other things.

Examples of media sources that provide media include, but are not limited to, data sources 310, 510, and advertiser 1210. A system that is used to increase the relevancy of media can receive targeted media from a media source, such as data sources 310, 510, or advertiser 1210, as will become more evident.

As already described herein, for example in the discussion presented in conjunction with FIG. 3, an offer includes a query 323, a link 325 to the data that is targeted to the user 350, and an optional payment 327 to the user 350 for accepting the offer. As depicted in FIG. 12, according to other embodiments of the present invention, an offer 1230 includes a query 1231, the data that is targeted to the user in the form of an advertisement 1233, and a bid price 1235 to be paid to a user 350 for accepting the offer 1230. The above discussion in conjunction with FIG. 16 describes yet another embodiment of an offer 1610. According to one embodiment, the media is an example of targeted data that can be associated with an offer.

However, according to another embodiment where the relevancy of media is increased, the user's client automatically accepts all offers targeted to that user that meet any user-selected relevancy criteria. For example, a client can receive a package that includes the media, either directly as in the case of an advertisement 1233 or indirectly as in the case of a link 325. The package can include a query 323, 531, 1231. However, according to one embodiment, the package does not include a remuneration offer 327. The query 323, 531, 1231 can be used to determine if the "user profile satisfies the selection criteria", according to certain embodiments already described herein.

According to certain embodiments of the present invention, relevancy criteria provides a measure for valuing a user's attention. Under embodiments that do not include remuneration offer 327, the relevancy criteria is not used. Refer to the description of FIG. 2B and section 2, among other places in the specification, for more information about relevancy criteria.

According to one embodiment, a presentation source provides presentations 2520. An example of a presentation source is a newspaper web site, such as the web site for the New York Times™. The presentation source can replace a spot 2512 with a media place holder 2522 and associate media selection criteria 2524 with the media place holder 2522, as will become more evident. Further, a presentation source can transmit a presentation 2520 to a data distributor or a user's client, as will become more evident.

According to one embodiment, the media source 310, 510, 1210 transmits the media to a data distributor 520 and the data distributor 520 either stores the media in inventories 2550, 2560 that are associated with the data distributor or transmits the media to clients that store media targeted to them in an inventory 2550, 2560 that is associated with the clients. According to one embodiment, there is one inventory per user, with each inventory containing media targeted to that user.

According to one embodiment, a data distributor can buy a spot 2512 in a presentation template 2510 from a presentation source. The data distributor can provide a media place holder 2522 and media selection criteria 2524 to the presentation source. In some embodiments, the presentation source may create or alter the media selection criteria 2524 based on its policies and knowledge of spot 2512 and its surrounding context. The presentation source can replace the spot 2512 with the media place holder 2522 and associate the media selection criteria 2524 with the media place holder 2522. In some embodiments, the media selection criteria 2524 may be associated with the media placeholder 2522 by the data distributor. The data distributor can buy a spot 2512, for example at an untargeted rate, in a presentation template 2510 from a presentation source. The data distributor can sell the opportunity to replace a media place holder 2522 with media at a targeted rate, for example, to a media source. For example, a data distributor can buy a spot 2512 at an untargeted rate from a presentation source, then charge the soda company and the baseball team at targeted rates due to replacing media place holder 2522 with the soda advertisement for users interested in sodas and the baseball advertisement for users interested in baseball, which results respectively in presentations 2530 and 2540.

One or more servers 320 can be associated with a data distributor 520. Data distributors 520 are also known as network owners 1220, according to another embodiment. Further, according to one embodiment, a data distributor 520, 1220 is located at an internet service provider (ISP), and according to another embodiment, the data distributor 520, 1220 is not located at an ISP.

According to some embodiments of the present invention, a client 340 can enable a user 350 to listen, to watch, or a combination thereof to a presentation that includes media that has replaced a media place holder. As already described herein, according to some embodiments of the present invention, media that is targeted to a user is delivered to an electronic device that is associated with a user 350. The electronic device is depicted in FIG. 3 as a client 340. Additionally, FIG. 12 depicts electronic devices as consumers 1250 that are personal computers. As stated above, the electronic device can be a device or a set of devices which may or may not be personal computers. Examples of clients include personal computers, radios, televisions, and so on. Clients 340, 550 and consumers 1250 shall be referred to herein as "clients."

According to one embodiment, a HTTP cookie can be used to indicate that the client 340 belongs to a system for targeted data delivery and thus is capable of replacing a media place holder with relevant media, for example, from an inventory. Many other ways of indicating this are possible. The presentation source can then supply presentation 2520 with media placeholder 2522 only to clients known to belong to a system for targeted data delivery; a different presentation with a different piece of media used to fill spot 2512 can be supplied to clients that do not belong to a system for targeted data delivery. Under one embodiment, a data distributor buys a spot only for versions of a presentation that will be sent to clients associated with a system for targeted data delivery. The data distributor can charge media sources A for the opportunity to present their media at targeted rates. The presentation source is free to sell the spot for presentations going to clients that are not associated with a system for targeted data delivery to other media sources B. Alternatively, the data distributor can buy both versions of the spot, e.g., one version for clients associated with a system for targeted data delivery and a second version for clients not associated with a system for targeted data delivery. The data distributor can then charge media sources A for the opportunity to present their media at target rates for the version for clients associated with a system for targeted data delivery and can resell the second version to other media sources B.

According to alternative embodiments of the present invention, no indication of which clients are associated with a system for targeted data delivery is made and the presentation source supplies presentation 2520 to all of its clients; however, according to one embodiment a presentation containing media placeholders, such as presentation 2520, will appear to be an ordinary presentation when displayed by a client that does not belong to system for targeted data delivery. Under one embodiment, this is done by making media place holder 2522 look like a piece of normal viewable media, which shall be referred to as "normal looking media place holder," to clients not associated with system for targeted data delivery; its extra information, e.g., media selection criteria 2524, is hidden from these clients, for example, by being placed in a comment field. The normal looking media place holder 2522 is effectively filling the second version of spot 2512 described above; accordingly, the data distributor 520 can resell that version of spot 2512 or allow the presentation source to resell it.

According to one embodiment, the media that replaces a media place holder is data that has been targeted to a user in a system for targeted data delivery, according to some embodiments already described herein. For example, the media can be delivered to a user's client, directly or indirectly, along with a query that can be used for determining whether a user profile satisfies the selection criteria associated with the query, as described among in other places in the specification. According to some embodiments of the present invention, the media can be prefetched to a client using embodiments already described herein. For example, the media can be prefetched prior to a user viewing a presentation containing that media using embodiments described in section 7.

As already stated, some embodiments of the present invention provide an inventory 2550, 2560 of media that can reside at a data distributor or a client, among other places. In the event that an inventory of media resides at a data distributor, a mapping of media to users that are targeted by the media may also reside at the data distributor. The mapping between a piece of media and a user may be obtained, for example, when a user's profile satisfies the selection criteria associated with a query 323, 531, 1231.

According to one embodiment, selection criteria, which is specified by an offer's query 323, 531, 1231, can be used for determining what media should be stored in the inventory. Continuing the example, an offer that includes a beer advertisement may also include selection criteria specifying that the user must like sports. Since the user for inventory 2560 is a man that likes sports, the beer advertisement may be stored in inventory 2560. Similarly, another offer that includes the soda advertisement may specify that the user must like sodas. Since the user for inventory 2550 likes sodas, the soda advertisement may be stored in inventory 2550.

The selection criteria may also specify criteria which cannot be met immediately. For example, an offer that includes media for a baseball advertisement may specify that the baseball advertisement must be placed in a sports section of a newspaper, e.g., a presentation. The baseball advertisement cannot be placed in a sports section until a presentation 2520 is available. Therefore, according to another embodiment, media may be stored in an inventory even though not all of the selection criteria can be immediately satisfied.

According to one embodiment, information besides the media is also stored in the inventory. For example, selection criteria or possibly even the entire offer associated with the media may also be stored in the inventory. For example, when newspaper with a sports section becomes available, the part of the selection criteria for the baseball advertisement which specified sports section can be used to ensure that the baseball advertisement is placed in a sports section. Therefore, parts of the selection criteria which could not be met immediately can be used later.

According to one embodiment, the media source is provided with a withdrawal mechanism for withdrawing their media from being presented to users. For example, the withdrawal mechanism can be used to delete specified media from one or more inventories of media that reside on data distributors or clients, among other things.

According to one embodiment of the present invention, very rare types of media can replace media place holders. For example, an advertisement that may not be relevant to very many users can be distributed to data distributors or clients or a combination of both, among other things, and can be stored in inventories waiting for users to engage in a behavior that would indicate that it is a good time to present a rare advertisement to the users.

According to one embodiment of the present invention, a large volume of media is available for selection to replace media place holders, for example, because certain embodiments of the present invention provide for an inventory of media and because certain embodiments of the present invention provide for distributing media and presentations separately. Media sources can simply provide various pieces of media which can be stored in inventories, according to one embodiment of the present invention, which is simple for the media sources to understand and to do.

According to another embodiment, an inventory of media is managed for example by deleting media from the inventory at various points in time. For example, media can be deleted from an inventory if the inventory is causing a computer system to run out of space, if the media has already been presented, if the media has a low priority, or if an expiration date for the media has passed. In another example, media that does not match information about a user or that does not match any criteria associated with recently seen media place holders can also be deleted from the inventory. Media may be kept in the inventory, for example, until an expiration date associated with the media has passed, until the media has been shown a certain number of times, or until instructions or commands have been received to delete the media, among other things.

According to one embodiment, media is used to replace a media place holder within a short period of time after the media is received by an entity, such as a client or a data distributor. However, according to another embodiment, replacing some media place holder by a particular piece of media can be postponed a significant amount of time, for example, after that media has been received by a client or a data distributor. For example, media can be distributed to a client and stored in an inventory at the client. At a later time, a presentation 2520 can be transmitted to the client. Relevant media can be selected from the inventory, according to certain embodiments described herein, to replace a media place holder associated with the presentation 2520. The media selection criteria, among other things, can be used in selecting media that is relevant to and permitted in the spot occupied by the media placeholder. Similar processing can be done by storing media in an inventory at a data distributor that intercepts a presentation 2520 before it reaches a client, selects relevant media, replaces a media place holder associated with the presentation 2520 and forwards the presentation with the relevant media to the client.

As already stated, sometimes more than one piece of media stored in an inventory qualifies to replace a media place holder. A tie breaking mechanism can be used to determine which of the pieces of media will be used to replace the media place holder. One example of a tie breaking mechanism is to determine which of the pieces of media has a higher bid price. The piece of media that has the highest bid price is used to replace the media place holder. A second example of a tie breaking mechanism is to determine which of the pieces of media has the highest relevance to the user. For example, the selection criteria associated with the pieces of media may be compared to information about the user to determine the level of relevancy. More specifically, for the sake of illustration, it may be determined that the soda advertisement is 76% relevant to the user and the cosmetic advertisement is only 44% relevant to the user. Therefore the soda advertisement is more relevant and is selected to replace the media place holder.

According to one embodiment, selection criteria can be stored in an inventory 2550, 2560. For example, a query 323 or an offer that includes the query 323 could be stored in the inventory 2550, 2560 as will become more evident.

According to one embodiment of the present invention, media place holders are associated with presentations 2520. Various types of media can be placed in a presentation for example by replacing a media place holder with media. The media place holder can be an area in a visual presentation that media replaces or a period of time in an audio presentation that audio media replaces, or a combination thereof. The media place holder, according to one embodiment, can appear like a piece of media. For example, the media place holder may be a picture in the event that the presentation including it is visual, the media place holder may be audio visual in the case of the presentation including it is audio visual, the media place holder may be audio in the case of the presentation including it being audio. This can be useful, for example, in the event that the presentation including the media place holder is not replaced because the client or a data distributor does not include a means for replacing the media place holder. A media place holder may be a default media that is presented to a user in the event that the media place holder cannot be replaced.

According to one embodiment, media selection criteria provides information indicating which type of media can replace a given media place holder. For example, one media place holder may have media selection criteria specifying that only media rated parental guidance (PG) can replace that media place holder or that only sports related media can replace that media place holder.

Other examples of media selection criteria include, but are not limited to, size of the spot that media place holder fills; the shape of the spot that media place holder fills; information about the context that the media placeholder appears in, such as next to a news page, in a side bar; and restrictions required by the presentation source, such as the media should be rated parental guidance suggested (PG). Still other examples of media selection criteria include, but are not limited to, information about the user that the presentation source is privy to, such as the user's income obtained during registration, identification of the presentation source, and indication (probably implicit) that this media place holder can be used for various embodiments of the present invention.

Another example of a restriction required by the presentation source may be that media owned by certain parties cannot replace media place holders of a particular presentation 2520. For example, the New York Times™ may indicate that advertisements for USA Today™ cannot replace media place holders in a New York Times™ presentation. By associating media selection criteria with media place holders, presentation sources are provided with a certain amount of control over what types of media can replace media place holders, according to one embodiment. The media selection criteria may also include information about the presentation owner, for example, that can be used for accounting purposes.

According to another embodiment, information found in a presentation 2520 is considered a part of the media selection criteria associated with each media place holder found in that presentation 2520. For example, in this case, a page of a newspaper about Michael Jordan may be part of the media selection criteria used in determining whether an advertisement for a new type of basketball should be selected for replacing a media place holder on that page. According to yet another embodiment, a query associated with a given piece of media may be executed against the presentation 2520 or parts of the presentation 2520 in determining whether that media should be selected for replacing a media placeholder found in that presentation 2520.

As already stated, media selection criteria can be associated with each media place holder. For example, a media place holder may contain media selection criteria or may contain a pointer to media selection criteria that is stored elsewhere.

According to one embodiment, a mechanism for distinguishing the presentation of media targeted using various embodiments of the present invention from untargeted media is provided. For example, a colored border may be placed around targeted media that replaces a media place holder or a logo may be placed on the targeted media that replaces a media place holder.

According to one embodiment, conventional untargeted media may be associated with a media place holder as a default, for example, in the event that a client is not capable of replacing that media place holder with targeted media from its inventory. The conventional media can be associated with the media place holder, for example, at a data distributor, at a content provider, an advertiser, and so on.

According to one embodiment, the presentation template 2510 provides a template for creating a presentation. As already stated, a presentation template 2510, according to one embodiment, includes one or more spots 2512 that can be replaced with media place holders 2522. Since, according to one embodiment, media place holders 2522 can be media that is presentable to a user, such as a default advertisement, replacing spots 2512 in a presentation template 2510 with media place holders 2522 results in a presentation 2520. However, the presentation 2520 does not include media that is targeted to users. Replacing the media place holders 2522 with targeted media, such as a soda, cosmetic, beer, or baseball advertisement, results in presentations 2530, 2540 that are targeted to users. According to one embodiment, a presentation 2520 that includes a media place holder 2522 can be referred to as a "default presentation" and a presentation 2530, 2540 that includes media that has replaced a media place holder 2522 can be referred to as a "targeted presentation."

According to one embodiment, information may be associated with the media that is used as a part of selecting whether the media can replace a media place holder. One example of information about the media is which users would be eligible for the media, which according to one embodiment is contained in query 531. For example, if the media is an advertisement for cosmetics, query 531 could indicate that women are eligible and men are in-eligible. In a second example, the information may include a rating of the media. For example, the media may be classified as R-rated or PG-rated. In a third example, the information may include the size of the media or shape of the media. For example, the media may be 2 inches by 3 inches in the case of visual media or may be 20 seconds in length in the case of audio media.

In a fourth example, the information may include an expiration date for presenting the media to a user. For example, the media may be presented to a user within the next 10 days and after that the media should be deleted from the media inventory. In a fifth example, the information may include a maximum number of times the media can be presented to a user. For example, the information about the media may specify that the media will be deleted from the media inventory after the media has been presented to a user 15 times. In a sixth example, the information may include a priority for presenting the media to a user in the event that multiple pieces of media are eligible for being presented. Then the priorities associated with the multiple pieces of media can be used for selecting one piece of media to be presented to the user.

In a seventh example, owners of media may have opinions about where their media can appear in a presentation and in which presentation. For example, Mercedes™ may not want their advertisement to appear in close proximity to an advertisement for Lexus™ or may not want their advertisement to appear in a presentation that has pornographic material. In another example, advertisements for competitors may be prohibited from appearing in the same presentation or within close proximity to each other in the same presentation. In yet another example, only advertisements for similar subject matter may appear in the same presentation or within a part of the same presentation.

In yet another example, media may have several versions. For example, there may be a small and a large version. If a media place holder is filling a small spot, the small version of the media may replace it. Alternatively, if the media place holder is filling a large spot the large version of the media may replace it. Other examples of versions of media include a low bandwidth version and a high bandwidth version, or a PG version and an R-rated version.

In another embodiment, a query could be performed to determine whether a particular media should be selected to replace a particular media place holder. The query can be used to compare the information about the media to the media selection criteria to determine if the media would be a good selection for that media place holder. For example, the media may be a sports advertisement and the query could be used to determine if the media place holder could be replaced with a sports advertisement.

According to one embodiment, information about a user is used as a part of selecting which media will be used to replace a media place holder. For example, information about a user can be used for determining which media to store in an inventory. If the media isn't relevant to the user, then the media isn't stored in the inventory, according to one embodiment. According to one embodiment, a data distributor can distribute media and selection criteria as part of an offer to users associated with a system for targeted data delivery. If information about the user satisfies the selection criteria and, under some embodiments, the offer's bid price satisfies any user-selected relevancy criteria, then the media can be stored in an inventory for that user. Although, according to one embodiment, selection criteria is used for determining whether to store media in a user's inventory, the selection criteria is not necessarily associated with an offer that the user can accept or decline.

As already described herein, according to one embodiment of the present invention, information about a user is collected. A detailed description of the collection of user information is provided, for example, at 110 of FIG. 1, and also at 710 of FIG. 7, among other places herein. A user profile is generated based on the information about the user. A detailed description of the generation of the user profile is provided, for example, at 720 of FIG. 7. User profiles are depicted in FIG. 5, see, e.g., user profiles N, A, and B, and in FIG. 16, see, e.g., user profile database 1630. The information about a user can be stored locally on a user's client or remotely for example at a data distributor. According to one embodiment of the present invention, information about a user is used as a part of selecting media to be presented in a media place holder.

As already stated, according to one embodiment, an inventory of media can be used to store media locally at a client. In this case, the privacy of information about a user is completely protected until the user clicks on the media, which could result in a host, such as a web site that hosted the media, being contacted. According to one embodiment, a dialog box or a web page can be used to warn the user of potential release of information before the information is released. For example, when a user clicks on the media, a dialog box can be displayed before proceeding warning the user that if the user proceeds to the web page associated with the media, information about the user will be released. The dialog box may include a description or summary of what information will be released. Since the user is given an opportunity to abort before proceeding, the user is enabled to prevent the release of their user information.

According to another embodiment, a user is not allowed to interact with the media which prevents the release of that user's information. For example, the media may be a small gif image that cannot be clicked on and therefore, there is no risk of information about the user being released.

In another example, an inventory of media can be stored at a data distributor. A client can request media from the inventory stored at the data distributor. In this case, the data distributor may have information as to which client requested the media, such as the client's internet protocol address, and may have information pertaining to selection criteria that resulted in the media being presented to the user. However, a media source, such as advertiser or a content server, would not be provided with that information.

According to yet another embodiment, a link 325 to the media may be used to download the media to the client, in which case, potentially information about the user of the client could be released. In this case, a split trust model could be used to help protect the privacy of information about the user. For example, one entity, such as a data distributor, could provide the link 325 to the media while another entity, such as a content provider, stores the media. Then a client, for example, could use the link 325 from the data distributor to download the media from the content provider without the data distributor knowing.

As already stated, a user is not required to accept an offer in order to increase the relevancy of media, using various embodiments of the present invention. Further, as already stated, the user is not remunerated for seeing or listening to a presentation, according to an embodiment. The user may, however, be able to set a relevancy criteria that forces media sources to pay a minimal amount per media presentation to the data distributor 520; this helps ensure that the user is presented only with relevant media as media sources will be unwilling to pay much for the user to see marginally relevant media, e.g., an advertisement the user is unlikely to be interested in.

According to one embodiment of the present invention, the owner of the data distributor can charge the media source for providing targeted delivery of the media. For example, a media source may be charged when an advertisement, which has replaced a media place holder, has been presented to a user. In another example, a media source may be charged when the advertisement is stored in an inventory associated with a data distributor or a client. In a third example, an expiration date may be associated with an advertisement and the media source may be charged for storing an advertisement in an inventory until the expiration date. In a fourth example, a media source may be charged for the presentation of the advertisement to a user a certain number of times. In a fifth example, a media source may be charged when a user clicks on an advertisement that has replaced a media place holder.

According to another embodiment, the amount that a media source is charged is on a sliding scale, which protects the media sources profits from fraudulent user behavior. For example, the more advertisements that are presented to users the less the media source is charged per each additional presented advertisement. According to another embodiment, the profits from presenting media to users are shared, for example, between any combination of the media source, the data distributor, the user, and the presentation source.

Industry standard auditing methods can be used by presentation sources, such as publishers' websites, to collect information used in determining the amount that the presentation source charges the data distributor, for example by determining the number of media place holders supplied to users that media can replace, among other things. In embodiments that use more relaxed privacy models, media or advertisements can be obtained from servers that are external to a system 300, 400, 500, 600, 1200, 1600, among other things, for targeted media delivery. These external servers are not necessarily associated with the system used by the presentation source, such as a publisher, but could be third-party servers. In this case, servers holding media could determine the charges that media sources must pay.

In embodiments where stronger privacy models are used, media is stored in inventories at clients, for example. If the clients report information that can be used to determine media source charges, then users' privacy may be compromised to any server that receives that information. Therefore, according to certain embodiments of the present invention, anonymizing techniques allow the clients to provide the information for determining media source charges without comprising the users' privacy. For example, the information for determining media source charges can be sent via mix masters or the clients could use statistical anonymization methods whereby random noise of a known mean is added to counts so that an administrator, when summing up the counts, can reconstruct an approximately correct sum of the media source charges. In another embodiment, protocols related to internet voting problems are used for communicating information used in determining media source charges while at the same time protecting the privacy of users.

According to one embodiment, a data distributor that may store media in an inventory and that is capable of replacing media place holders with media can track information that can be used in determining charges, thus, protecting user information. The clients can request media from the data distributor. In this case, an administrator of the data distributor may know that a user was selected by the selection criteria. However, in this case, the media source would not know that the user's user profile matched the selection criteria.

As already stated, presentation sources, such as the New York Times™, conventionally sell spots to media sources, such as an advertisement company. Based on conventional systems, the advertisements are not targeted to any particular users. All of the users that see the presentation will see the same advertisements. For example, if an advertiser pays for an advertisement for an impotence medication to be placed in a newspaper, all of the people who subscribe to a web page for the newspaper will see the impotence medication advertisement regardless of whether they are interested or have a need for the impotence medication.

According to some embodiments of the present invention, media is targeted to users. For example, an advertisement for the impotence medication may only be stored in inventories for men over 60 years of age. Targeted media is much more relevant to users than non-targeted media and therefore more money can be charged for providing targeted delivery of media to users than for providing non-targeted delivery of media to users.

According to some embodiments of the present invention, the spots are bought at non-targeted rates. For example, media sources such as newspapers conventionally sell spots at non-targeted rates; therefore the media place holders fill untargeted spots, according to one embodiment. This is a business model that media sources understand and are used to. The media sources and the presentation sources may not have a motivation to enter into the business of targeted delivery of media or do not have a mechanism for providing targeted delivery of media. Therefore, another company, such as a company that owns a data distributor, would be in a position to buy spots from the presentation sources at untargeted rates, to distribute targeted media to users in a targeted manner and then charge media sources at targeted rates due to the targeted media replacing a media place holder at the spot.

As already stated, a company that owns a system that provides targeted delivery of data can buy the opportunity to place media in spots. In turn, according to another embodiment, the company that owns a system that provides targeted delivery of data can sell the opportunity to place media in the spots in a targeted manner to other companies.

Figure 26:
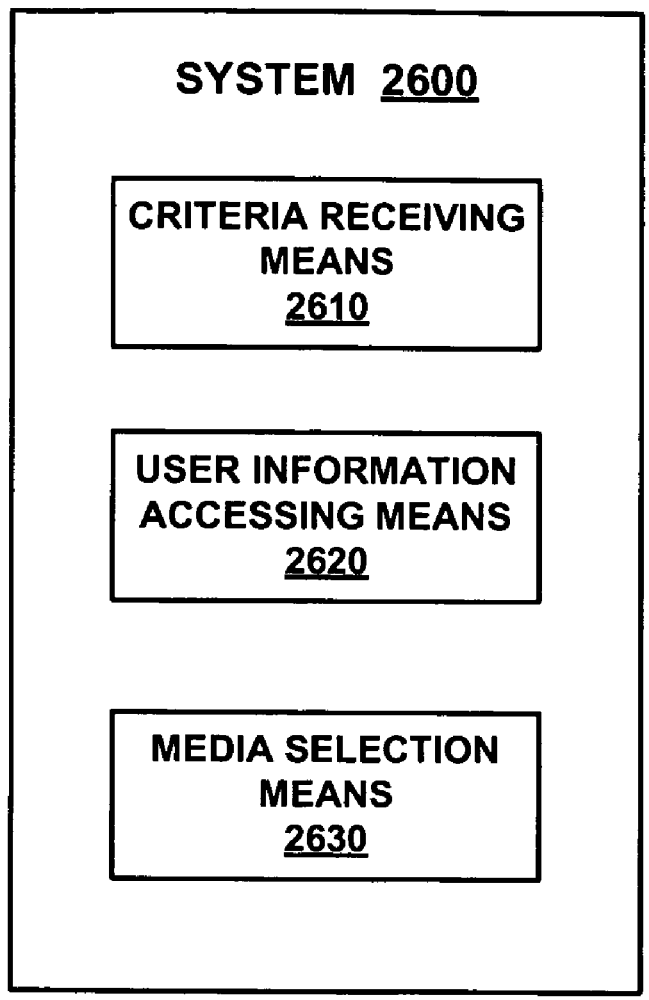
FIGS. 26 and 27 are block diagrams of systems for constructing a presentation, according to one embodiment of the present invention.
Figure 27:
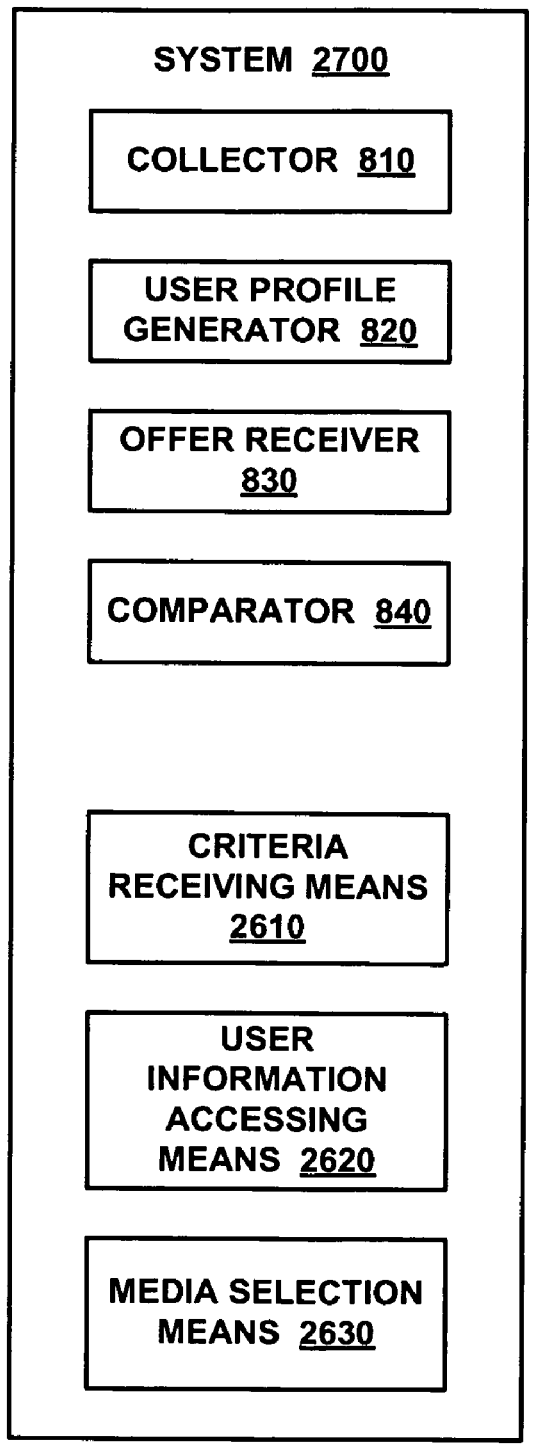

FIGS. 26 and 27 are block diagrams of systems for constructing a presentation, according to various embodiment of the present invention. The blocks that represent features in FIGS. 26 and 27 can be arranged differently than as illustrated, and can implement additional or fewer features than what are described herein. Further, the features represented by the blocks in FIGS. 26 and 27 can be combined in various ways. The systems 2600 and 2700 can be implemented with software, firmware, hardware, or with a combination thereof.

Both systems 2600 and 2700 include a criteria receiving means 2610, a user information accessing means 2620, and a media selection means 2630. A system 2600 or a system 2700 can be associated with a data distributor or a client, among other things. The system 2700 further includes a collector 810, a user profile generator 820, an offer receiver 830, and a comparator 840. The offer receiver 830 can be used to receive an offer that includes media, directly or indirectly, as well as a query, as already described herein. The collector 810, the user profile generator 820, the offer receiver 830, and the comparator 840 have also been described in the context of FIG. 8.

According to one embodiment, the inventory of media is accessible to the system 2600 or 2700. For example, if system 2600 is associated with a data distributor, then the inventory of media may be stored at the data distributor. In the case of system 2700 that is associated with a client, the inventory of media may be stored at the client. If a system 2700 is associated with a data distributor, then the client can use a normal browser, according to one embodiment. However, certain information from the client, such as the number of pages printed on a printer, may need to be uploaded to the data distributor since the printer is not connected to the data distributor. Similarly, the user profile is accessible to the system 2600 or 2700, according to one embodiment.

Figure 28:
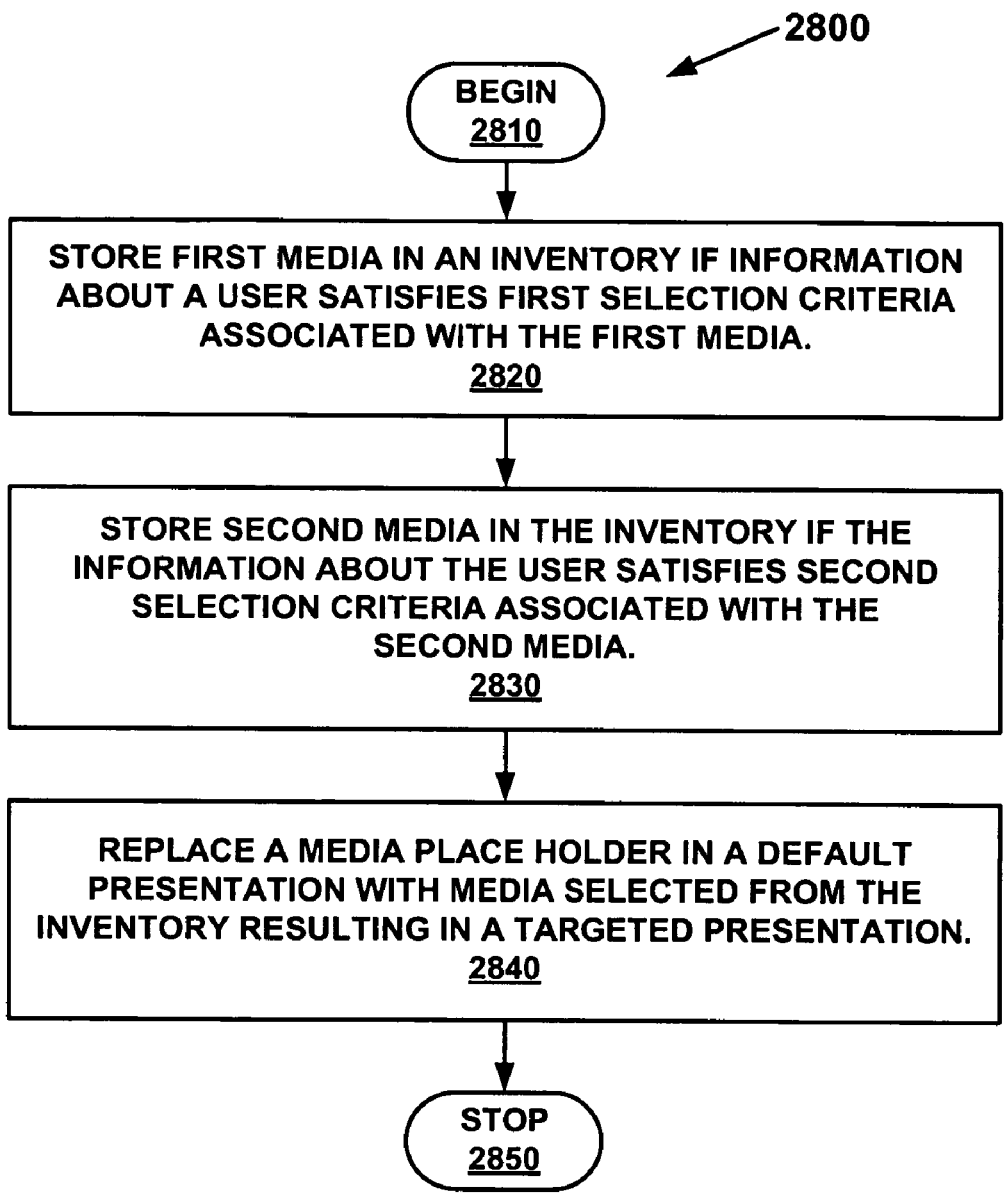
FIG. 28 depicts a flowchart 2800 describing an operational example of a method for constructing a presentation, according to one embodiment of the present invention.

FIG. 28 depicts a flowchart 2800 describing an operational example of a method for constructing a presentation, according to one embodiment of the present invention. The system 2700 depicted in FIG. 27 shall be further described in the context of flowchart 2800.

Although specific steps are disclosed in flowchart 2800, such steps are exemplary. That is, embodiments of the present invention are well suited to performing various other steps or variations of the steps recited in flowchart 2800. It is appreciated that the steps in flowchart 2800 may be performed in an order different than presented, and that not all of the steps in flowchart 2800 may be performed.

For the purposes of illustration, the discussion of flowchart 2800 shall mostly refer to the structures depicted in FIGS. 3 and 12, and assume that the media are advertisements for cars received from advertisers 1210 and that the presentation is the New York Times™. The advertisers 1210 are examples of media sources and the New York Times™ is an example of a presentation source. This illustration shall also assume that an instance of system 2700 resides on each of two clients for two users A and B respectively.

The media sources may want the advertisements targeted to users that are interested in cars. Assume that two car advertisements are targeted to users and that one of the car advertisements is for a luxury car and shows a good-looking man driving the car; and the other car advertisement is for a hybrid car and shows a good-looking woman driving the car. Media sources that sell cars may transmit car advertisements to a data distributor. The two car advertisements may have been transmitted by different media sources. The data distributor can transmit the car advertisements to the clients of users A and B.

According to one embodiment, offers can be used to target users and selection criteria can be implemented as a query. For example, the clients of users A and B could have received an offer L from a data distributor that includes a query 323 and a link 325 to an advertisement of a luxury car showing a good-looking man driving the car. The query 323 could have selection criteria that target women who like driving luxury cars. The clients could have also received an offer H from the data distributor that includes a query and a link to an advertisement of a hybrid car showing a good-looking woman driving the car; the query associated with this offer could have selection criteria that target men who are environmentally conscious. The selection criteria that targets women who like driving luxury cars and the selection criteria that targets men who are environmentally conscious are both examples of first selection criteria.

In step 2810, the method begins.

In step 2820, first media is stored in an inventory if information about a user satisfies first selection criteria associated with the first media. For the purposes of illustration assume that both user A and user B are examples of a user and the car advertisements are examples of first media that is stored in the inventories associated with the respective users A and B.

Assume that the user profile on user A's client indicates that user A is a heterosexual woman that likes luxury cars. Therefore, the user information accessing means 2620 on user A's client will access information indicating that user A is a heterosexual woman that likes luxury cars from user A's user profile. Similarly, assume that the user profile on user B's client indicates that user B is a heterosexual man that is environmentally conscious. Therefore, the user information accessing means 2620 on user B's client will access information indicating that user B is a heterosexual man that is environmentally conscious from user B's user profile.

More specifically, since user A's profile indicates that user A is a heterosexual woman that likes luxury cars, i.e., offer L's query is satisfied by user A's user profile, and assuming that offer L's bid price satisfies user A's relevancy criteria, offer L will be stored in the inventory that resides on user A's client. Also since user B is a heterosexual man that is environmentally conscious and assuming that offer H's bid price if any satisfies user B's retention criteria if any, offer H will be stored in an inventory that resides on user B's client.

In step 2830, second media is stored in the inventory if the information about the user satisfies second selection criteria associated with the second media. For the purposes of illustration, assume that an advertisement depicting a naked person is received at both user A's and user B's clients. In this case, the selection criteria for the advertisement may indicate that the advertisement is to be stored if the respective user has used their client to look at pornographic material in the past. Also for the purpose of illustration, assume that the information about user A and user B indicates that they have used their clients to look at pornographic material in the past. Therefore, user A's and user B's information will satisfy the selection criteria associated with this advertisement and the advertisement will be stored in their respective inventories.

At this time in the illustration, the inventories for user A and user B will both include a first media and a second media. For example, user A's inventory includes an advertisement for a luxury car with a good-looking man and an advertisement depicting a naked person. User B's inventory includes an advertisement for a hybrid car with a good-looking woman and an advertisement depicting a naked person.

In 2840, a media place holder in a default presentation is replaced with media selected from an inventory resulting in a targeted presentation. For example, assume that the New York Times™ presentation currently located at the New York Time's™ web site has a media place holder with associated media selection criteria that indicates that it fills a spot in the better living section and that it may only be replaced by PG media. Assume that user A and user B visit the web site for the New York Times™. An electronic copy of the New York Times™ presentation including the media place holder is transmitted from the web site to the clients of user A and user B. According to one embodiment, the media place holder fills an untargeted spot that has been bought at a rate that conventionally would be paid for a spot in a presentation template to advertise a conventional non-targeted advertisement.

Media selection criteria, according to one embodiment, is used for selecting media to replace a media place holder associated with a presentation. For example, assume the media selection criteria indicates that this media place holder may only be replaced by PG media. The media selection means 2630 executing on user A's client can select the advertisement depicting a good looking man driving a luxury car to replace the media place holder of the New York Times™ based on the media selection criteria.

Using similar processing, the media selection means 2630 executing on user B's client can select an advertisement depicting a good looking woman driving a hybrid car to be placed in the media place holder of the New York Times™ based on the media selection criteria. According to one embodiment, the two advertisements are targeted media because one of the advertisements was targeted to user A and the other advertisement was targeted to user B.

The media selection means 2630 can also use information associated with the media as a part of selecting an advertisement to replace a media place holder. In this illustration, the information about the media for the first two advertisements could indicate that they are PG car advertisements and the information about the media for the other advertisement could indicate that it is an R-rated porn advertisement.

According to certain embodiments of the present invention, the relevance of media, such as advertisements, presented to users is increased in comparison to the relevancy of media presented to users of conventional systems. For example as already stated, in many conventional systems, user A and user B would see the same advertisement. By providing media place holders and media selection criteria, among other things, the relevancy of media presented to users can be increased because for example in this illustration user A and user B were presented with targeted presentations that included media targeted to each of them.

At 2850, the method stops.

In this illustration, the New York Times™ with the respective advertisements can be displayed on the clients for the respective users A and B and the advertisers can be charged for the respective advertisements using various embodiments described herein. According to one embodiment, the advertisers are charged at a rate that is typically charged for targeted media.

Although the above illustration described a system 2700 that resides at clients, embodiments of the present invention are well suited for similar systems 2700 that reside at other entities, such as data distributors. In the case of a data distributor, a system 2700 could replace media place holders associated with the presentation with media resulting in a presentation. The resulting presentation can be transmitted to the appropriate clients.

Although the above illustration of flowchart 2800 assumed a bid price and relevancy criteria, neither the bid price nor the relevancy criteria are required according to embodiments of the present invention. Further, although the above illustration of flowchart 2800 assumed an offer, some embodiments of the present invention do not require an offer. For example, selection criteria can be separate from offers.

Although many of the embodiments and the above illustration were described in the context of one media place holder being associated with one presentation, embodiments of the present invention are well suited for a plurality of media place holders being associated with one presentation 2520 or with a plurality of presentations 2520.

Section 9: Method and System for Utilizing Sizing Directives for Images and/or Media As previously described, spots, openings, slots or holes in web pages and/or presentations can be filled with different messages and/or images based on the user's locally stored profile information. Note that the word "slot" can have a similar meaning to the word "spot," as described herein, but is not limited to such. Different messages and/or images can be chosen based on their relevance to the user as determined from the user's profile. In this system it would be useful to have spots, openings, slots or holes in many different sizes and aspect ratios, in order to match the rest of the web page and/or presentation well. However, there may not be a version of each message in every possible slot size or aspect ratio. This would limit the number of messages that could be inserted into web page or presentation holes without causing visual artifacts.

It is understood that cropping can reduce the content of an image while scaling can magnify or minify (reduce) a fixed amount of image content. In one embodiment in accordance with the invention, image and video coding can be augmented to include cropping directives and/or scaling directives. For example, each cropping can specify a range of acceptable image cropping locations. Furthermore, each cropping directive can also have a cost function associated with it. Each cropping directive can be evaluated based on the current hole or slot size and aspect ratio to be filled by a message and/or image. The cropping function can be selected with the best match as determined by evaluation based on the current directive cost functions. Then the image can be cropped (and also scaled) from one resolution to another. It is noted that this process may be performed by standard functions, or parts of this process may be performed by code included with the image or video file.

It should be appreciated that cropping an image or video to pleasingly fit in a given slot aspect ratio or size is not a trivial operation for several reasons. For example, usually images should not be cropped in such a manner as to cut people's faces in half horizontally or vertically. As a result, depending on the aspect ratio available, some people may need to be completely cropped out of an image or video. For example, if a video with two people talking is presented in a widescreen format, both people can be displayed simultaneously. However, if presented in a full screen format, the non-speaking person may need to be cropped out of the viewable video.

Consequently, in one embodiment in accordance with the invention, the cropping directives included in the images and videos can be the result of human specification. However, cropping directives may also be created by computer vision techniques combined with domain expertise. It is understood that many other conventions and rules for cropping can be implemented in accordance with various embodiments of the invention.

In context with hole stuffing or filling as previously described, a single message size and aspect ratio can be stored on the server or client device to enable stuffing or filling a wide variety of holes or openings. In one embodiment in accordance with the invention, a single DVD disk can contain a widescreen version of a movie that also includes cropping directives for dynamically producing a full-screen version of the movie during playback.

Figure 29:
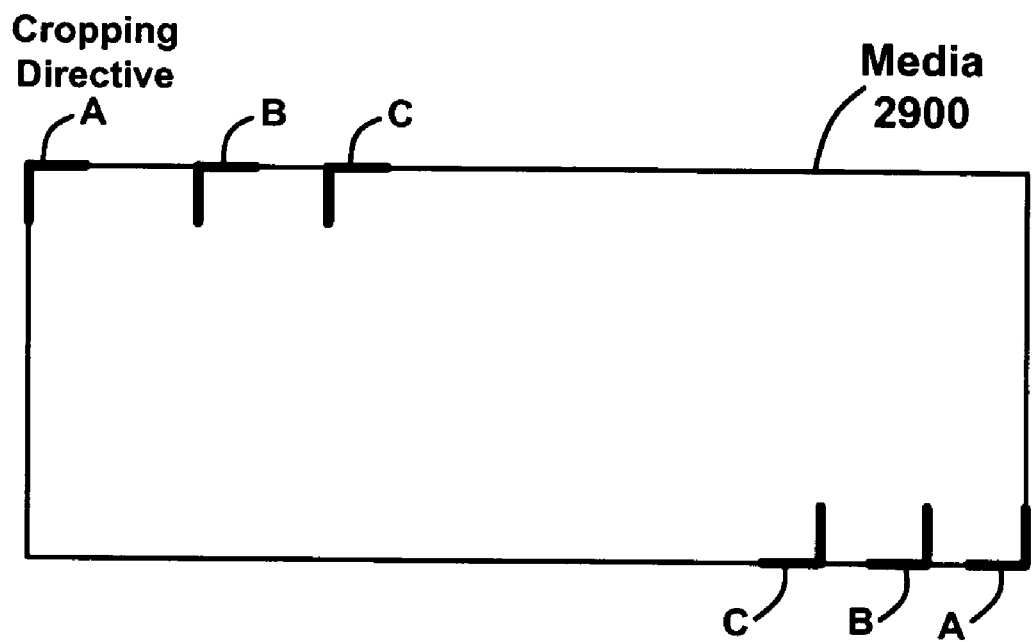
FIG. 29 shows exemplary fixed cropping directives for media in accordance with various embodiments of the invention.

FIG. 29 shows exemplary fixed cropping directives for media 2900 (e.g., an image, video, media, and the like) in accordance with various embodiments of the invention. The present embodiment illustrates a basic scheme wherein each pair of cropping directives A, B, and C specify a single fixed cropping size. In this exemplary embodiment, a widescreen 2:21 aspect ratio video frame can be optionally cropped to three formats: the complete widescreen format as indicated by cropping directive A, a 16:9 aspect ratio suitable for full screen display on a high-definition television (HDTV) as indicated by cropping directive B, and a 4:3 aspect ratio format as indicated by cropping directive C for display on a conventional display device, such as a television.

Figure 30:
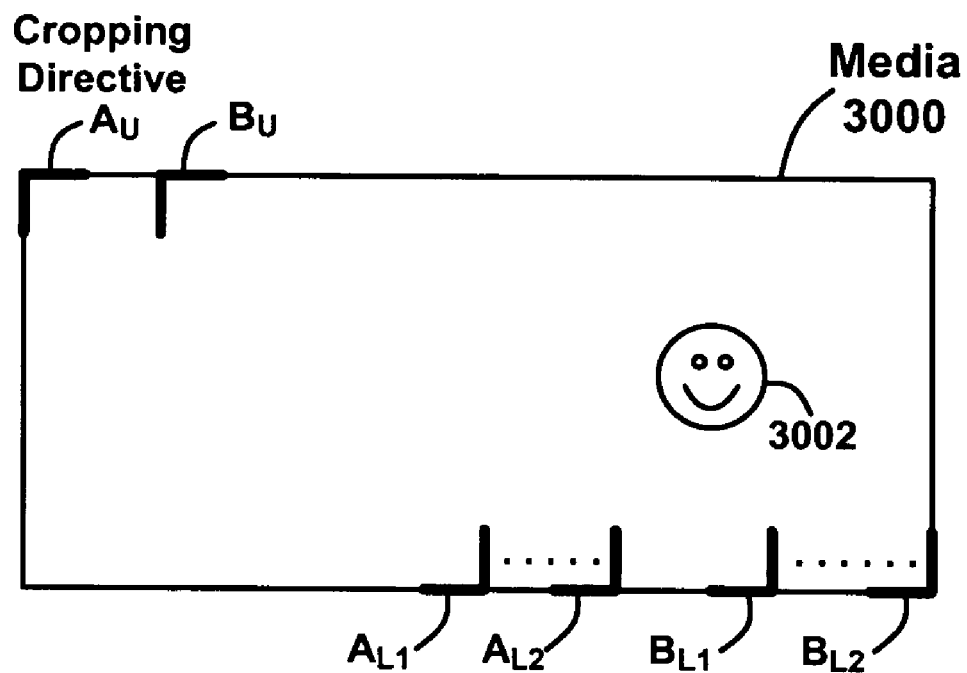
FIG. 30 shows exemplary cropping range directives for media in accordance with various embodiments of the invention.

In one embodiment, these cropping directives (and/or scaling directives) can be included in the coding structure for an image, a video frame, or group of frames of a video. This functionality can also be extended to cover cropping ranges instead of single fixed sizes. For example, FIG. 30 shows exemplary cropping range directives for media 3000 (e.g., an image, video, media, and the like) in accordance with various embodiments of the invention. In this case, each cropping directive can specify a range of acceptable positions or aspect ratios. For example, within FIG. 30, the "A-upper" ($A_U$) cropping directive together with the A-lower 1 ($A_{L1}$) and A-lower 2 ($A_{L2}$) cropping directives indicate a range of acceptable cropping or aspect ratios for image 3000. Furthermore, the "B-upper" ($B_U$) cropping directive together with the B-lower 1 ($B_{L1}$) and B-lower 2 ($B_{L2}$) cropping directives indicate an additional range of acceptable cropping or aspect ratios for image 3000. Note that the ranges of cropping directives $A_{L1}$-$A_{L2}$ and $B_{L1}$-$B_{L2}$ prevent any portion of a person's face 3002 included within image 3000 from being vertically cropped.

Note that when an image, a video frame, group of frames of video, and the like, are scaled in accordance with various embodiments of the invention, there are a wide variety of algorithms for magnifying or minifying the image that have tradeoffs in terms of image quality versus computation time. Some examples in terms of increasing quality and computation time can include, but are not limited to, point sampling, linear interpolation, and bicubic interpolation. It is appreciated that the scaling directives can specify one or more of these or give a method for choosing one or more of them based on the display machine's characteristics.

Figure 31:
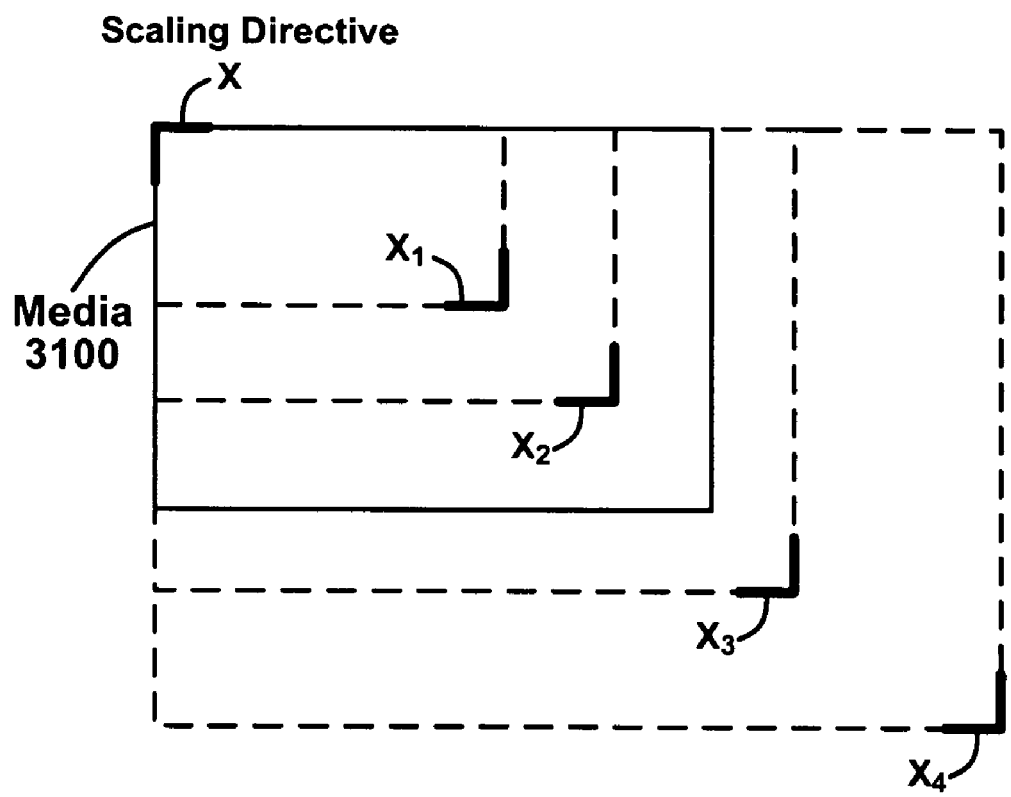
FIG. 31 shows exemplary fixed scaling directives for media in accordance with various embodiments of the invention.

FIG. 31 shows exemplary fixed scaling directives for media 3100 (e.g., an image, video, and the like) in accordance with various embodiments of the invention. The present embodiment illustrates a basic scheme wherein each pair of scaling directives X-$X_1$, X-$X_2$, X-$X_3$, and X-$X_4$ specifies a single fixed scaling size. In this exemplary embodiment, the X-$X_1$ scaling directive can minify (or reduce the scale of) media 3100 in both the vertical and horizontal directions while the X-$X_2$ scaling directive can minify media 3100 by a lesser amount in both the vertical and horizontal directions. Moreover, the X-$X_3$ scaling directive can magnify media 3100 in both the vertical and horizontal directions while the X-$X_4$ scaling directive can magnify media 3100 to a greater amount in both the vertical and horizontal directions. In this manner, media 3100 can be magnified and minified to fit into four different size slots or openings within a web page or presentation.

Figure 32:
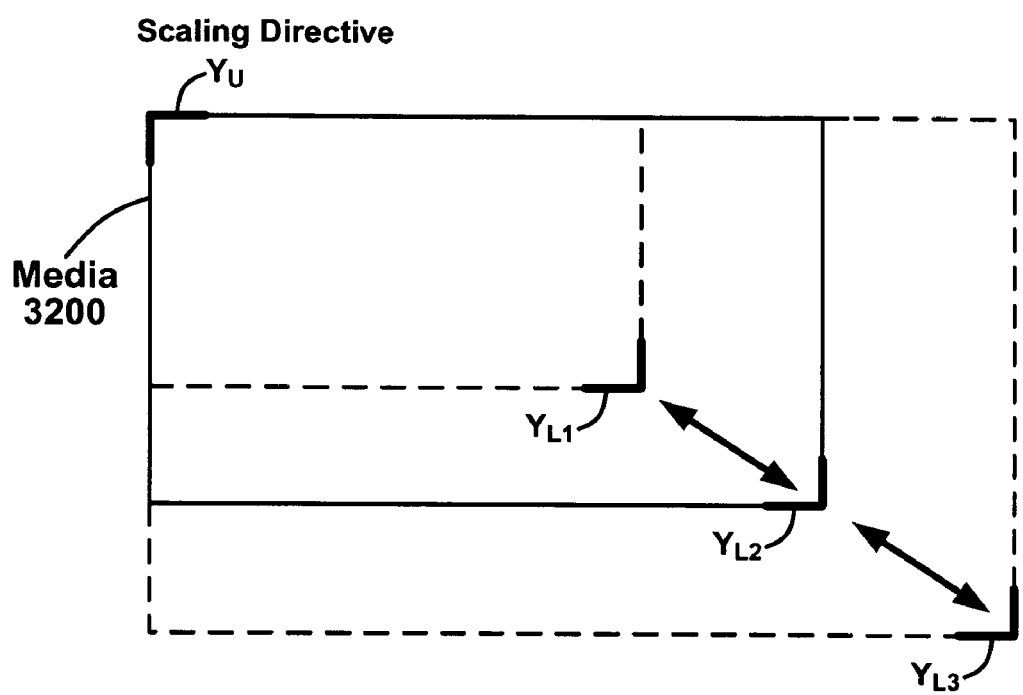
FIG. 32 shows exemplary scaling range directives for media in accordance with various embodiments of the invention.

In one embodiment, these scaling directives can be included in the coding structure for the image, video frame or group of frames of the video. This functionality can also be extended to cover scaling ranges instead of single fixed sizes. For example, FIG. 32 shows exemplary scaling range directives for media 3200 (e.g., an image, video, media, and the like) in accordance with various embodiments of the invention. In this case, each scaling directive can specify a range of positions or aspect ratios. For example, within FIG. 32, the "Y-upper" ($Y_U$) scaling directive together with the Y-lower 1 ($Y_{L1}$) and Y-lower 2 ($Y_{L2}$) scaling directives indicate a range of vertical and horizontal minification (or reduction) scaling for image 3200. Furthermore, the $Y_U$ scaling directive together with the $Y_{L2}$ and Y-lower 3 ($Y_{L3}$) scaling directives indicate a range of vertical and horizontal magnification scaling for image 3200.

In accordance with various embodiments of the invention, each cropping and/or scaling directive can include either a cost function, Boolean equation, or code utilized for choosing among the different cropping and/or scaling, and can take or receive aspect ratio, vertical resolution, horizontal resolution, and/or other factors as parameters. The following exemplary code shows the use of code written in the C programming language for performing cropping in accordance with various embodiments of the invention.

CropSelection(float aspectRatio, int horizontal Resolution, int verticalResolution, Boolean interface, . . . )

```
{
  if ((aspectRatio>1.77) && (aspectRatio<1.80)) {cropToHDTC;
  } else if ((aspectRatio>1.33) && (aspectRatio<1.34)) {cropToNTSC;
  } else if ((aspectRatio>2.20) && (aspectRatio<2.33)) {cropFull;
  } else cropDefault;
}
```

This exemplary code includes the use of cropping based on ranges. For example, "cropToHDTV", "cropToNTSC", and "cropFull" can either be standardized functions contained in an image (or media) interpreter or custom functions used for image (or media) processing that are included with the image (or media). It is appreciated that this exemplary code may be implemented in any number of standard portable programming languages, such as Java™, but is not limited to such.

It is noted that this flexible cropping and/or scaling can also be extended to include multilayer images. For example, text associated with an image could be in a separate layer than the image layer, wherein each layer has its own set of cropping and/or scaling directives. As such, this allows the text to be cropped and/or scaled differently than the associated imagery. This is described in greater detail below with reference to FIG. 35.

The flexible cropping and/or scaling could be performed either locally on a client, remotely on a server, or in an intermediate network device. It is appreciated that various embodiments in accordance with the invention can operate with more than DVDs and web pages implemented with the Hypertext Markup Language (HTML). For example, various embodiments of the invention can be applicable to other page descriptions or markup languages. Additionally, in various embodiments, the images or media could also be dependent on the size of the final cropped and/or scaled image presented to a user. For example, advertisers could be billed more for a larger image or media within a presentation, and the like.

It is appreciated that various embodiments in accordance with the invention can provide improved display of images and video within an environment of presentations that can include slots or openings having flexible aspect ratios and sizes.

In various embodiments in accordance with the invention, it may be desirable to do some scaling to an image (and the like) to enable a proper cropping for some particular aspect ratio. For example, when there is not enough extra image areas in order to achieve a proper cropping that completely fills the requested image dimensions. In this exemplary situation, cropping the image (and the like) can typically be performed first in order to achieve the correct (or desired) aspect ratio, and then that cropped image can be scaled (either larger of smaller) to achieve the correct (or desired) image size.

Figure 33:
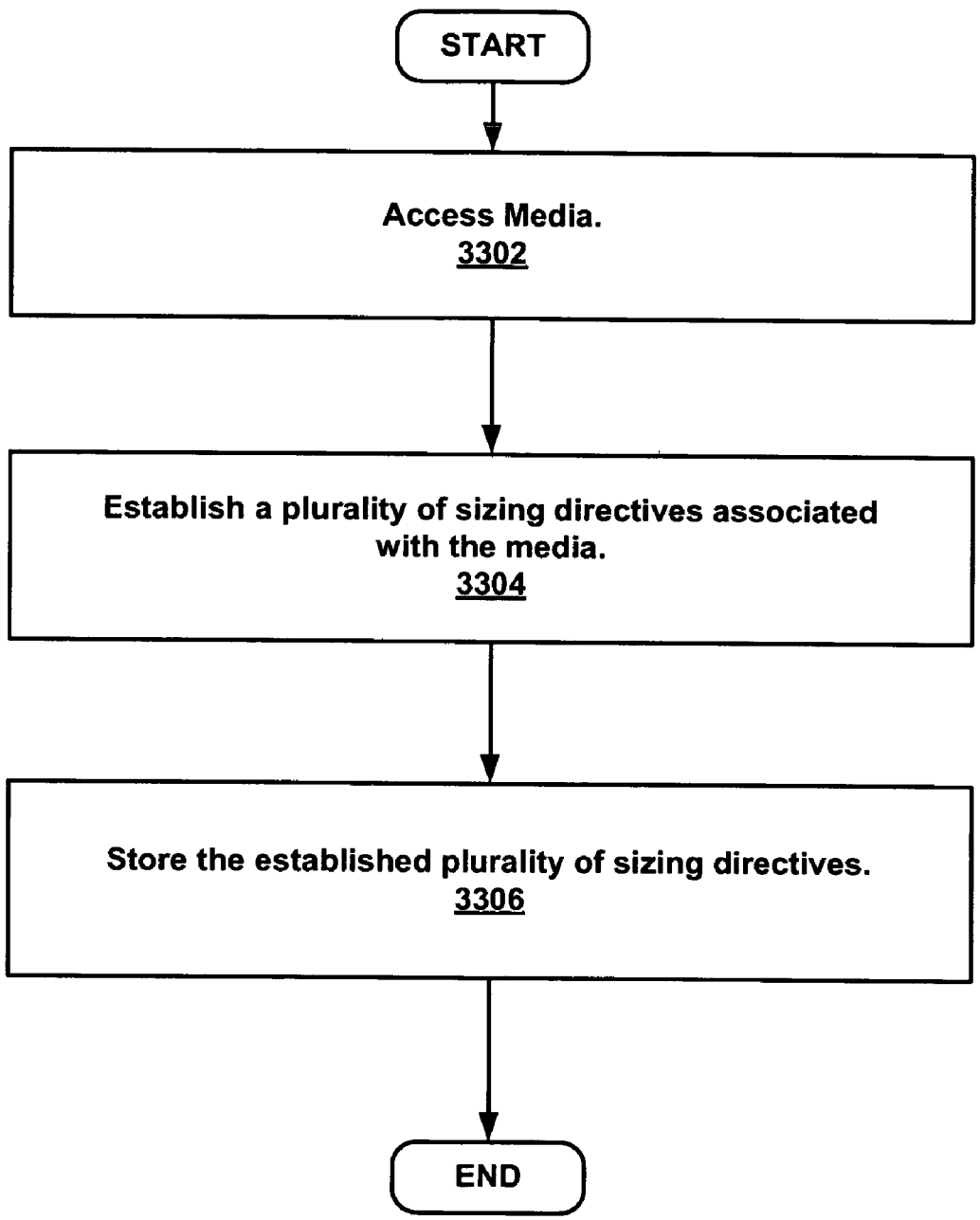
FIG. 33 is a flow diagram of a method for establishing sizing directives for media in accordance with various embodiments of the invention.

FIG. 33 is a flow diagram of a method 3300 for establishing sizing directives for media in accordance with various embodiments of the invention. Method 3300 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 3300, such operations are exemplary. Method 3300 may not include all of the operations illustrated by FIG. 33. Also, method 3300 may include various other operations and/or variations of the operations shown by FIG. 33. Likewise, the sequence of the operations of method 3300 can be modified. It is noted that the operations of method 3300 can be performed by software, by firmware, by electronic hardware, by one or more persons, or by any combination thereof.

Within method 3300, media (e.g., image, video, presentation, and the like) can be accessed, retrieved, created or received for processing. A plurality of sizing directives can be established or defined for the media. The established sizing directives for the media can be stored for subsequent use.

At 3302 of FIG. 33, media can be accessed, retrieved, created, generated, or received for processing. Note that 3302 can be implemented in a wide variety of ways. For example, the media can be implemented as, but not limited to, QuickTime® video and/or image, Window Media® video and/or image, Macromedia® Flash® animation, Microsoft® PowerPoint® presentation, video and/or image, Moving Picture Experts Group (MPEG) video, image and/or presentation, Joint Photographic Experts Group (JPEG) image, video and/or images stored by a DVD, video and/or images stored by a compact disc (CD), any type of video, any type of electronic image, and/or any type of electronic presentation. In various embodiments, at 3302 the media can be accessed, retrieved or received for processing from at least one advertiser or at least one media source. It is appreciated that 3302 can be implemented in any manner similar to that described herein, but is not limited to such.

At 3304, a plurality of sizing directives can be established (or defined or delineated) that are associated with the media. Understand that 3304 can be implemented in a wide variety of ways. In various embodiments, the sizing directives can include cropping directives and/or scaling directives, but are not limited to such. Furthermore, the sizing directives can include, but are not limited to, cropping positions, cropping ranges, scaling positions, and/or scaling ranges. In one embodiment, the sizing directives can be implemented with metadata that is associated with the media. In various embodiments, the sizing directives can be utilized for matching the media to a particular display device (e.g., television, monitor, widescreen display, mobile phone, personal digital assistant, portable computing device, and the like). In various embodiments, the sizing directives can be implemented to reduce and/or increase the resolution of the media. In one embodiment, the sizing directives can be established for one or more frames of a video, one or more groups of frames of a video, each frame of a video, or for the entire video. Note that 3304 can be implemented in any manner similar to that described herein, but is not limited to such.

At 3306 of FIG. 33, the established or defined sizing directives associated with the media can be stored for subsequent use. It is appreciated that 3306 can be implemented in a wide variety of ways. For example in one embodiment, the defined sizing directives can be stored in their own file separated from the media. In various embodiments, the defined sizing directives can be stored by interleaving them within the media when it is stored, depending on the encoding format. In one embodiment, the established sizing directives can be incorporated with the media when they are stored. In one embodiment, the defined sizing directives can be stored with the media on a portable storage device such as, but not limited to, a DVD, a CD, flash memory, and the like. It is understood that 3306 can be implemented in any manner similar to that described herein, but is not limited to such. At the completion of 3306, process 3300 can be exited.

Figure 34:
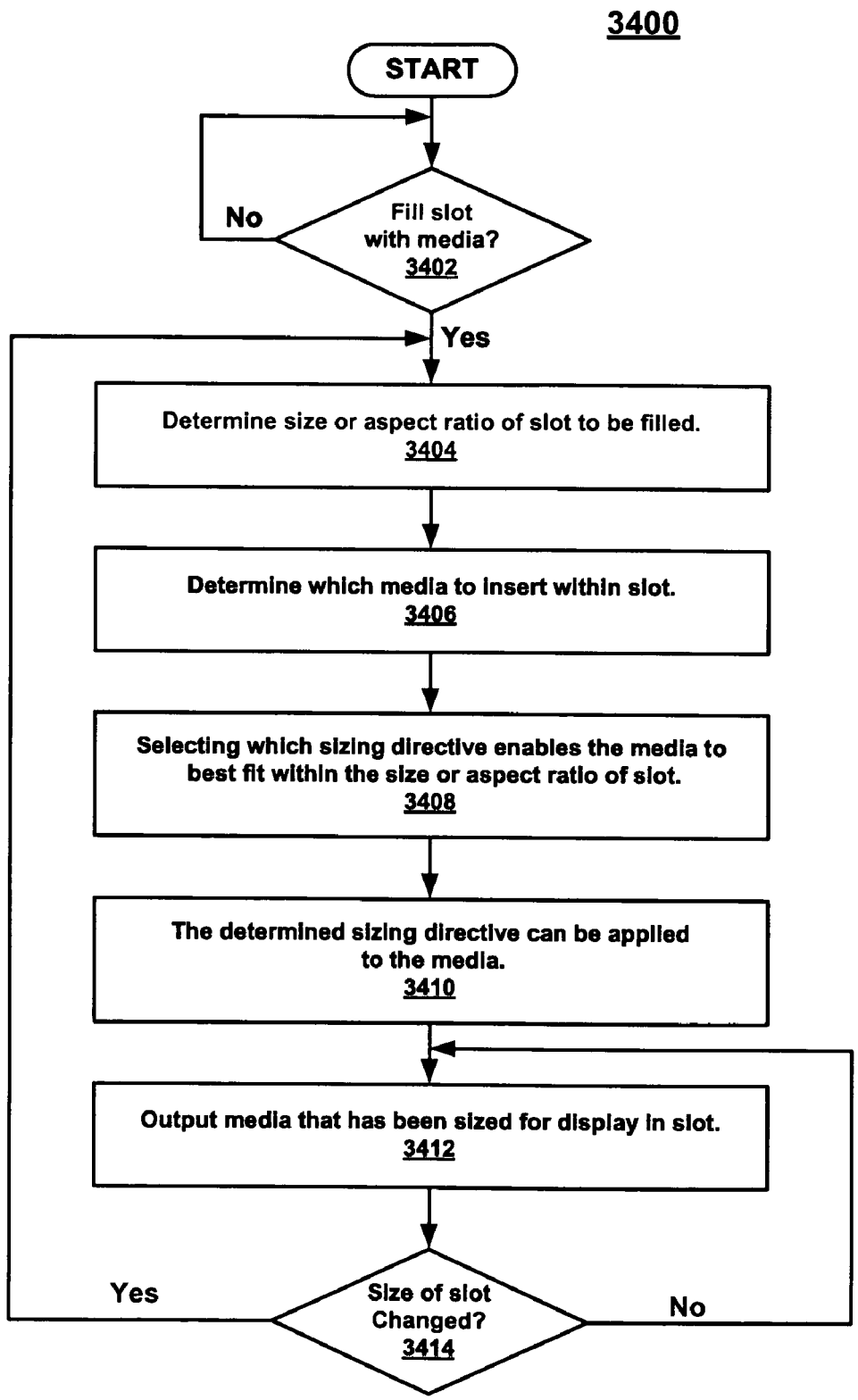
FIG. 34 is a flow diagram of a method for utilizing sizing directives with media in accordance with various embodiments of the invention.

FIG. 34 is a flow diagram of a method 3400 for utilizing sizing directives with media in accordance with various embodiments of the invention. Method 3400 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 3400, such operations are exemplary. Method 3400 may not include all of the operations illustrated by FIG. 34. Also, method 3400 may include various other operations and/or variations of the operations shown by FIG. 34. Likewise, the sequence of the operations of method 3400 can be modified. It is noted that the operations of method 3400 can be performed by software, by firmware, by electronic hardware, or by any combination thereof.

Within method 3400, a determination can be made as to whether there is a slot or opening of a presentation that is to be filled with media. If not, the determination can be repeated. However, if a slot of a presentation is to be filled with media, a determination can be made as to the size and/or aspect ratio of the slot. A determination can be made as to which media is to be inserted within the slot. Additionally, a determination can be made as to which sizing directive of a plurality of sizing directives enables the media to best fit within the size and/or aspect ratio of the slot. The determined or chosen sizing directive can be applied to the media. The media that has been sized can then be output for display within the slot or opening of the presentation. A determination can be made as to whether the size and/or aspect ratio of the slot has changed. If not, the media that has been sized can continue to be output for display within the slot or opening of the presentation. However, if the size and/or aspect ratio of the slot has changed, method 3400 can proceed to the determination of the size and/or aspect ratio of the slot.

At 3402 of FIG. 34, a determination can be made as to whether there is a slot, opening or hole within a presentation that is to be filled with media. If not, method 3400 can proceed to the beginning of 3402. However, if it is determined at 3402 that a slot within a presentation is to be filled with media, method 3400 can proceed to 3404. Note that 3402 can be implemented in a wide variety of ways. In various embodiments, it is understood that the presentation of 3402 can be implemented in any manner similar to that described herein, but is not limited to such. It is noted that the presentation of 3402 may include other displayed material along with the slot to be filled with media. Additionally, the presentation of 3402 may just involve the displaying of the media (e.g., video from a DVD or other storage medium). In various embodiments, the media of 3402 can be implemented in any manner similar to that described herein, but is not limited to such. It is appreciated that 3402 can be implemented in any manner similar to that described herein, but is not limited to such.

At 3404, a determination can be made as to the size and/or aspect ratio of the slot, opening or hole of the presentation. Understand that 3404 can be implemented in a wide variety of ways. For example in various embodiments, an application (e.g., browser) that is managing the display of the presentation can provide the known size and/or aspect ratio of the slot to be filled with media. In various embodiments, determining the size and/or aspect ratio of the slot can involve determining the size and/or aspect ratio of the display device that will be displaying the media. It is appreciated that 3404 can be implemented in any manner similar to that described herein, but is not limited to such.

At 3406 of FIG. 34, a determination can be made as to which media is to be inserted within the slot. It is noted that 3406 can be implemented in a wide variety of ways. For example in various embodiments, the determination at 3406 of which media to be inserted within the slot can involve utilizing a user profile in order to more closely match the media to the user in any manner similar to that described herein, but is not limited to such. In various embodiments, the determination at 3406 may involve using media that is provided by a storage device (e.g., a DVD, a CD, memory, and the like). In various embodiments, the determination at 3406 of which media to be inserted within the slot can be media that is currently being output for display in the slot (at 3412). It is appreciated that 3406 can be implemented in any manner similar to that described herein, but is not limited to such.

At 3408, a selection or determination can be made as to which sizing directive (or sizing directives) of a plurality of sizing directives enables the media to appropriately fit (or best fit) within the size and/or aspect ratio of the slot. It is noted that 3408 can be implemented in a wide variety of ways. In various embodiments, the sizing directives of 3408 can be implemented in any manner similar to that described herein, but is not limited to such. In various embodiments, one or more applications (e.g., cost functions) can be utilized at 3408 to select or determine which sizing directive of a plurality of sizing directives enables the media to appropriately fit (or best fit) within the size and/or aspect ratio of the slot. Note that a cost function can compare alternatives and choose which one is better. In various embodiments, the one or more applications at 3408 can query sizing directives metadata associated with the media as part of selecting or determining which sizing directive enables the media to best match the size and/or aspect ratio of the slot. It is appreciated that with this meta level of information, a widescreen video stored on a DVD can be played back in a wide variety of formats on any display device. In various embodiments, one or more applications can be bundled with the media that can select or determine at 3408 which sizing directive of a plurality of sizing directives enables the media to appropriately fit within the size and/or aspect ratio of the slot. In various embodiments, one or more plug-ins for an application (e.g., browser) can be implemented to select or determine at 3408 which sizing directive of a plurality of sizing directives enables the media to appropriately fit within the size and/or aspect ratio of the slot. In various embodiments, the selection or determination at 3408 of which sizing directive enables the media to best match the size and/or aspect ratio of the slot may in the future be implemented as part of a media standard (e.g., JPEG, MPEG, and the like). Note that any embodiment associated with 3408 can be implemented for selecting or determining one or more sizing directives of a plurality of sizing directives to enable the media to appropriately fit (or best fit) within the size and/or aspect ratio of the slot. Understand that 3408 can be implemented in any manner similar to that described herein, but is not limited to such.

At 3410 of FIG. 34, the one or more selected or determined or chosen sizing directives can be applied to the media. It is appreciated that 3410 can be implemented in a wide variety of ways. For example in various embodiments, 3410 can be implemented in any manner similar to that described herein, but is not limited to such.

At 3412, the media that has been sized can be output for display in the slot, opening or hole of the presentation. It is understood that 3412 can be implemented in a wide variety of ways. For example in various embodiments, 3412 can be implemented in any manner similar to that described herein, but is not limited to such.

At 3414 of FIG. 34, a determination can be made as to whether the size and/or aspect ratio of the slot has changed. If not, method 3400 can proceed to 3412 so that the media that has been sized can continue to be output for display within the slot or opening of the presentation. However, if the size and/or aspect ratio of the slot has changed at 3414, method 3400 can proceed to 3404 so that the size and/or aspect ratio of the slot can be determined. It is appreciated that 3414 can be implemented in a wide variety of ways. For example in various embodiments, the size and/or aspect ratio of the slot can be change in response to one or more media editing commands (e.g., font resizing) associated with the presentation. Understand that 3414 can be implemented in any manner similar to that described herein, but is not limited to such.

Figure 35:
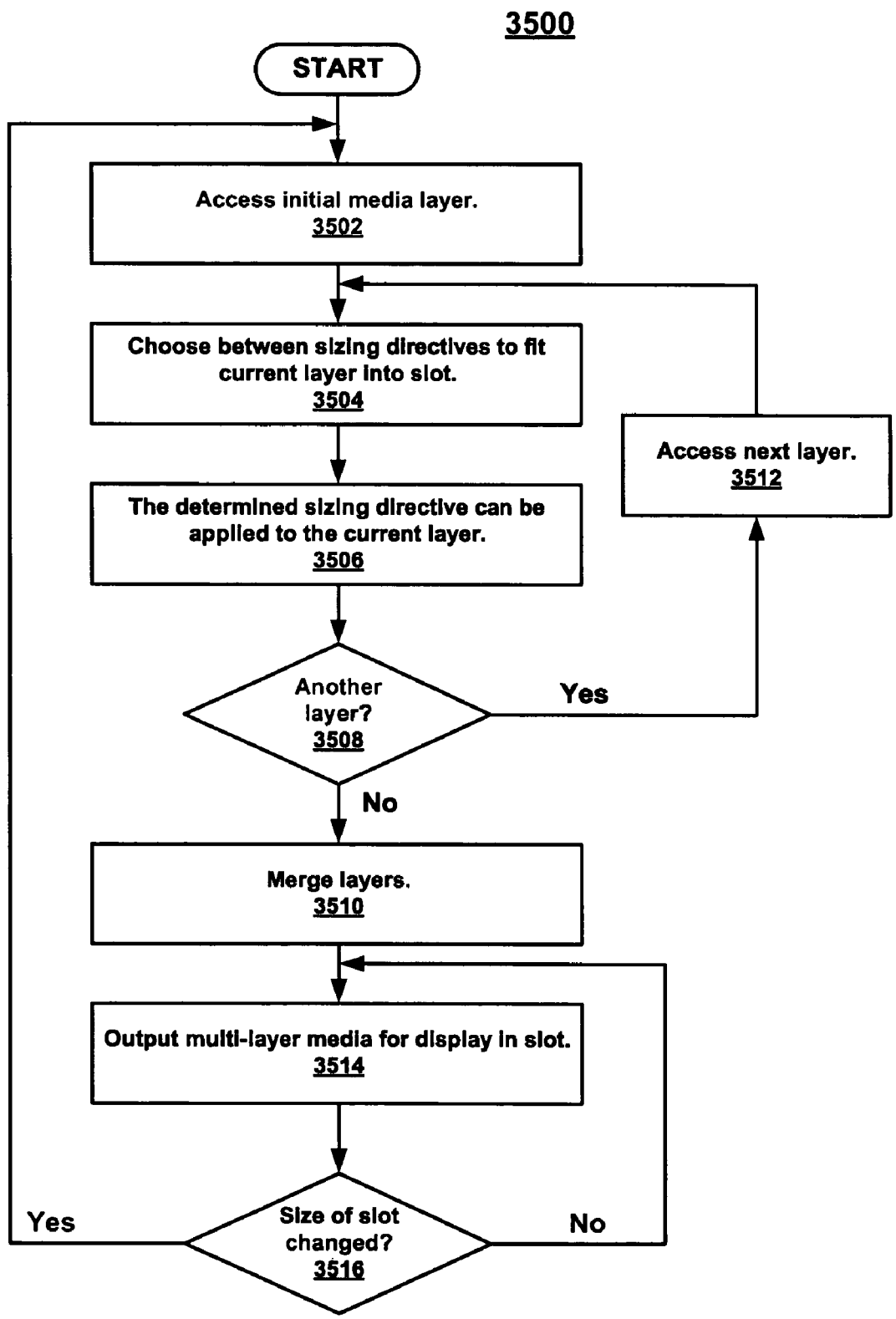
FIG. 35 is a flow diagram of a method for utilizing sizing directives with multi-layer media in accordance with various embodiments of the invention.

FIG. 35 is a flow diagram of a method 3500 for utilizing sizing directives with multi-layer media in accordance with various embodiments of the invention. Note that a multi-layer media can be media that is composed of at least two layers (or portions) of media, wherein at least one sizing directive can be separately associated with (and/or separately applied to) each media layer or portion. Method 3500 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 3500, such operations are exemplary. Method 3500 may not include all of the operations illustrated by FIG. 35. Also, method 3500 may include various other operations and/or variations of the operations shown by FIG. 35. Likewise, the sequence of the operations of method 3500 can be modified. It is noted that the operations of method 3500 can be performed by software, by firmware, by electronic hardware, or by any combination thereof.

Within method 3500, an initial layer (e.g., image layer, text layer, and the like) can be accessed, retrieved or received from a multi-layer media. A determination or choice or selection can be made as to which sizing directive (or directives) of a plurality of sizing directives should be utilized in order for the current layer of the multi-layer media to appropriately or best fit within the slot, opening or hole of a presentation. The determined sizing directive (or directives) can be applied to the current layer of the multi-layer media. It is determined whether there is another layer of the multi-layer media to be processed by method 3500. If not, the different layers of the multi-layer media can be merged together and then can be output for display in the slot of the presentation. However, if it is determined that there is another layer of the multi-layer media to be processed, the next layer of the multi-layer media can be accessed, retrieved or received thereby causing it to become the new current layer of method 3500. It is noted that method 3500 can then operate in a manner similar to that described above with regard to the current layer. A determination can be made as to whether the size and/or aspect ratio of the slot has changed. If not, the multi-layer media that has been sized can continue to be output for display within the slot or opening of the presentation. However, if the size and/or aspect ratio of the slot has changed, method 3500 can proceed to access the initial layer of the multi-layer media.

At 3502 of FIG. 35, an initial layer (e.g., image layer, text layer, and the like) can be accessed, retrieved or received from a multi-layer media. Note that 3502 can be implemented in a wide variety of ways. For example in one embodiment, the multi-layer media of 3502 may include any combination of media similar to that described herein, but is not limited to such. In various embodiments, the initial layer that can be accessed, retrieved or received from a multi-layer media at 3502 can involve a media layer that is currently being output for display in the slot (at 3514). It is appreciated that 3502 can be implemented in any manner similar to that described herein, but is not limited to such.

At 3504, a determination or choice or selection can be made as to which sizing directive (or sizing directives) of a plurality of sizing directives can be utilized in order for the current layer of the multi-layer media to appropriately or best fit within the slot, opening, or hole of a presentation. Understand that 3504 can be implemented in a wide variety of ways. For example in various embodiments, if the current layer of the multi-layer media is a text layer, the sizing directives can include, but are not limited to, different fonts for the text of the text layer, different aspect ratios for the text of the text layer, different styles (e.g., plain, bold, shadowed, etc.) for the text of the text layer, insertion of line breaks, and/or any combination thereof. It is noted that within method 3500, each layer of the multi-layer media can have its own sizing directive (or sizing directives). As such, this enables a first layer of a multi-layer media to potentially be processed similarly or differently than a second layer of that multi-layer media, and so forth. In various embodiments, 3504 can be implemented in any manner similar to that described herein, but is not limited to such.

At 3506 of FIG. 35, the one or more determined or chosen or selected sizing directives can be applied to the current layer of the multi-layer media thereby resulting in a sized current layer. It is appreciated that 3506 can be implemented in a wide variety of ways. For example in various embodiments, if the current layer of the multi-layer media is a text layer, applying the chosen one or more sizing directives to the text of the text layer can include implementing the text in the chosen font or fonts, implementing the text in the chosen aspect ratio or aspect ratios, implementing the text in the chosen style or styles, insertion of line breaks, and/or any combination thereof. In various embodiments, 3506 can be implemented in any manner similar to that described herein, but is not limited to such.

At 3508, it can be determined whether there is another layer of the multi-layer media to be processed by method 3500. If not, method 3500 can proceed to 3510. However, if it is determined at 3508 that there is another layer of the multi-layer media to be processed, method 3500 can proceed to 3512. It is noted that 3508 can be implemented in a wide variety of ways. For example in various embodiments, 3508 can be implemented in any manner similar to that described herein, but is not limited to such.

At 3512 of FIG. 35, the next layer of the multi-layer media can be accessed, retrieved or received thereby causing it to become the new current layer of method 3500. It is understood that 3512 can be implemented in a wide variety of ways. In various embodiments, the next layer of the multi-layer media that can be accessed, retrieved or received at 3512 can involve a media layer that is currently being output for display in the slot (at 3514). 3512 can be implemented in any manner similar to that described herein, but is not limited to such. At the completion of 3512, process 3500 can proceed to 3504.

At 3510, the different sized layers of the multi-layer media can be merged together (or composited) in order to form or produce the sized multi-layer media that will appropriately or best fit within the slot, opening, or hole of the presentation. It is appreciated that 3510 can be implemented in a wide variety of ways. For example in various embodiments, 3510 can be implemented in any manner similar to that described herein, but is not limited to such.

At 3514 of FIG. 35, the multi-layer media that has been sized can then be output for display in the slot, opening, or hole of the presentation. It is noted that 3514 can be implemented in a wide variety of ways. For example in various embodiments, 3514 can be implemented in any manner similar to that described herein, but is not limited to such.

At 3516, a determination can be made as to whether the size and/or aspect ratio of the slot has changed. If not, method 3500 can proceed to 3514 so that the multi-layer media that has been sized can continue to be output for display within the slot or opening of the presentation. However, if the size and/or aspect ratio of the slot has changed at 3516, method 3500 can proceed to 3502 so that the initial layer of the multi-layer media can be accessed. It is appreciated that 3516 can be implemented in a wide variety of ways. For example in various embodiments, the size and/or aspect ratio of the slot can be change in response to one or more media editing commands (e.g., font resizing) associated with the presentation. Understand that 3516 can be implemented in any manner similar to that described herein, but is not limited to such.

Figure 36:
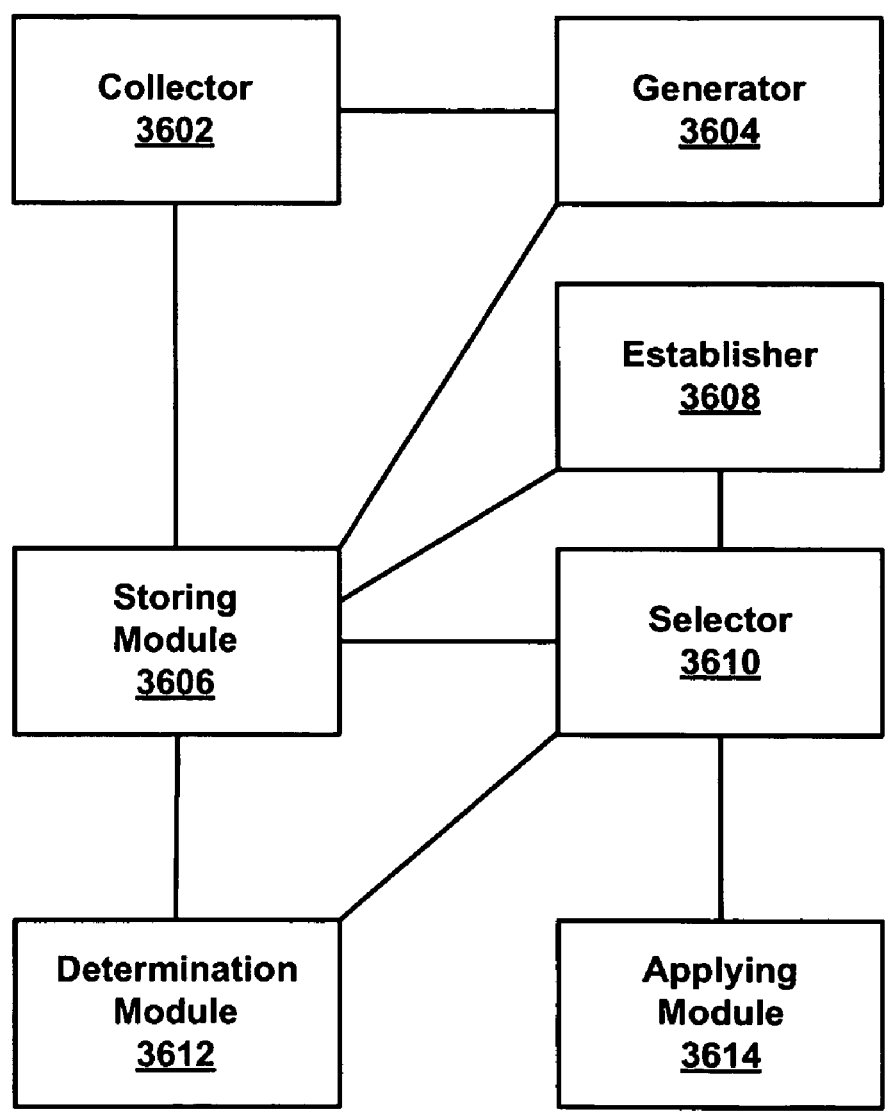
FIG. 36 is a block diagram of a system in accordance with various embodiments of the invention.

FIG. 36 is a block diagram of an exemplary system 3600 for establishing sizing directives for media and/or utilizing sizing directives with media in accordance with various embodiments of the invention. The blocks that represent features in FIG. 36 can be arranged and coupled differently than illustrated, and can implement additional or fewer features than what are described herein. Further, the features represented by the blocks in FIG. 36 can be combined in various ways. The system 3600 can be implemented with software, firmware, hardware, or with any combination thereof.

System 3600 can be associated with a client (e.g., 340), one or more servers, one or more intermediate network devices, or any combination thereof. The system 3600 includes, but is not limited to, a collector 3602, a generator 3604, a storing module 3606, an establisher 3608, a selector 3610, a determination module 3612, and an applying module 3614.

Specifically within FIG. 36, the determination module 3612 can determine a size of a media slot to be filled. Note that the determination module 3612 can perform the functionality associated with 3402 and 3404, described herein. The selector 3610 can select a sizing directive from a plurality of sizing directives associated with media that enables the media to fit within the size of the media slot. It is understood that the selector 3610 can perform the functionality associated with 3406 and 3408, described herein. The applying module 3614 can apply the sizing directive to the media. It is appreciated that the applying module 3614 can perform the functionality associated with 3410 and 3412, described herein.

Within system 3600, the collector 3602 can collect user information about a user from at least one electronic device that is associated with the user. It is noted that collector 3602 can also operate in any manner similar to any collector described herein, but is not limited to such. The generator 3604 can generate a user profile based on the user information. It is appreciated that generator 3602 can generate a user profile based on the user information in any manner similar to that described herein, but is not limited to such. The storing module 3606 can store the user profile, wherein the user profile can be used to achieve delivery of data, which can be targeted to the user based on the user profile without requiring a release of any of the user information in the user profile. Note that the data can comprise the media. The storing module 3606 can store the user profile (and/or any other data and information) in any manner similar to that described herein, but is not limited to such. The storing module 3606 can perform the functionality associated with 3306, described herein. The establisher 3608 can establish the plurality of sizing directives associated with the media. It is appreciated that the establisher 3608 can perform the functionality associated with 3302 and 3304, described herein.

Within FIG. 36, the storing module 3606 can be coupled to the collector 3602, generator 3604, establisher 3608, selector 3610, and determination module 3612. The selector 3610 can be coupled to the establisher 3608, determination module 3612, and applying module 3614. The generator 3604 can be coupled to the collector 3602.

Figure 37:
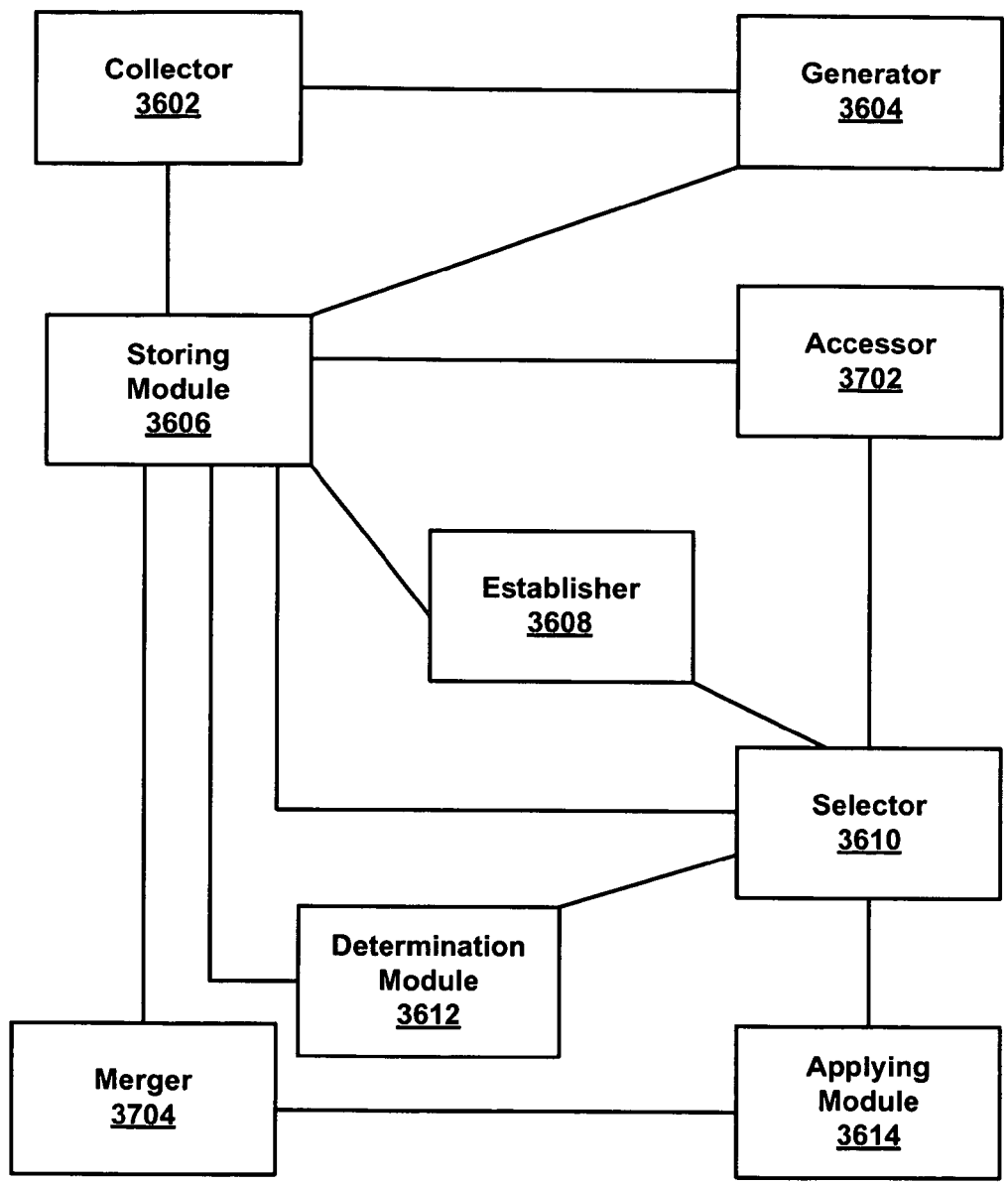
FIG. 37 is a block diagram of another system in accordance with various embodiments of the invention.

FIG. 37 is a block diagram of an exemplary system 3700 for establishing sizing directives for multi-layer media and/or utilizing sizing directives with multi-layer media in accordance with various embodiments of the invention. The blocks that represent features in FIG. 37 can be arranged and coupled differently than illustrated, and can implement additional or fewer features than what are described herein. Further, the features represented by the blocks in FIG. 37 can be combined in various ways. The system 3700 can be implemented with software, firmware, hardware, or with any combination thereof.

System 3700 can be associated with a client (e.g., 340), one or more servers, one or more intermediate network devices, or any combination thereof. The system 3700 includes, but is not limited to, an accessor 3702, a merger 3704, a collector 3602, a generator 3604, a storing module 3606, an establisher 3608, a selector 3610, a determination module 3612, and an applying module 3614.

Specifically within FIG. 37, the accessor 3702 can access, retrieve or receive an initial layer (e.g., image layer, text layer, and the like) of a multi-layer media. Additionally, the accessor 3702 can access, retrieve or receive the next layer (if one exists) of the multi-layer media thereby causing it to become the new current layer. Note that the accessor 3702 can perform the functionality associated with 3502 and 3512, described herein. The selector 3610 can determine (or choice or select) which sizing directive (or sizing directives) of a plurality of sizing directives can be utilized in order for the current layer of the multi-layer media to appropriately or best fit within the slot, opening, or hole of a presentation. It is understood that the selector 3610 can perform the functionality associated with 3504, described herein. The applying module 3614 can apply the one or more determined or chosen or selected sizing directives to the current layer of the multi-layer media. It is appreciated that the applying module 3614 can perform the functionality associated with 3506, described herein.

The determination module 3612 can determine whether there is another layer of the multi-layer media to be processed. Note that the determination module 3612 can perform the functionality associated with 3508, described herein. The merger 3704 can merge (or combine or composite) together the different layers of the multi-layer media to form or produce the multi-layer media that will appropriately or best fit within the slot, opening, or hole of the presentation. The merger 3704 can also output for display the multi-layer media that has been sized for the slot, opening, or hole of the presentation. It is noted that the merger 3704 can perform the functionality associated with 3510 and 3514, described herein. It is understood that within system 3700, the collector 3602, generator 3604, storing module 3606, and establisher 3608 can each operate in any manner similar to that described herein, but in respect to multi-layer media and any of its components, but is not limited to such.

Within FIG. 36, the storing module 3606 can be coupled to the collector 3602, generator 3604, accessor 3702, establisher 3608, selector 3610, merger 3704, and determination module 3612. The selector 3610 can be coupled to the accessor 3702, establisher 3608, determination module 3612, and applying module 3614. The generator 3604 can be coupled to the collector 3602 while the merger 3704 can be coupled to the applying module 3614.

While the invention is described in conjunction with various embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the invention, numerous specific details are set forth in order to provide a thorough understanding of the present invention. However, it will be recognized by one of ordinary skill in the art that the invention may be practiced without these specific details. In other instances, well-known methods, procedures, components, and circuits have not been described in detail as not to unnecessarily obscure aspects of the invention.

What is claimed is:

1. A method comprising:
   collecting user information about a user from at least one electronic device associated with said user;
   generating a user profile based on said user information; and
   outputting targeted media to said user based on said user profile, wherein said outputting comprises:
   receiving said targeted media at said at least one electronic device associated with said user, said targeted media including media to be displayed on a display of said at least one electronic device and a plurality of sizing directives for said media;
   determining, by said at least one electronic device, a size of a media slot to be filled by said media;
   selecting, by said at least one electronic device, a sizing directive from said plurality of sizing directives included with said media that enables said media to fit within said size of said media slot; and
   applying, by said at least one electronic device, said sizing directive to said media.

2. The method of claim 1, wherein said sizing directive is selected from the group consisting of a cropping directive or a scaling directive.

3. The method of claim 1, wherein said media is selected from the group consisting of an electronic image, an electronic video, and an electronic animation.

4. The method of claim 1, wherein said media includes text, and said sizing directive is selected from different fonts for the text, different aspect ratios for the text, different font styles for the text, and insertion of line breaks for the text.

5. The method of claim 1, further comprising:
   establishing said plurality of sizing directives included with said media; and
   storing said plurality of sizing directives.

6. The method of claim 5, wherein said storing said plurality of sizing directives comprises incorporating said plurality of sizing directives with said media.

7. The method of claim 5, wherein said storing said plurality of sizing directives comprises storing said plurality of sizing directives separately from said media.

8. The method of claim 1, further comprising:
   determining a second size of said media slot to be filled by said media, in response to a media editing command that modified said media slot;
   selecting a second sizing directive from said plurality of sizing directives included with said media that enables said media to fit within said second size of said media slot; and
   applying said second sizing directive to said media.

9. The method of claim 1, wherein:
   said media comprising a first layer and a second layer;
   said selecting comprises selecting a first sizing directive from said plurality of sizing directives for said first layer and selecting a second sizing directive from said plurality of sizing directives for said second layer; and
   said applying comprises applying said first sizing directive to said first layer and applying said second sizing directive to said second layer resulting in a sized first layer and a sized second layer.

10. The method of claim 9, wherein said first layer comprises an image layer and said second layer comprises a text layer.

11. The method of claim 9, further comprising:
    merging said sized first layer and said sized second layer for display of said media in said media slot.

12. The method of claim 1, wherein said plurality of sizing directives are included in metadata of said media.

13. The method of claim 1, wherein said determining and said selecting are performed by an application managing said display of said at least one electronic device.

14. The method of claim 13, wherein said application is bundled with said media.

15. A computer-readable storage medium including computer-executable instructions that when executed effect a computer-implemented method comprising:
    collecting, by said computer, user information about a user from at least one electronic device associated with said user;
    generating, by said computer, a user profile based on said user information; and
    outputting, by said computer, targeted media to said user based on said user profile, wherein said targeted media includes media to be displayed for said user and a plurality of sizing directives for said media, and wherein said outputting comprises:
    determining, by said computer, a size of a media slot to be filled by said media;
    selecting, by said computer, a sizing directive from said plurality of sizing directives included with said media that enables said media to fit within said size of said media slot; and
    applying, by said computer, said sizing directive to said media.

16. The computer-readable storage medium of claim 15, wherein said sizing directive is selected from the group consisting of a cropping directive or a scaling directive.

17. The computer-readable storage medium of claim 15, wherein said media is selected from the group consisting of an electronic image, an electronic video, and an electronic animation.

18. The computer-readable storage medium of claim 15, wherein said media includes text, and said sizing directive is selected from different fonts for the text, different aspect ratios for the text, different font styles for the text, and insertion of line breaks for the text.

19. The computer-readable storage medium of claim 15, wherein selection of said sizing directive is based on a cost function associated with said size of said media slot.

20. The computer-readable storage medium of claim 15, wherein said plurality of sizing directives are interleaved with said media, and said determining and said selecting are performed by an application bundled with said media.

* * * * *

UNITED STATES PATENT AND TRADEMARK OFFICE
CERTIFICATE OF CORRECTION

| | | |
|---|---|---|
| PATENT NO. | : 7,890,857 B1 | Page 1 of 1 |
| APPLICATION NO. | : 11/492474 | |
| DATED | : February 15, 2011 | |
| INVENTOR(S) | : Norman P. Jouppi | |

It is certified that error appears in the above-identified patent and that said Letters Patent is hereby corrected as shown below:

In column 5, line 37, delete "clarity" and insert -- and clarity --, therefor.

In column 16, line 6, delete "2)" and insert -- or 2) --, therefor.

In column 43, line 9, delete "source" and insert -- source and --, therefor.

Signed and Sealed this
Tenth Day of May, 2011

David J. Kappos
*Director of the United States Patent and Trademark Office*